(12) United States Patent
Ikeuchi

(10) Patent No.: US 7,756,607 B2
(45) Date of Patent: Jul. 13, 2010

(54) FLOOR REACTION FORCE ESTIMATION METHOD FOR TWO-LEGGED WALKING MOBILE BODY

(75) Inventor: Yasushi Ikeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1244 days.

(21) Appl. No.: 11/300,739

(22) Filed: Dec. 15, 2005

(65) Prior Publication Data

US 2006/0149420 A1 Jul. 6, 2006

(30) Foreign Application Priority Data

Dec. 17, 2004 (JP) ............................. 2004-366907

(51) Int. Cl.
*G01L 5/16* (2006.01)
*G05B 19/00* (2006.01)

(52) U.S. Cl. ...................... 700/245; 901/1; 702/33; 702/41; 73/865.4

(58) Field of Classification Search ................ 700/245, 700/260, 261; 73/65.01, 65.07, 172, 865.4; 180/8.1, 8.6; 318/560, 567, 568.1, 568.12, 318/568.15–568.19; 702/33, 41, 127, 138, 702/139; 901/1
See application file for complete search history.

(56) References Cited

U.S. PATENT DOCUMENTS 6,243,623 B1 * 6/2001 Takenaka et al. ............ 700/245

| 6,301,524 | B1 * | 10/2001 | Takenaka ..................... 700/245 |
| 7,386,364 | B2 * | 6/2008 | Mikami et al. ............... 700/245 |
| 2004/0116836 | A1 * | 6/2004 | Kawai et al. ................. 600/595 |
| 2004/0143369 | A1 * | 7/2004 | Takenaka et al. ............ 700/245 |
| 2004/0206164 | A1 * | 10/2004 | Kawai et al. ............... 73/65.07 |

FOREIGN PATENT DOCUMENTS

| JP | 2003-089083 | | 3/2003 |
| WO | WO 03/078109 | * | 9/2003 |
| WO | WO 2004/091865 | | 10/2004 |

OTHER PUBLICATIONS

Kwon, Young-Hoo, Angular Kinetics, Ball State University, May 13, 2004.*

* cited by examiner

*Primary Examiner*—Khoi Tran
*Assistant Examiner*—Spencer Patton
(74) *Attorney, Agent, or Firm*—Rankin, Hill & Clark, LLP

(57) ABSTRACT

The direction of a component vector on a plane perpendicular to a predetermined axis of a floor reaction force acting on landing legs of a two-legged walking mobile body is determined such that the direction of a moment generated around a center-of-gravity of the body by a total sum of the component vectors on the plane is coincident with the direction of the component around the predetermined axis of a total rate of change of angular momentum by calculating the total rate of change of angular momentum, and the total floor reaction force acting on the body by sensing joint displacement, acceleration, angular velocity, and using a rigid link model. An estimated value of the component vector is found based on the determined direction and the obtained total floor reaction force. This enables finding an estimated value of the floor reaction force showing a smooth and continuous change.

8 Claims, 17 Drawing Sheets

FLOOR REACTION FORCE ESTIMATION METHOD FOR TWO-LEGGED WALKING MOBILE BODY

BACKGROUND OF THE INVENTION

1. Field of the Invention

The present invention relates to an estimation method for floor reaction forces acting on a two-legged walking mobile body such as a human being.

2. Related Background Art

For example, when applying support torques to joints of each leg of a two-legged walking mobile body such as, for example, a human being to assist a walking motion of the two-legged walking mobile body, there is a need to estimate moments, which should be generated at the joints of the each leg (joint moments required for the motion of the two-legged walking mobile body). Moreover, to estimate the joint moments, it is required to grasp floor reaction forces (vectors) acting on each landing leg. The term "floor reaction force" is accurately a vector quantity composed of a translational force and a moment. It is assumed, however, that the "floor reaction force" in this specification means a vector of the translational force.

As a method of estimating the floor reaction force, there is, for example, an already known method suggested by this applicant in Japanese Patent Laid-open No. 2003-89083 (hereinafter, referred to as the patent document 1). In this method, an acceleration (vector) of a center-of-gravity of a two-legged walking mobile body is calculated by using an output of an acceleration sensor attached to the waist of the two-legged walking mobile body or outputs of joint displacement sensors for detecting displacements (rotation angles) of joints (hip joints, knee joints, and ankle joints) of the legs, and then the total floor reaction force (vector), which is a total sum of all floor reaction forces acting on the two-legged walking mobile body, is calculated from the acceleration of the center-of-gravity and the weight of the two-legged walking mobile body. Thereafter, in the two-leg supporting state (during the period in which both legs are landing) of the two-legged walking mobile body, supposing that the floor reaction force acting on each leg is in the direction from the ankle joint of the leg to the center-of-gravity of the two-legged walking mobile body, the floor reaction force acting on the each leg is estimated in such a way that the total sum (vector sum) of the floor reaction forces acting on both legs equals the total floor reaction force. On the other hand, in the one-leg supporting state (during the period in which only one of the legs is landing), the total floor reaction force is estimated as a floor reaction force acting on the landing leg directly. The estimated value of the floor reaction force acting on the leg not landing is naturally zero.

This type of estimation method for the floor reaction forces is advantageous in that the floor reaction forces can be estimated without the attachment of a force sensor to the two-legged walking mobile body or installation of a force plate (a plate for detecting a load) on the floor.

In the technology disclosed in the patent document 1, the direction of the floor reaction force acting on the each leg is determined by the relative positional relationship between the center-of-gravity of the two-legged walking mobile body and the ankle joint in the two-leg supporting state of the two-legged walking mobile body. On the other hand, in the one-leg supporting state, the direction of the acceleration of the center-of-gravity of the two-legged walking mobile body calculated by using the output of the acceleration sensor is directly determined as the direction of the floor reaction force acting on the landing leg. Therefore, how to determine the direction of the floor reaction force acting on the each leg in the two-leg supporting state is different from the one-leg supporting state. Therefore, the direction of the estimated value of the floor reaction force acting on the each landing leg sometimes varies in a discontinuous manner at shift from one-leg supporting state to another supporting state. Particularly, the output of the acceleration sensor in the forward/backward direction (an acceleration detected value in the forward/backward direction) of the two-legged walking mobile body is susceptible to change in the direction due to an influence of a disturbance or the like, and thus an estimated value of an anteroposterior component of the two-legged walking mobile body has sometimes changed suddenly in a discontinuous manner in the floor reaction force acting on the each landing leg.

Moreover, in the one-leg supporting state, the output of the acceleration sensor is directly reflected on both the estimated magnitude and direction of the floor reaction force. Therefore, particularly in the one-leg supporting state, the direction of the estimated value of the anteroposterior component of the floor reaction force acting on the landing leg has been sometimes reversed in a fluctuating manner.

Therefore, in the technology disclosed in the patent document 1, it may be sometimes impossible to obtain such an estimated value of the floor reaction force that varies smoothly and continuously. Consequently, when estimating the joint moment by using the estimated value of the floor reaction force, the estimated value of the joint moment also has sometimes changed suddenly in a discontinuous manner or frequently changed in a fluctuating manner.

SUMMARY OF THE INVENTION

In view of the above background, the present invention has been provided. Therefore, it is an object of the present invention to provide a floor reaction force estimation method that enables finding an estimated value of a floor reaction force showing a smooth and continuous change.

To achieve the above object, according to a first feature of the present invention, there is provided a floor reaction force estimation method for a two-legged walking mobile body, which estimates a floor reaction force acting on each leg of the two-legged walking mobile body, comprising: a first step of sequentially measuring displacements of a plurality of predetermined joints including at least a hip joint and a knee joint of the each leg of the two-legged walking mobile body and a second step of sequentially calculating center-of-gravity locations of the two-legged walking mobile body by using at least a rigid link model in which the two-legged walking mobile body is represented as a link body made of a plurality of rigid elements and a plurality of joint elements and the displacements of the joints measured in the first step. In other words, it is possible to determine displacements of the joint elements of the rigid link model by using the displacements of the plurality of predetermined joints measured in the first step and thus to determine mutual positional and posture relationships of the rigid elements of the rigid link model. Therefore, the center-of-gravity location of the rigid link model can be calculated as a center-of-gravity location of the two-legged walking mobile body. In this instance, the rigid elements of the rigid link model have their weights and lengths, which have been preset. Moreover, the center-of-gravity location of the two-legged walking mobile body may be found as a location on a coordinate system (this means a location to the origin of the coordinate system) fixed to an arbitrarily selected predetermined region (a region corresponding to a certain rigid element) or a location to a predetermined reference point, which has been fixed to the predetermined region.

The first feature of the present invention further comprises a third step of sequentially calculating accelerations of the centers of gravity of the two-legged walking mobile body by using at least the center-of-gravity locations calculated in the second step and outputs of an acceleration sensor attached to the two-legged walking mobile body and a fourth step of sequentially calculating component vectors on a plane perpendicular to at least one predetermined axis of a total floor reaction force, which is a total sum of all floor reaction forces acting on the two-legged walking mobile body from the accelerations of the centers of gravity calculated in the third step and the weight of the two-legged walking mobile body. In other words, it is possible to find the acceleration of the region where the acceleration sensor is attached by the output of the acceleration sensor and to find a relative acceleration of the center-of-gravity to a predetermined reference point (the origin or the like of the coordinate system fixed to the predetermined region) of the two-legged walking mobile body considered as a reference of the location by the time series of the center-of-gravity location of the two-legged walking mobile body. Therefore, it is possible to calculate the acceleration of the center-of-gravity from at least the output of the acceleration sensor and the center-of-gravity location of the two-legged walking mobile body.

Moreover, the first feature of the present invention further comprises a fifth step of sequentially calculating components around the predetermined axis of a total rate of change of angular momentum, which is a time rate of change of an total angular momentum of the two-legged walking mobile body, by using at least the rigid link model, the displacements of the joints measured in the first step, the center-of-gravity locations calculated in the second step, the accelerations of the centers of gravity calculated in the third step, and the outputs of an angular velocity sensor attached to the two-legged walking mobile body. In other words, the total rate of change of angular momentum equals to the value obtained by adding the total sum of the rates of change of angular momentum around the center-of-gravity of the respective rigid elements of the rigid link model to the total sum of the rates of change of angular momentum around the center-of-gravity of the two-legged walking mobile body generated by translation acceleration motions of the centers of gravity of the rigid elements. These rates of change of angular momentum can be obtained by using at least the rigid link model, the measured joint displacements (the displacements of the joint elements), the center-of-gravity locations of the two-legged walking mobile body, the accelerations of the centers of gravity, and the outputs of the angular velocity sensor. Therefore, the components around the predetermined axis of the total rate of change of angular momentum can be calculated by finding the total sum of the above rates of change of angular momentum (the total sum of at least the components around the predetermined axis of the rates of change of angular momentum). In this instance, the center-of-gravity locations of the rigid elements (the locations on the rigid elements) of the rigid link model and moments of inertia of the rigid elements are previously set.

The first feature of the present invention further comprises a sixth step of sequentially grasping floor reaction force acting points, each of which is a point of action of a floor reaction force acting on the each landing leg of the two-legged walking mobile body. The floor reaction force acting point is equivalent to the center of the floor reaction force acting on the each leg, which can be considered to be a point that the floor reaction forces distributed over the supporting surface of the leg are focused on (more accurately, the center-of-gravity of the floor reaction forces distributed over the supporting surface). In this case, there are various methods for grasping the floor reaction force acting point (grasping the position of the floor reaction acting point) and any of them can be used. As an example thereof, there is the method disclosed in the patent document 1 or the method suggested earlier by this applicant in the PCT International Application No. PCT/JP2004/004457.

In addition to the first to sixth steps, the first feature of the present invention further comprises: a seventh step of determining the direction of the component vector on the plane perpendicular to the predetermined axis of the floor reaction force acting on the each landing leg in such a way that the direction of the moment generated around the center-of-gravity of the two-legged walking mobile body by the total sum of the component vectors on the plane perpendicular to the predetermined axis of the floor reaction force acting on the each landing leg is coincident with the direction of the component around the predetermined axis of the total rate of change of angular momentum by using the center-of-gravity location calculated in the second step, the component vector of the total reaction force calculated in the fourth step, the component of the total rate of change of angular momentum calculated in the fifth step, and the floor reaction force acting point grasped in the sixth step; and an eighth step of using the direction of the component vector of the floor reaction force determined in the seventh step and the component vector of the total reaction force calculated in the fourth step to calculate an estimated value of the component vector on the plane perpendicular to the predetermined axis of the floor reaction force acting on the each leg in such a way that the vector of the total sum of the component vector on the plane perpendicular to the predetermined axis of the floor reaction force acting on each of the both legs equals the component vector on the plane of the total floor reaction force, by regulating the direction of the component vector on the plane perpendicular to the predetermined axis of the floor reaction force acting on each of the landing legs to the direction determined in the seventh step if the two-legged walking mobile body is in the two-leg supporting state, and to calculate an estimated value of the component vector on the plane perpendicular to the predetermined axis of the floor reaction force acting on the landing leg in such a way that the magnitude of the component vector on the plane perpendicular to the predetermined axis of the floor reaction force acting on the leg equals the magnitude of the component vector on the plane of the total floor reaction force, by regulating the direction of the component vector on the plane perpendicular to the predetermined axis of the floor reaction force acting on the landing leg to the direction determined in the seventh step if the two-legged walking mobile body is in the one-leg supporting state.

In other words, if external forces acting on the two-legged walking mobile body are only the floor reaction forces, the total rate of change of angular momentum equals to the moment generated around the center-of-gravity of the two-legged walking mobile body by the total floor reaction force (the total sum of the floor reaction forces acting on the respective legs) (or the total sum of the moments generated around the center-of-gravity of the two-legged walking mobile body by the floor reaction forces acting on the respective legs). The total rate of change of angular momentum and the moment are vectors and therefore the equality between them means that they are equal in both magnitude and direction. In this case, the moment generated around the center-of-gravity of the two-legged walking mobile body by the floor reaction force acting on the each leg depends upon the direction of the floor reaction force (the direction of the line of action of the floor reaction force). For example, if the line of action of the floor reaction force acting on the each leg is a straight line having the direction passing through the center-of-gravity of the two-legged walking mobile body from the floor reaction force acting point, the moment generated around the center-of-gravity of the two-legged walking mobile body by the floor reaction force is zero, while if the line of action is a straight line having the direction not passing through the center-of-gravity of the two-legged walking mobile body, the floor reaction force generates a moment each having a certain magnitude around the center-of-gravity of the two-legged walking mobile body. Therefore, the dynamic condition that the total rate of change of angular momentum equals to the total sum of the moments generated around the center-of-gravity of the two-legged walking mobile body can be a condition that may restrict the direction of the floor reaction force acting on the each leg. Incidentally, focusing on the component around the predetermined axis of the total rate of change of angular momentum, the above condition is equivalent to the condition (hereinafter, referred to as the condition 1 in this specification) that the component vector around the predetermined axis of the moment generated around the center-of-gravity of the two-legged walking mobile body by the component vector perpendicular to the predetermined axis of the total floor reaction force (or the total sum of the moments generated around the center-of-gravity of the two-legged walking mobile body by the component vectors perpendicular to the predetermined axis of the floor reaction forces acting on the respective legs) equals to the component around the predetermined axis of the total rate of change of angular momentum.

Accordingly, in the first feature of the present invention, the condition 1 is considered in the seventh step. Thereby, the direction of the component vector on a plane perpendicular to the predetermined axis of the floor reaction force acting on the each landing leg is determined in such a way that the direction of the moment generated around the center-of-gravity of the two-legged walking mobile body by the vector of the total sum of the component vectors on the plane perpendicular to the predetermined axis of the floor reaction forces acting on the landing legs is coincident with the direction of the component around the predetermined axis of the total rate of change of angular momentum. The direction of the component vector can be determined by using the center-of-gravity location of the two-legged walking mobile body, the component vector on the plane perpendicular to the predetermined axis of the total floor reaction force, the component around the predetermined axis of the total rate of change of angular momentum, and the floor reaction force acting point.

When the direction of the component vector of the floor reaction force acting on the each leg is determined in this manner, it becomes possible to specify the component vector (the two-dimensional vector having a magnitude and a direction) on the plane perpendicular to the predetermined axis of the floor reaction force acting on each of the legs in the two-leg supporting state of the two-legged walking mobile body, by the condition (hereinafter, referred to as the condition 2 in this specification) that the total sum of the component vectors on the plane perpendicular to the predetermined axis of the floor reaction forces acting on the respective legs equals to the component vector on the plane of the total floor reaction force. Incidentally, the term "equal" in the condition 2 means that they are equal to each other in both magnitude and direction.

In the one-leg supporting state of the two-legged walking mobile body, it becomes possible to specify the component vector (the two-dimensional vector having a magnitude and a direction) on the plane perpendicular to the predetermined axis of the floor reaction force by the condition (hereinafter, referred to as the condition 3 in this specification) that the magnitude of the component vector on the plane perpendicular to the predetermined axis of the floor reaction force acting on the landing leg is coincident with the magnitude of the component vector on the plane of the total floor reaction force.

Therefore, in the first feature of the present invention, in the eighth step, an estimated value of the component vector on the plane perpendicular to the predetermined axis of the floor reaction force acting on the each leg in such a way as to satisfy the condition 2 while regulating the direction of the component vector on the plane perpendicular to the predetermined axis of the floor reaction force acting on each of the legs to the direction determined in the seventh step in the two-leg supporting state, and an estimated value of the component vector on the plane perpendicular to the predetermined axis of the floor reaction force acting on the landing leg in such a way as to satisfy the condition 3 while regulating the direction of the component vector on the plane perpendicular to the predetermined axis of the floor reaction force acting on the landing leg in the one-leg supporting state. In this case, the estimated value can be calculated by using the direction of the component vector of the floor reaction force determined in the seventh step and the component vector of the total floor reaction force calculated in the fourth step, independently of whether in the two-leg supporting state or the one-leg supporting state.

According to the first feature of the present invention, the total rate of change of angular momentum generally does not change suddenly in direction and magnitude. Therefore, by determining the direction of the floor reaction force in consideration of the total rate of change of angular momentum, it is possible to prevent the situation in which the direction of the estimated value of the floor reaction force calculated in the eighth step changes suddenly or fluctuates. In other words, it enables a smooth change in the direction of the estimated value of the floor reaction force. Consequently, according to the first feature of the present invention, it is possible to find the estimated value of the floor reaction force that changes smoothly and continuously.

In the first feature of the present invention, preferably the seventh step includes the steps of: calculating a moment arm length regulating the relationship between the component vector on the plane perpendicular to the predetermined axis of the total floor reaction force and the moment generated around the center-of-gravity of the two-legged walking mobile body by the component vector by using the component vector of the total floor reaction force calculated in the fourth step and the component of the total rate of change of angular momentum calculated in the fifth step; and determining the direction of the component vector on the plane perpendicular to the predetermined axis of the floor reaction force acting on the each landing leg in such a way that the line of action on the plane perpendicular to the predetermined axis of the floor reaction force acting on the each landing leg is tangent to a circle whose center is the center-of-gravity of the two-legged walking mobile body and having a radius equal to the moment arm length and that the direction of the moment generated around the center-of-gravity of the two-legged walking mobile body by the total sum of the component vectors on the plane perpendicular to the predetermined axis of the floor reaction forces acting on the landing legs is coincident with the direction of the component around the predetermined axis of the total rate of change of angular momentum (a second feature of the present invention).

In other words, the magnitude of the moment generated around the center-of-gravity of the two-legged walking mobile body by the component vector on the plane perpendicular to the predetermined axis of the total floor reaction force is equal to a value obtained by multiplying the magnitude of the component vector on the plane perpendicular to the predetermined axis of the total floor reaction force by a moment arm length having a certain value. The moment arm length has a meaning of a distance between the line of action of the component vector on the plane perpendicular to the predetermined axis of the total floor reaction force and the center-of-gravity of the two-legged walking mobile body. Then, the line of action of the component vector on the plane perpendicular to the predetermined axis of the floor reaction force acting on the each landing leg can be thought to be tangent to the circle whose center is the center-of-gravity of the two-legged walking mobile body and having a radius equal to the moment arm length. Thereby, the direction of the line of action can be regulated.

Accordingly, in the second feature of the present invention, the moment arm length is calculated, first, by using the component vector of the total floor reaction force calculated in the fourth step and the component of the total rate of change of angular momentum calculated in the fifth step. In this case, to find the moment arm length, the magnitude of the component vector on the plane perpendicular to the predetermined axis of the total floor reaction force may be used and the magnitude is hard to be affected by the fluctuation of the acceleration of the center-of-gravity of the two-legged walking mobile body calculated in the second and third steps. It is because the fluctuation in the magnitude of the total floor reaction force is low even if the direction of the total floor reaction force calculated in the fourth step is changed by a fluctuation in the acceleration of the center-of-gravity of the two-legged walking mobile body with the motion of the two-legged walking mobile body, since the component balanced with a gravity force (the component in the vertical direction) acting on the two-legged walking mobile body of the total floor reaction force is relatively large in comparison with the component balanced with the inertia force generated by the motion of the two-legged walking mobile body. Then, in the second feature of the present invention, the direction of the component vector on the plane perpendicular to the predetermined axis of the floor reaction force acting on the each landing leg by using the moment arm length calculated as described above, the center-of-gravity location calculated in the second step, and the floor reaction force acting point grasped in the sixth step. In this case, the direction of the component vector on the plane perpendicular to the predetermined axis of the floor reaction force acting on the each landing leg in such a way that the line of action on the plane perpendicular to the predetermined axis of the floor reaction force acting on the each landing leg is tangent to the circle whose center is the center-of-gravity of the two-legged walking mobile body and having the radius equal to the moment arm length and that the direction of the moment generated around the center-of-gravity of the two-legged walking mobile body by the total sum of the component vectors on the plane perpendicular to the predetermined axis of the floor reaction forces acting on the landing legs is coincident with the direction of the component around the predetermined axis of the total rate of change of angular momentum. Thereby, it is possible to preferably determine the direction of the component vector on the plane perpendicular to the predetermined axis of the floor reaction forces not causing a sudden change.

In the first and second feature of the present invention, the predetermined axis preferably includes at least an axis extending substantially in the right/left direction of the two-legged walking mobile body (a third feature of the present invention). More specifically, for example, a joint moment acting on a joint of the leg has a large moment component around the axis extending substantially in the right/left direction of the two-legged walking mobile body. Therefore, when estimating the moment, it is particularly desirable to estimate the component vector of the floor reaction force on the plane perpendicular to the axis extending substantially in the right/left direction of the two-legged walking mobile body. Accordingly, by getting at least the axis extending substantially in the right/left direction of the two-legged walking mobile body into the predetermined axis, it becomes possible to estimate the component vector of the floor reaction force, which is important for estimating the joint moment around the axis in the right/left direction.

In the third feature of the present invention, however, if the distance between feet in the forward and backward direction is relatively short when the two-legged walking mobile body is in the two-leg supporting state, the direction of the component vector on the plane perpendicular to the axis extending in the right/left direction of the floor reaction force determined in the seventh step is substantially the same in the both legs. In such a case, it is hard to calculate the estimated value of the component vector on the plane perpendicular to the axis extending in the right/left direction of the floor reaction force appropriately in the eighth step. It is because, due to a decrease in the linear independence of the component vector on the plane perpendicular to the axis extending in the right/left direction of the floor reaction force of each of the legs, it becomes hard to determine the component vector on the plane of the floor reaction force of the each leg satisfying the condition 2 uniquely and accurately.

Therefore, in the third feature of the present invention, supposing that a Y axis is defined to be extending substantially in the right/left direction of the two-legged walking mobile body and an XZ plane is defined to be perpendicular to the Y axis, preferably the floor reaction force estimation method further comprises a ninth step of calculating an estimated value of a component vector on the XZ plane of the floor reaction force acting on the each leg in such a way that the component vectors on the XZ plane of the floor reaction force acting on the respective legs are coincident with each other, the magnitude of the vector of the total sum of the component vectors on the XZ plane of the floor reaction forces respectively acting on the legs is coincident with the magnitude of the component vector on the XZ plane of the total floor reaction force calculated in the fourth step, and the direction of the vector of the total sum is coincident with the direction of a straight line passing through an acting point determined according to the floor reaction force acting points of the legs on the XZ plane and tangent to the circle in the two-leg supporting state of the two-legged walking mobile body, wherein, if an anteroposterior distance between feet, which is a distance between feet of the legs in the forward/backward direction of the two-legged walking mobile body, at least in the two-leg supporting state is smaller than a predetermined first threshold value, the estimated value calculated in the ninth step is obtained as a true value of the estimated value of the component vector on the XZ plane of the floor reaction force acting on the each leg, instead of the estimated value calculated in the eighth step (a fourth feature of the present invention).

According to the fourth feature of the present invention, if the anteroposterior distance between feet is smaller than the first threshold value, in other words, if the direction of the component vector of the floor reaction force on the XZ plane, which is determined in the seventh step, is almost the same in the legs, the estimated value of the component vector on the XZ plane of the floor reaction force acting on the each leg is calculated in such a way that the component vector on the XZ plane of the floor reaction force acting on each of the legs is the same in the legs, that the magnitude of the vector of the total sum of the component vectors on the XZ plane of the floor reaction forces acting on the legs is coincident with the magnitude of the component vector on the XZ plane of the total floor reaction force calculated in the fourth step, and that the direction of the vector of the total sum is coincident with the direction of the straight line tangent to the circle passing through the acting point determined according to the floor reaction forces acting points of the legs on the XZ plane. Thereby, even if the anteroposterior distance between feet is small, the estimated value of the component vector of the floor reaction force on the XZ plane can be calculated without any problem. In this case, the magnitude of the component vector on the XZ plane of the floor reaction force acting on each of the legs is ½ times the magnitude of the component vector on the XZ plane of the total floor reaction force.

Moreover, in consideration of the case where the anteroposterior distance between feet is small in the third feature of the present invention, supposing that a Y axis is defined to be extending substantially in the right/left direction of the two-legged walking mobile body and an XZ plane is defined to be perpendicular to the Y axis, the floor reaction force estimation method comprises a ninth step of calculating an estimated value of a component vector on the XZ plane of the floor reaction force acting on the each leg in such a way that the component vectors on the XZ plane of the floor reaction forces acting on the legs are coincident with each other, the magnitude of the vector of the total sum of the component vectors on the XZ plane of the floor reaction forces respectively acting on the legs is coincident with the magnitude of the component vector on the XZ plane of the total floor reaction force calculated in the fourth step, and the direction of the vector of the total sum is coincident with the direction of a straight line passing through an acting point determined according to the floor reaction force acting points of the legs on the XZ plane and tangent to the circle in the two-leg supporting state of the two-legged walking mobile body; and a tenth step of calculating an arithmetic weighted mean value, which is achieved by multiplying the estimated value of the component vector on the XZ plane of the floor reaction force calculated in the eighth step and the estimated value of the component vector on the XZ plane of the floor reaction force calculated in the ninth step by predetermined weighting factors W1 and W2 respectively and then adding them up, for each of the legs and determining the calculated arithmetic weighted mean value of the each leg as a true value of the estimated value of the component on the XZ plane of the floor reaction force acting on the leg. Moreover, more preferably the weighting factors W1 and W2 are set according to the anteroposterior distance between feet in such a way that: the true value of the estimated value of the component vector on the XZ plane of the floor reaction force achieved in the tenth step is coincident with the estimated value calculated in the ninth step if the anteroposterior distance between feet, which is a distance between feet of the both legs in the forward/backward direction of the two-legged walking mobile body in the two-leg supporting state, is smaller than the predetermined first threshold value; the true value of the estimated value of the component vector on the XZ plane of the floor reaction force achieved in the tenth step is coincident with the estimated value calculated in the eighth step if the anteroposterior distance between feet is larger than a second threshold value, which is predetermined to be larger than the first threshold value; and the true value of the estimated value of the component vector on the XZ plane of the floor reaction force achieved in the tenth step is getting closer to the estimated value calculated in the eighth step from the estimated value calculated in the ninth step along with an increase in the anteroposterior distance between feet if the anteroposterior distance between feet is equal to or larger than the first threshold value and equal to or smaller than the second threshold value (a fifth feature of the present invention).

According to the fifth feature of the present invention, if the anteroposterior distance between feet is smaller than the first threshold value in the two-leg supporting state, the true value of the estimated value of the component vector on the XZ plane of the floor reaction force of the each leg, which is achieved in the tenth step, is equal to the estimated value calculated in the ninth step. If the anteroposterior distance between feet is larger than the second threshold value, the true value of the estimated value of the component vector on the XZ plane of the floor reaction force of the each leg, which is achieved in the tenth step, is equal to the estimated value calculated in the eighth step (the estimated value calculated based on the direction determined in the seventh step). Furthermore, if the anteroposterior distance between feet is equal to or larger than the first threshold value and equal to or smaller than the second threshold value, the true value of the estimated value of the component vector on the XZ plane of the floor reaction force of the each leg, which is achieved in the tenth step, is getting closer to the estimated value calculated in the eighth step from the estimated value calculated in the ninth step along with an increase in the anteroposterior distance between feet. Therefore, even where the two-legged walking mobile body moves, for example, in such a way as to change the length of stride gradually in the forward and backward direction, it is possible to prevent a situation of a sudden change in the true value of the estimated value of the component on the XZ plane of the floor reaction force of the each leg in the two-leg supporting state at every step.

In the fifth feature of the present invention, the weighting factors W1 and W2 may be set to 0 and 1, respectively, if the anteroposterior distance between feet is smaller than the first threshold value, W1 and W2 are set to 1 and 0, respectively, if the anteroposterior distance between feet is larger than the second threshold value, and W1 and W2 are set in such a way as to change monotonically along with an increase in the anteroposterior distance between feet (for example, change linearly), while W1 and W2 satisfy the relation represented by W1+W2=1 if the anteroposterior distance between feet is equal to or larger than the first threshold value and equal to or smaller than the second threshold value (a sixth feature of the present invention).

Thereby, the weighting factors W1 and W2 can be preferably set.

Moreover, in the fourth feature and the fifth feature of the present invention, the acting point determined according to the floor reaction force acting points of the legs on the XZ plane may be determined at a middle point (for example, a midpoint) on a line segment between the floor reaction force acting points of the legs on the XZ plane (a seventh feature and an eighth feature of the present invention).

Thereby, in the two-leg supporting state of the two-legged walking mobile body, it becomes possible to appropriately determine the direction of the component vector on the XZ plane of the floor reaction force of the each leg when the anteroposterior distance between feet is small (when the anteroposterior distance between feet is smaller than the first threshold value). It is also possible to determine the position of the arithmetic weighted mean value of the floor reaction force acting point of each of the both legs on the XZ plane and then to set the weighting factor of the arithmetic weighted mean value variably according to the time of day or the like in the two-leg supporting state of the two-legged walking mobile body.

When determining whether or not the anteroposterior distance between feet is larger than the first or second threshold value in the fourth feature and the fifth feature of the present invention, there is no need to always use the value itself of the anteroposterior distance between feet, but it is also possible to use a parameter having a certain correlation with the anteroposterior distance between feet (a parameter whose value changes monotonically in response to the change of the anteroposterior distance between feet).

BRIEF DESCRIPTION OF THE DRAWINGS

The above and other objects, features and advantages of the present invention will become apparent from the following detailed description when taken with the accompanying drawing in which.

DETAILED DESCRIPTION OF THE PREFERRED EMBODIMENTS

Figure 1:
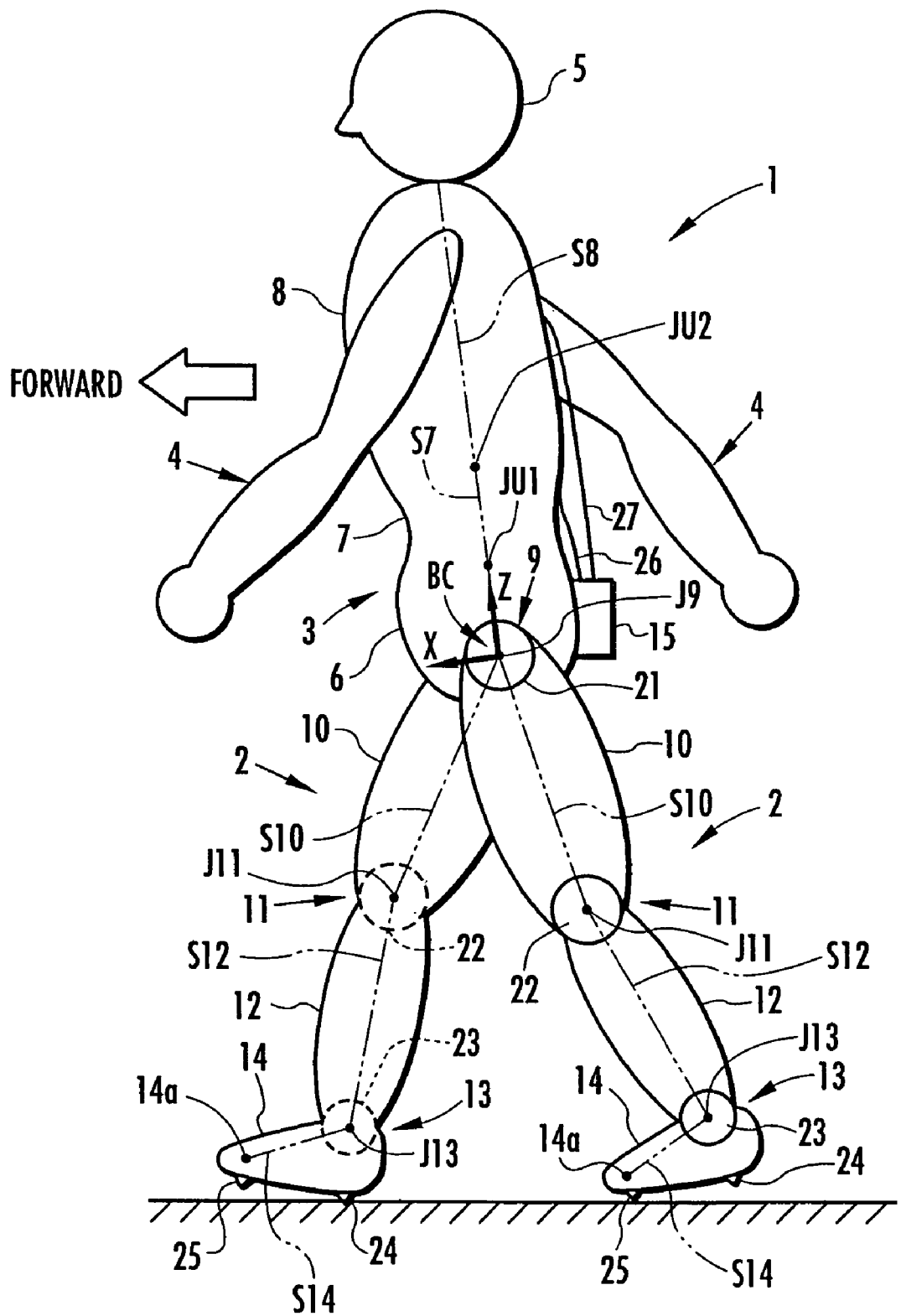
FIG. 1 is a diagram schematically showing a general apparatus configuration in an embodiment to which the present invention is applied to a human being as a two-legged walking mobile body.
Figure 2:
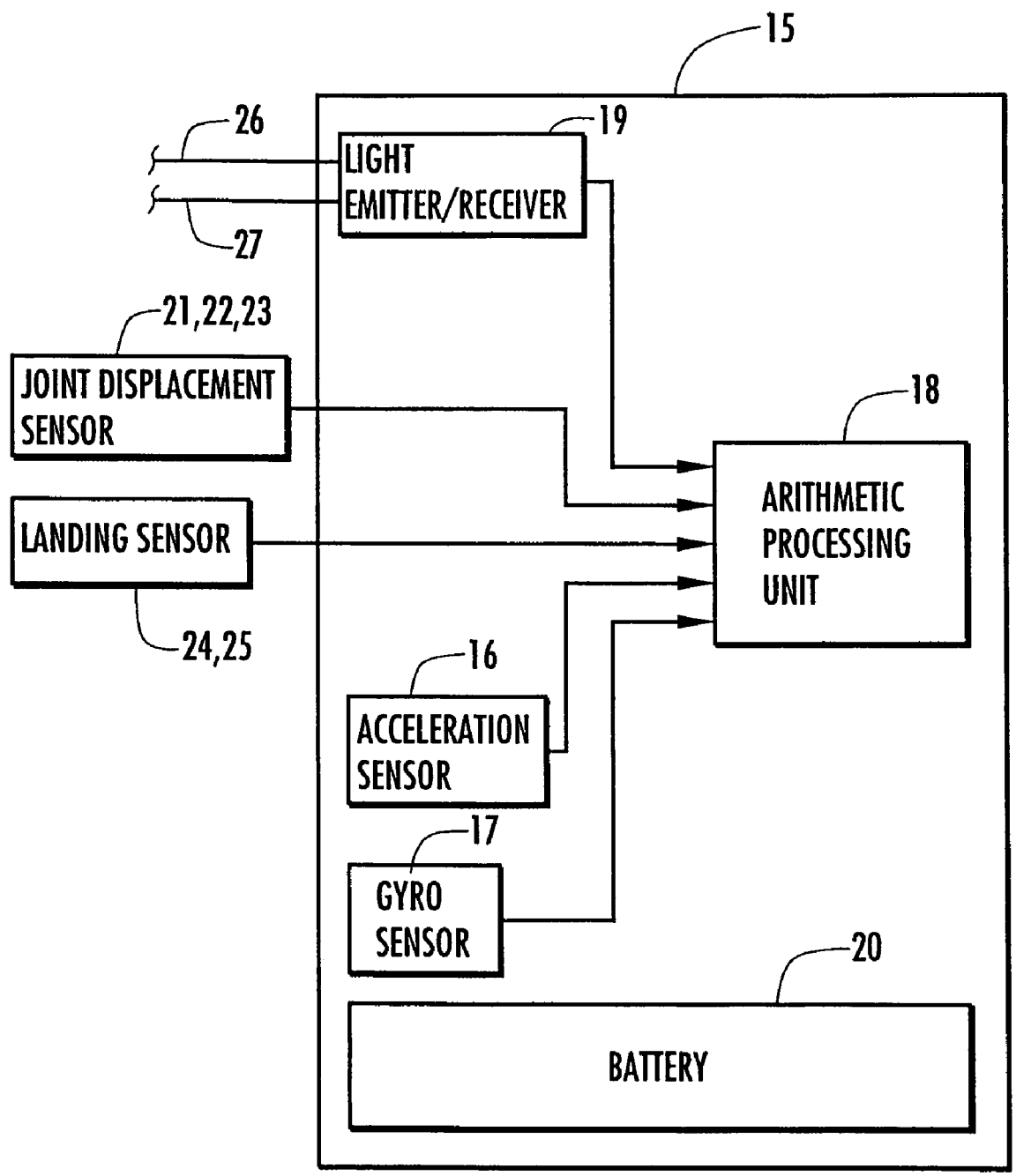
FIG. 2 is a block diagram showing the configuration of a sensor box provided in the apparatus shown in FIG. 1.

A preferred embodiment of the present invention will now be described hereinafter with reference to FIG. 1 to FIG. 17. Referring to FIG. 1, there is schematically shown a general apparatus configuration in an embodiment to which the present invention is applied to a human being as a two-legged walking mobile body. As shown in FIG. 1, the human being 1 has a structure generally divided into a pair of right and left legs 2, 2, a body 3, a pair of right and left arms 4, 4, and a head 5. The body 3 is composed of a waist 6, an abdomen 7, and a chest 8. The waist 6 is coupled to the legs 2, 2 via a pair of right and left hip joints 9, 9 so as to be supported on the both legs 2, 2. Moreover, the arms 4, 4 are extended from the right and left sides of the chest 8 of the body 3 and the head 5 is supported on the upper end of the chest 8. The each leg 2 has a thigh 10 extending from the hip joint 9, a crus 12 extending from the end of the thigh 10 via a knee joint 11, and a foot 14 extending from the end of the crus 12 via an ankle joint 13.

In this embodiment, the human being 1 is equipped with an apparatus as described below to estimate a floor reaction force acting on the each leg 2 of the human being 1 having the above structure or to estimate joint moments acting on the joints 9, 11, and 13 of the each leg 2. More specifically, a sensor box 15 is attached to the back of the waist 6 via a member such as a belt, which is not shown. The sensor box 15 contains an acceleration sensor 16 for detecting an acceleration (a translation acceleration) in the 3-axis direction, a gyro sensor (an angular velocity sensor) 17 for detecting an angular velocity in the 3-axis direction (around 3 axes), an arithmetic processing unit 18 configured by using a microcomputer, a light emitter/receiver 19 for emitting a light to be introduced into optical fibers 26, 27 described later or receiving a feedback light, and a battery 20 as a power supply for each electrical equipment such as the arithmetic processing unit 18, as shown in the block diagram of FIG. 2. The acceleration sensor 16 and the gyro sensor 17 are fixed to the waist 6 via the sensor box 15 so as to move integrally with the waist 6.

Figure 3:
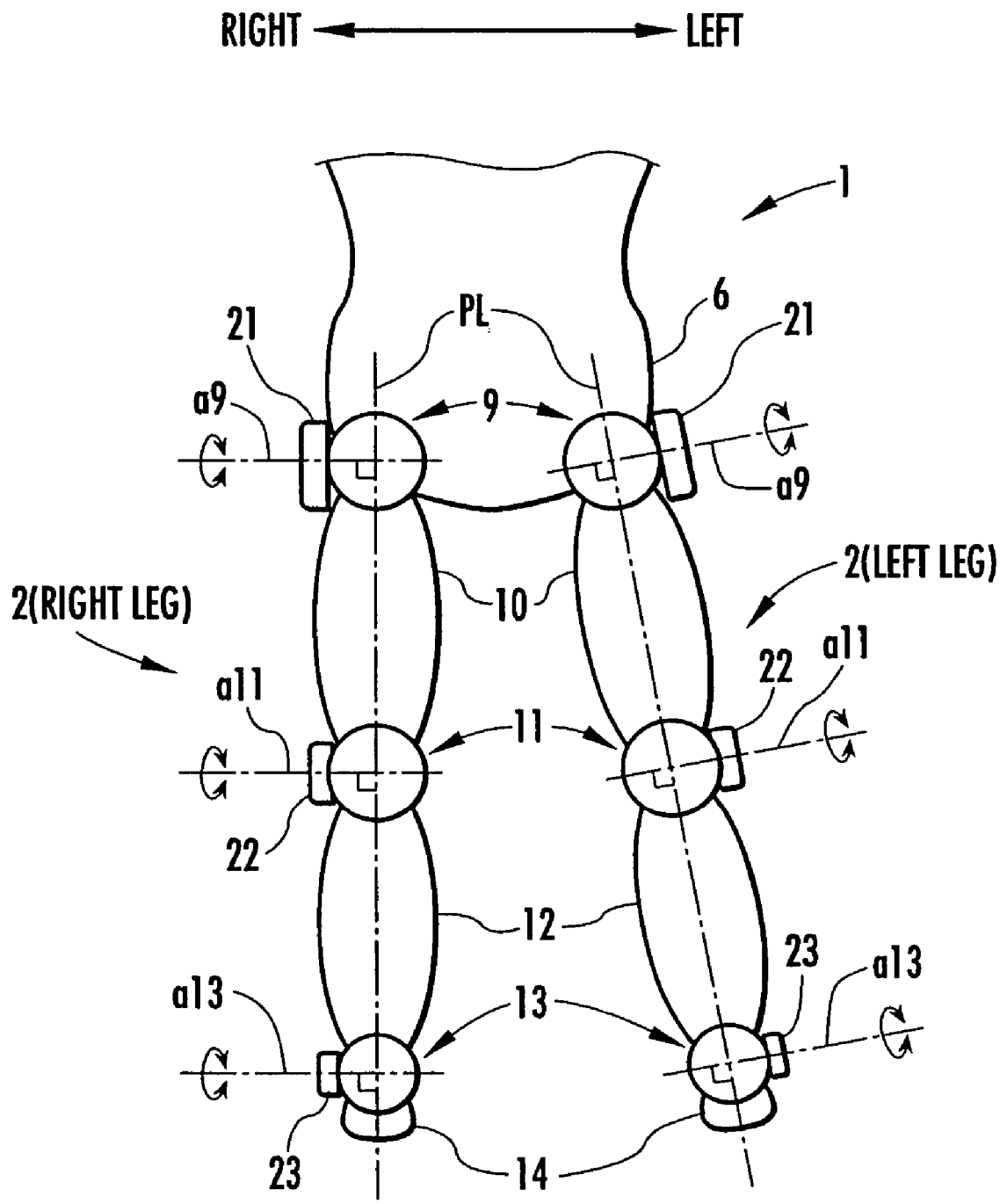
FIG. 3 is a diagram showing a relation between a rotation angle of a joint detected by a joint displacement sensor provided in the apparatus shown in FIG. 1 and a leg plane (a front view of a lower part of the body of the human being)

Joint displacement sensors 21, 22, and 23 for detecting displacements of the respective joints are attached to the regions of the hip joint 9, the knee joint 11, and the ankle joint 13 of the each leg 2 via a member such as a belt, not shown. Among the joint displacement sensors 21, 22, and 23, a displacement detected by the joint displacement sensor 21 on the hip joint 9 is a 3-axis rotation angle (a three-dimensional amount made of a combination of rotation angles around three axes) of the hip joint 9, a displacement detected by the joint displacement sensor 22 of the knee joint 11 is a single-axis rotation angle of the knee joint 11, and a displacement detected by the joint displacement sensor 23 of the ankle joint 13 is a single-axis rotation angle of the ankle joint 13. In this instance, the rotation axis of one of the rotation angles detected by the joint displacement sensor 21 and the rotation axes of rotation angles detected by the joint displacement sensors 22, 23 are, as shown in FIG. 3, axes a9, a11, and a13 substantially perpendicular to the leg plane PL as a plane passing through substantially the center of the hip joint 9, the knee joint 11, and the ankle joint 13 of the each leg 2 equipped with these sensors 21 to 23 as shown in FIG. 3, respectively. FIG. 3 is a front view of a lower part of the body of the human being 1 equipped with the joint displacement sensors 21 to 23 on the legs 2. In FIG. 3, the leg plane PL is perpendicular to the surface of the page of FIG. 3.

In this regard, the leg plane PL is a plane where the substantial center points of the hip joint 9, the knee joint 11, and the ankle joint 13 of the leg 2 exist when the human being 1 bends and stretches the corresponding leg 2 by bending the leg 2 at the knee joint 11. In other words, the leg 2 is bent and stretched with the center points of the joints 9, 11, and 13 positioned substantially on the leg plane PL. Then, for example, if the left leg 2 is abducted by a motion of the hip joint 9 like the left leg 2 shown in FIG. 3, the leg plane PL corresponding to the left leg 2 inclines. The joint displacement sensors 21 to 23 detect rotation angles around the rotation axes a9, a11, and a13 of the joints 9, 11, and 13, respectively, by using a potentiometer or a rotary encoder, for example.

Figure 4:
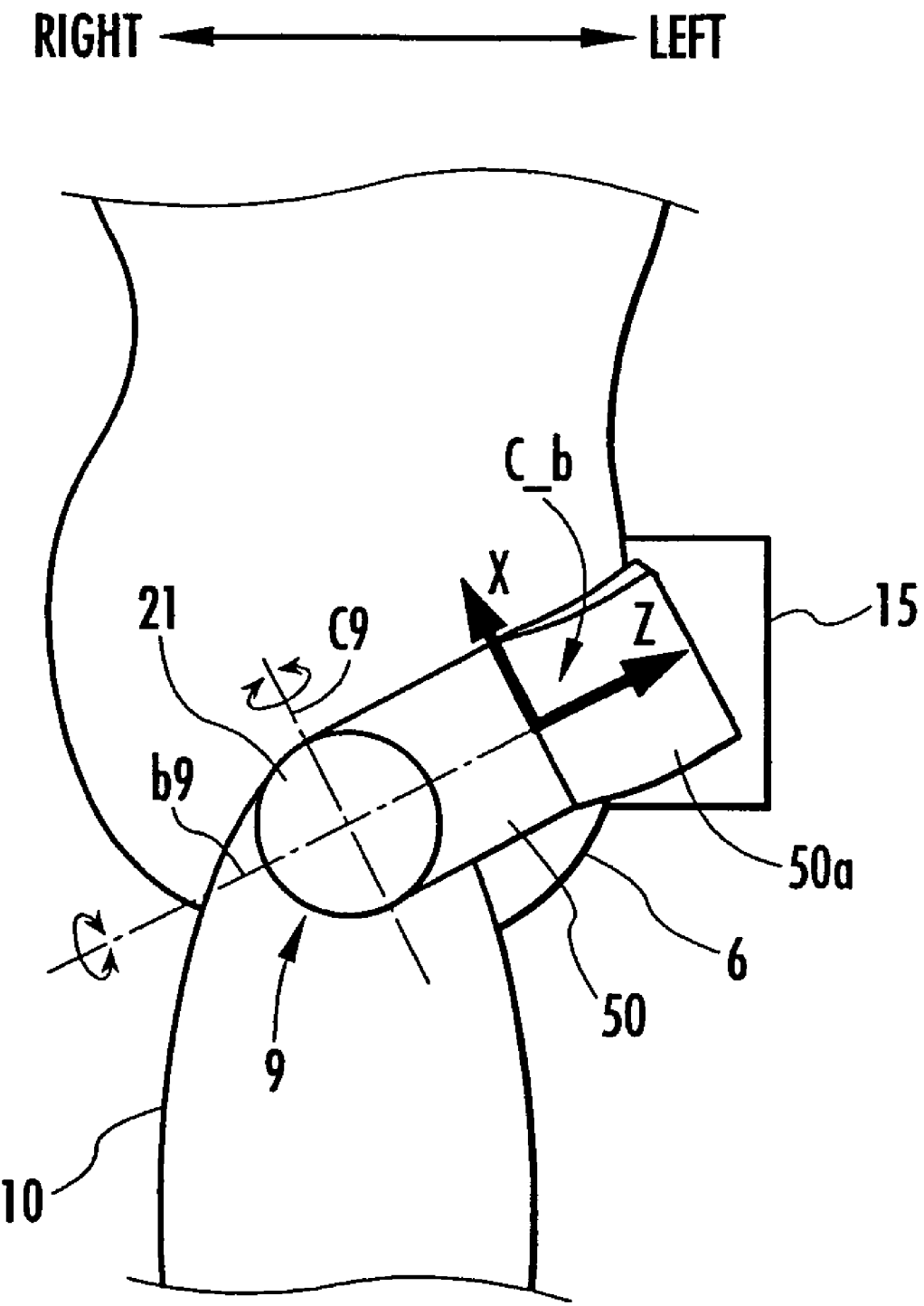
FIG. 4 is a diagram for explaining a detection of the rotation angle of a hip joint performed by the joint displacement sensor of the hip joint in the apparatus shown in FIG. 1 (a side view of a part around the waist of the human being)

Furthermore, rotation angles around other two axes detected by the joint displacement sensor 21 of the hip joint 9 will be described below by referring to FIG. 4. Referring to FIG. 4, there is shown a side view showing a configuration of a part around the waist 6 of the human being 1 equipped with the sensor box 15 and the joint displacement sensor 21. In this embodiment, as shown, the joint displacement sensor 21 is coupled to the sensor box 15 via an elastic member 50 made of rubber or the like in the form of flat plate. The end of the elastic member 50 on the sensor box 15 side is coupled to the sensor box 15 via a hard rigid member 50a extended from the sensor box 15. Then, the joint displacement sensor 21 detects, for example, a rotation angle of the hip joint 9 around a rotation axis b9 in the extending direction of the elastic member 50 (a rotation angle in the direction in which the elastic member 50 is twisted) and a rotation angle of the hip joint 9 around a rotation axis c9 perpendicular to the rotation axis b9 (a rotation angle in the direction in which the elastic member 50 is bent) by using a strain sensor, not shown, for detecting a volume of deformation of the elastic member 50 or a sensor with optical fibers described later. The rotation axes b9 and c9 are parallel to the leg plane PL.

Returning to FIG. 1, two landing sensors 24, 25 are provided on the bottom face of the foot 14 of the each leg 2 (more specifically, the bottom face of a shoe put on the foot 14). Among the landing sensors 24 and 25, the landing sensor 24 is disposed in a place (heel) just under the ankle joint 13 and the landing sensor 25 is disposed in a place (tiptoe) just under the metatarsophalangeal joint 14a of the foot 14 (a joint at the root of the big toe of the foot 14). These landing sensors 24, 25 output ON/OFF signals indicating whether the parts where they are disposed are in contact with the ground. Incidentally, detected outputs from the joint displacement sensors 21, 22, 23 and the landing sensors 24, 25 are input to the arithmetic processing unit 18 of the sensor box 15 via signal lines (not shown).

As shown in FIG. 1, two optical fibers 26, 27 are extended upward from the sensor box 15 along the back face of the body 3 and their points are fixed to the back face of the abdomen 7 and the back face of the chest 8, respectively, via a belt or other member not shown. The optical fibers 26, 27 are components of a detection unit for detecting tilt angles (tilt angles on a sagittal plane of the two-legged walking mobile body) of the abdomen 7 and the chest 8, respectively, relative to the waist 6. The tilt angles of the abdomen 7 and the chest 8 are measured by using the optical fibers 26, 27 in the method described below. The method of measuring the tilt angle of the abdomen 7 using the optical fiber 26 will now be typically described. A light having a predetermined intensity is introduced from the light emitter/receiver 19 (shown in FIG. 2) disposed in the sensor box 5 into the optical fiber 26 and the introduced light is reflected at the end of the optical fiber 26 and returns to the sensor box 15 side. The light emitter/receiver 19 then detects the feedback amount of the light (the intensity of the feedback light). The optical fiber 26 is provided with a plurality of notches (not shown) allowing subtle light leakage disposed at intervals in the longitudinal direction. Therefore, light of the amount according to the tilt angle of the abdomen 7 relative to the waist 6 leaks from the optical fiber 26 via the notches, out of the light introduced into the optical fiber 26. Therefore, the feedback amount of the light to the sensor box 15 side depends upon the tilt angle of the abdomen 7 and the tilt angle of the abdomen 7 relative to the waist 6 is measured by detecting the feedback amount. In other words, the detected outputs of the light emitter/receiver 19 according to the feedback amount of the light of the optical fiber 26 depends upon the tilt angle of the abdomen 7 relative to the waist 6 and it is input to the arithmetic processing unit 18 as a signal indicating the tilt angle. The same applies to the method of measuring the tilt angle of the chest 8 using the optical fiber 27.

The rotation angles of the hip joint 9, the knee joint 11, and the ankle joint 13 detected by the joint displacement sensors 21, 22, and 23 are measured with reference (zero point) to a condition where the human being 1 stands up with a standing posture (the condition is hereinafter referred to as the reference posture condition of the human being 1) with feet 14, 14 directed forward in parallel to each other. The same applies to the tilt angles of the abdomen 7 and the chest 8 detected by using the optical fibers 26, 27.

Figure 5:
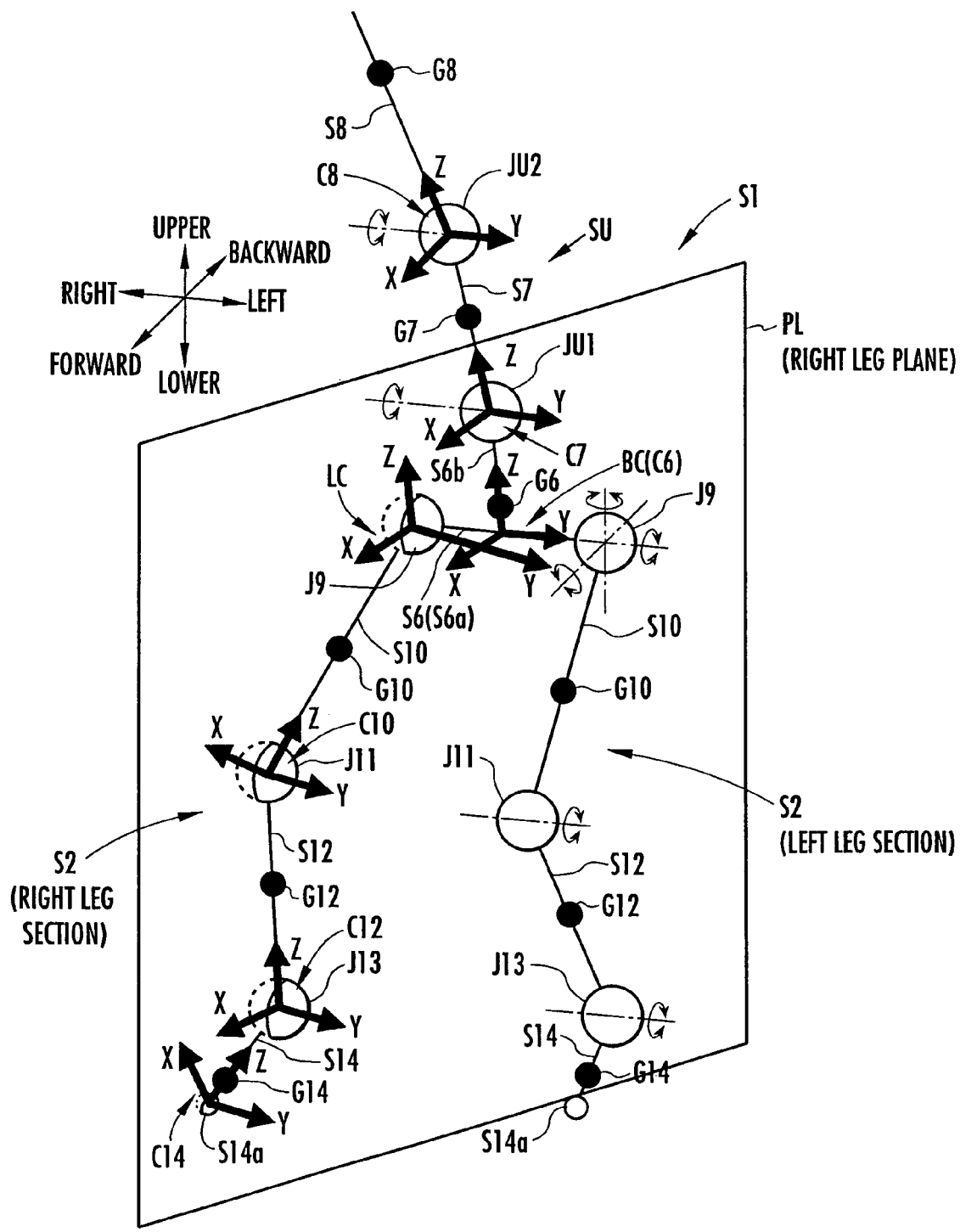
FIG. 5 is a perspective diagram showing a rigid link model, a leg plane, and a coordinate system for use in the embodiment.

Here, the description is given to the rigid link model of the human being 1 and the coordinate system used in this embodiment. Referring to FIG. 5, there are shown the rigid link model S1 and the coordinate system. The rigid link model S1 is also shown in FIG. 1 by using a virtual line. In this embodiment, the rigid link model S1 represents the human being 1 as a link body composed of nine rigid elements and eight joint elements. More specifically, the rigid link model S1 is roughly composed of a pair of leg sections S2, S2 corresponding to the legs 2, 2 of the human being 1 and an upper body SU corresponding to the upper part of the body (the part upper than the waist 6) of the human being 1. The upper body SU is a link body composed by coupling a rigid element S6 corresponding to the waist 6 of the human being 1 and a rigid element S7 corresponding to the abdomen 7 via a joint element JU1 and further coupling a rigid element S7 to a rigid element S8 corresponding to the chest 8 via a joint element JU2. Hereinafter, the rigid elements S6, S7, and S8 are referred to as the waist element S6, the abdomen element S7, and the chest element S8, respectively, and the joint elements JU1 and JU2 are referred to as the lower joint of the upper body JU1 and the upper joint of the upper body JU2, respectively, in some cases.

In this instance, the waist element S6 is in the form of inverted T shape. The lower joint of the upper body JU1 is disposed at the upper end of the waist element S6 and a pair of joint elements J9, J9 corresponding to the pair of hip joints 9, 9 (hereinafter, simply referred to as the hip joint J9 in some cases) of the human being 1 at the horizontal ends of the waist element S6. In other words, the waist element S6 is composed of a portion S6a extending in the direction of a line segment connecting the centers of the hip joints J9, J9 therebetween (right/left direction) and a portion S6b extending substantially upward from the center of the portion S6a toward the lower joint of the upper body JU1. In this regard, the lower joint of the upper body JU1 corresponds to a joint supposed on the backbone of the human being 1 in the vicinity of the border between the waist 6 and the abdomen 7 of the human being 1, and the upper joint of the upper body JU2 corresponds to a joint supposed on the backbone of the human being 1 in the vicinity of the border between the abdomen 7 and the chest 8. Although an actual backbone controlling the bending motion of the body 3 of the human being 1 is composed of a lot of joints, in the rigid link model S1 the bending motion of the upper body SU is made by two joint elements of the lower joint of the upper body JU1 and the upper joint of the upper body JU2. Then, the abdomen element S7 is extending in the direction of a line segment connecting the centers of the lower joint of the upper body JU1 and the upper joint of the upper body JU2 therebetween. The chest element S8 is assumed to be extending from the upper joint of the upper body JU2 to the root of the neck of the human being 1 (more specifically, the region on the backbone in the vicinity of the border between the body 3 and the neck) as shown in FIG. 1.

The each leg section S2 of the rigid link model S1 is configured as a link body wherein a rigid element S10 corresponding to the thigh 10 is coupled to the waist element S6 via the hip joint J9, a rigid element S12 corresponding to the crus 12 is coupled to the rigid element S10 via a joint element J11 corresponding to the knee joint 11, and a rigid element S14 corresponding to the foot 14 is coupled to the rigid element S12 via a joint element J13 corresponding to the ankle joint 13. Hereinafter, the rigid elements S10, S12, and S14 are simply referred to as the thigh element S10, the crus element S12, respectively, and the foot element S14 and the joint elements J11 and J13 are simply referred to as the knee joint J11 and the ankle joint J13, respectively, in some cases.

In this instance, the thigh element S10 and the crus element S12 are each extending in the direction of a line segment connecting the centers of both ends of the respective joint element. Moreover, the foot element S14 has a tip that corresponds to a metatarsophalangeal joint 14a (hereinafter, referred to as the MP joint 14a) of the foot 14 of the human being 1 and is extending from the ankle joint 13 (J13) to the MP joint 14a of the foot 14 as shown in FIG. 1. In the rigid link model S1, the tip of the foot element S14 does not have a function of a joint, but hereinafter the tip is referred to as the MP joint J14a for convenience in some cases.

The rigid elements and the joint elements of the rigid link model S1 configured as described above are capable of making motions in such a way that the mutual positional and posture relationships (directional relationships) are coincident with the mutual positional and posture relationships of the portions of the human being 1 corresponding to the rigid elements and the joint elements by means of the rotary motions of the joint elements. Therefore, in the following description, the rigid elements and the joint elements of the rigid link model S1 are often identified with the regions of the human being 1 corresponding to these elements.

In this instance, the lower joint of the upper body JU1 and the upper joint of the upper body JU2 are assumed to be capable of rotating around three axes. By using one of the three axes as a measurement axis, a rotation around the measurement axis (See arrows (rotation arrows) corresponding to the joint elements JU1, JU2 shown in FIG. 5) is measured with a detection unit composed of the optical fibers 26, 27 and the light emitter/receiver 19. In this embodiment, the measurement axis is parallel to a line segment connecting the centers of the pair of hip joints J9, J9 (in the direction in which the portion S6a of the waist element S6 is extending). The hip joint J9 of the each leg section S2 is assumed to be rotatable around three axes as indicated by arrows (rotation arrows) typically shown in FIG. 5 regarding the hip joint J9 of the left leg section S2. Moreover, the knee joint J11 and the ankle joint J13 of the each leg section S2 are assumed to be rotatable around a single axis as indicated by the arrows (rotation arrows) typically shown in FIG. 5 regarding the joint elements J11, J13 of the left leg section S2. The rotation axis of the knee joint J11 and that of the ankle joint J13 are perpendicular to the leg plane PL passing through the centers of the hip joint J9, the knee joint J11, and the ankle joint J13 (the leg plane for the left leg section S2 is not shown in FIG. 5). The rotating motions of the hip joint J9, the knee joint J11, and the ankle joint J13 of the right leg section S2 are the same as in the left leg section S2. In this instance, the each rotation axis (a single axis) of the knee joint J11 and the ankle joint J13 of the right leg section S2 is perpendicular to the leg plane PL shown correspondingly to the right leg section S2. The each hip joint J9 can rotate around the three axes regarding the both leg sections S2 and therefore can rotate around the axis perpendicular to the leg plane PL corresponding to the each leg section S2.

In the rigid link model S1, the weight, the length (the length in the central axis direction) of the each rigid element and the center-of-gravity location of the each rigid element (the position in the rigid element) are predetermined and then stored in a memory, not shown, in the arithmetic processing unit 18. Black dots G8, G7, G6, G10, G12, and G14 shown in FIG. 5 illustratively indicate the centers of gravity of the chest element S8, the abdomen element S7, the waist element S6, the thigh element S10, the crus element S12, and the foot element S14, respectively. The waist element S6 is in the form of inverted T shape as described above, and therefore the length of the waist element S6 includes the length of the portion S6a and that of the portion S6b.

The weight, the length, and the center-of-gravity location of the each rigid element are basically set so as to be substantially coincident with the weight, the length, and the center-of-gravity location of a rigid equivalent part of the human being 1 corresponding to the each rigid element. For example, the weight, the length, and the center-of-gravity location of the thigh element S10 are substantially the same as the actual weight, length, and center-of-gravity of the thigh 10 of the human being 1. The weight and the center-of-gravity location of the chest element S8 are the weight and the center-of-gravity location of the part including the chest 8, both arms 4, 4, and the head 5 of the human being 1. More specifically, the change in the center-of-gravity location of the chest element S8 accompanying the motion of the both arms 4, 4 (the motion of swinging the arms back and forth) of the human being 1 during walking is relatively small and therefore the center-of-gravity location is maintained at a substantially fixed position of the chest element S8. The center-of-gravity location of the each rigid element is set with the each axis component value of the element coordinate system as a position vector on the element coordinate system, which is described later, fixedly preset to the each rigid element.

While the weight, the length, and the center-of-gravity location of the each rigid element may be basically determined based on the actual measurements of the size or the weight of each part of the human being 1, it is also possible to estimate them on the basis of average statistical data of a human being from the height and the weight of the human being 1. In general, the center-of-gravity location, the weight, and the length of the rigid equivalent part of the human begin 1 corresponding to the each rigid element have a correlation with the height and the weight (the total weight) of a human being, and it is possible to estimate the center-of-gravity location, the weight, and the length of the rigid equivalent part of the human being 1 corresponding to the each rigid element relatively precisely from measurement data of the height and the weight of the human being 1 on the basis of the correlation.

In this embodiment, the weight and the center-of-gravity location are the weight and the center-of-gravity location in the condition where the human being 1 is equipped with the apparatus of this embodiment (the sensor box 15, the joint displacement sensors 21 to 23, and the like). Although the centers of gravity G8, G7, G6, G10, G12, and G14 are shown in such a way as to be located on the central axis of the rigid elements corresponding to them respectively in FIG. 5 for convenience, they are not necessarily located on the central axis, but can exist in the positions deviating from the central axis.

In this embodiment, a coordinate system as described below is preset for the rigid link model S1. More specifically, as shown in FIG. 5, the body coordinate system BC is set with being fixed to the waist element S6. The body coordinate system BC is established as a three-dimensional coordinate system (XYZ coordinate system) whose origin is defined as being the midpoint of a line segment between the centers of the pair of hip joints J11, J11 (the center point of the portion S6a of the waist element S6), whose Y axis is defined as being in the direction of the line segment, whose Z axis is defined as being in the direction from the origin to the center of the lower joint of the upper body JU1, and whose X axis is defined as being in the direction perpendicular to the Y axis and the Z axis. In the reference posture condition of the human being 1, the X axis, the Y axis, and the Z axis of the body coordinate system BC are oriented in the forward/backward direction, the right/left direction, and the vertical direction of the human being 1, respectively, and the XY plane is a horizontal plane. The XZ plane of the body coordinate system BC is equivalent to the sagittal plane of the human being 1.

A leg coordinate system LC is fixed to and set on the leg plane PL corresponding to the each leg 2. In FIG. 5, only the leg coordinate system LC corresponding to the leg plane PL of the right leg section S2 is typically shown for convenience. The leg coordinate system LC is a three-dimensional coordinate system (XYZ coordinate system) whose origin is the center of the hip joint J9 on the leg plane PL, whose Y axis is in the direction perpendicular to the leg plane PL, whose Z axis is in the direction parallel to the axis obtained by projecting the Z axis of the body coordinate system BC onto the leg plane PL, and whose X axis is in the direction perpendicular to the Y axis and the Z axis. The XZ plane of the leg coordinate system LC matches the leg plane PL.

Moreover, an element coordinate system is fixedly set at the each rigid element as indicated by the reference characters C8, C7, C6, C10, C12, and C14, for example. In this embodiment, the element coordinate system C6 of the waist element S6 is defined as being coincident with the body coordinate system BC. Moreover, the element coordinate systems C8, C7, C10, C12, and C14 of the chest element S8, the abdomen element S7, the each thigh element S10, the each crus element S12, and the each foot element S14 are defined as being three-dimensional coordinate systems (XYZ coordinate systems) whose origins are at the respective centers of the upper joint of the upper body JU2, the lower joint of the upper body JU1, the knee joint J11, the ankle joint J13, and the MP joint J14. In other words, regarding the each leg section S2, the element coordinate systems C10, C12, and C14 of the rigid elements S10, S12, and S14 are each set with the origin at the center of the joint element on the farther side from the waist element S6 (on the closer side to the tip of the leg section S2) of the joint elements at both ends of each of the rigid elements S10, S12, and S14. Furthermore, the element coordinate systems C7 and C8 of the abdomen element S7 and the chest element S8 of the upper body SU are each set with the origin at the center of the joint element on the closer side to the waist element S6 of the joint elements at both ends of each of the abdomen element S7 and the chest element S8. Although the element coordinate systems C10, C12, and C14 are shown only regarding the right leg section S2 in FIG. 5 for convenience of illustration, the element coordinate systems are also set for the left leg section S2, similarly to the right leg section S2.

Moreover, the element coordinate systems C8 and C7 are set with the Z axis in the extending direction (the central axis direction) of the chest element S8 and the abdomen element S7, respectively, and with the Y axis in the same direction as the Y axis of the body coordinate system BC. The element coordinate systems C10, C12, and C14 are set with the Z axis in the extending direction (the central axis direction) of the thigh element S10, the crus element S12, and the foot element S14, respectively, and with the Y axis in the normal line direction of the leg plane PL (the direction parallel to the Y axis of the leg coordinate system LC). In all element coordinate systems C8, C7, C10, C12, and C14, the X axis is set in the direction perpendicular to the Y axis and the Z axis. In the following description, the element coordinate systems C8, C7, C6, C10, C12, and C14 are referred to as the chest coordinate system C8, the abdomen coordinate system C7, the waist coordinate system C6, the thigh coordinate system C10, the crus coordinate system C12, and the foot coordinate system C14, respectively, in some cases.

The element coordinate systems C8, C7, C10, C12, and C14 need not be necessarily set as described above only if they are fixed to the corresponding rigid elements, but can be set with an arbitrary origin or arbitrary directions of axes. Moreover, the origin of the leg coordinate system LC may be deviated from the center of the hip joint J9 or the body coordinate system BC may be fixed to or set in a region other than the waist element S6. How to set the coordinate systems may be basically arbitrary and thus a wide variety of setting modes can be employed. Therefore, how to set the coordinate systems in this embodiment is illustrative only.

Figure 6:
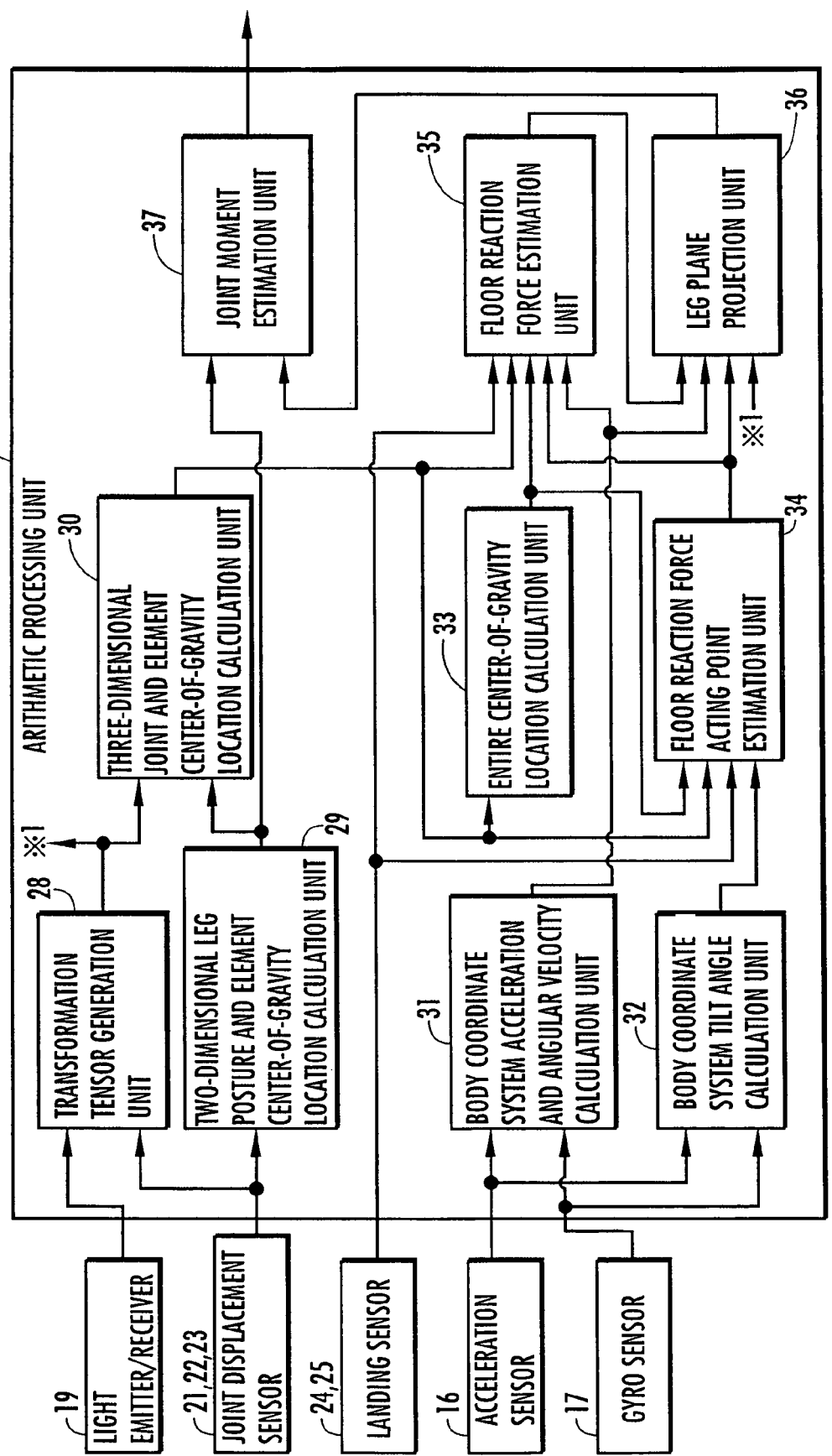
FIG. 6 is a block diagram showing functional devices of an arithmetic processing unit shown in FIG. 2.

FIG. 6 is a block diagram showing the arithmetic processing functions of the arithmetic processing unit 18. As shown in this diagram, the arithmetic processing unit 18 includes: a transformation tensor generation unit 28 for generating a transformation tensor for use in a coordinate transformation described later on the basis of detected outputs of the joint displacement sensor 21 and the light emitter/receiver 19 in the each hip joint 9; a two-dimensional leg posture and element center-of-gravity location calculation unit 29 for calculating locations of the joint elements on the each leg plane PL of the rigid link model S1 (the joint elements of the leg section S2 corresponding to the leg plane PL), postures (tilt angles) of the rigid elements, and the center-of-gravity locations of the rigid elements on the basis of detected outputs of the joint displacement sensors 21, 22, and 23; a three-dimensional joint and element center-of-gravity location calculation unit 30 for calculating three-dimensional position vector values (axis component values) on the body coordinate system BC of the joint elements and the centers of gravity of the rigid elements of the rigid link model S1 by using the transformation tensor generated by the transformation tensor generation unit 28 and the locations and postures calculated by the two-dimensional leg posture and element center-of-gravity location calculation unit 29; a body coordinate system acceleration and angular velocity calculation unit 31 for calculating values of the acceleration vector (translation acceleration) and the angular velocity vector of the origin of the body coordinate system BC (axis component values on the body coordinate system BC) on the basis of detected outputs of the acceleration sensor 16 and the gyro sensor 17; and a body coordinate system tilt angle calculation unit 32 for calculating a tilt angle relative to the vertical direction of the body coordinate system BC on the basis of detected outputs of the acceleration sensor 16 and the gyro sensor 17.

Moreover, the arithmetic processing unit 18 includes an total center-of-gravity location calculation unit 33 for calculating a value of the position vector of the total center-of-gravity (the total center-of-gravity of the human being 1) of the rigid link model S1 on the body coordinate system BC by using the position vector values of the centers of gravity of the rigid elements calculated by the three-dimensional joint and element center-of-gravity location calculation unit 30.

Furthermore, the arithmetic processing unit 18 includes: a floor reaction force acting point estimation unit 34 for calculating a value (a axis component value) on the body coordinate system BC of the position vector of the acting point of the floor reaction force (a vector of a translation floor reaction force) (hereinafter, simply referred to as the floor reaction force acting point) acting on each landing leg 2 by using the position vector values of the each ankle joint J13 and the each MP joint J14a calculated by the three-dimensional joint and element center-of-gravity location calculation unit 30, the tilt angle of the body coordinate system BC calculated by the body coordinate system tilt angle calculation unit 32, the position vector value of the total center-of-gravity calculated by the total center-of-gravity location calculation unit 33, and the detected outputs of the landing sensors 24, 25; and a floor reaction force estimation unit 35 for estimating a value (a axis component value) on the body coordinate system BC of the floor reaction force (a vector of the translation floor reaction force) acting on the legs 2, 2 of the human being 1 by using the position vector values of the joint elements and the centers of gravity of the rigid elements calculated by the three-dimensional joint and element center-of-gravity location calculation unit 30, the position vector value of the total center-of-gravity calculated by the total center-of-gravity location calculation unit 32, the values of the acceleration vector and the angular velocity vector of the origin of the body coordinate system BC calculated by the body coordinate system acceleration and angular velocity calculation unit 31, the detected outputs of the landing sensors 24, 25, and the position vector value of the floor reaction force acting point calculated by the floor reaction force acting point estimation unit 34.

Still further the arithmetic processing unit 18 includes: a leg plane projection unit 36 for projecting the floor reaction force (vector) value calculated by the floor reaction force estimation unit 35, the position vector value of the floor reaction force acting point calculated by the floor reaction force acting point estimation unit 34, and the acceleration vector and angular velocity vector values calculated by the body coordinate system acceleration and angular velocity calculation unit 31 onto the leg plane PL corresponding to the each leg by using the transformation tensor generated by the transformation tensor generation unit 28; and a joint moment estimation unit 37 for estimating joint moments acting on the ankle joint 13, the knee joint 11, and the hip joint 9 of the each leg 2 by using the values (two-dimensional quantities) obtained by the projection and the locations and postures calculated by the two-dimensional leg posture and element center-of-gravity location calculation unit 29.

Although the details are described later, the arithmetic processing unit 18 sequentially performs the arithmetic processing of the aforementioned units 28 to 37 each in a predetermined arithmetic processing period and finally calculates the estimated values of the joint moments sequentially by using the joint moment estimation unit 37 in each arithmetic processing period.

Subsequently, the operation of the apparatus in this embodiment will be described in conjunction with detailed arithmetic processing of the respective units of the arithmetic processing unit 18. In the following description, generally the transformation tensor for coordinate-transforming a vector quantity from a certain coordinate system Ca to another coordinate system Cb, namely, a tensor for transforming a vector quantity represented by a component value of the coordinate system Ca to a vector quantity represented by a component value of the coordinate system Cb is denoted by R(Ca→Cb). Furthermore, a position vector of a point P or a region P viewed on the coordinate system Ca is denoted by U(P/Ca). Still further, a vector A of an applied force, an acceleration, or other physical quantity of an object Q or a region Q, which is represented by a axis component value of the coordinate system Ca is denoted by A(Q/Ca). In this case, when representing a axis component value on the coordinate system Ca of the position vector U(P/Ca) or the physical quantity vector A(Q/Ca), the name of each coordinate axis x, y, or z is added in the denotation. For example, the X axis component of the position vector U(P/Ca) is denoted by U(P/Ca)x. Furthermore, when representing a pair of two axis component values (two-dimensional vector) on the coordinate system Ca of the position vector U(P/Ca) or the physical quantity vector A(Q/Ca), the names of the two coordinate axes are added in the denotation. For example, a two-dimensional vector made of a pair of an X-axis component and a Z-axis component of the vector A(Q/Ca) (a component vector on a plane perpendicular to the Y axis (the Y axis of the coordinate system Ca) of the vector A(Q/Ca)) is denoted by A(Q/Ca)x,z. If the coordinate system focused on is obvious, the denotation of the coordinate system Ca is omitted in some cases.

Moreover, the element coordinate systems C8, C7, C6, C10, C12, and C14 are sometimes referred to as C_chest, C_abdomen, C_waist, C_thigh, C_crus, and C_foot by using the names of the regions corresponding to them, respectively. It is assumed that the same applies to the rigid elements S8, S7, S6, S10, S12, and S14 and the centers of gravity G8, G7, G6, G10, G12, and G14 of the rigid elements S. For example, the waist element S6 and its center-of-gravity G6 are sometimes denoted by S_waist and G_waist, respectively. Regarding denotations related to the thigh 10, the crus 12, and the foot 14, "right" or "left" is further added in the denotation if the difference between right and left need be indicated. For example, the right thigh element S10 is sometimes referred to as an S_right thigh. Moreover, the hip joint J9, the knee joint J11, the ankle joint J13, and the MP joint J14a are sometimes referred to as J_hip, J_knee, J_ankle, and J_MP, respectively. If there is a need for indicating the difference between right and left, the term "right" or "left" is further added in the denotation similarly to the above.

The arithmetic processing unit 18 accepts detected outputs of the joint displacement sensors 21, 22, and 23, the light emitter/receiver 19, the acceleration sensor 16, and the gyro sensor 17 via an A/D converter, which is not shown, and accepts detected outputs (ON/OFF signals) of the landing sensors 24, 25 each in a predetermined arithmetic processing period. It then sequentially performs the arithmetic processing of the transformation tensor generation unit 28, the two-dimensional leg posture and element center-of-gravity location calculation unit 29, and the three-dimensional joint and element center-of-gravity location calculation unit 30, first.

The arithmetic processing of the transformation tensor generation unit 28 includes generating a transformation tensor R(LC→BC) for performing a coordinate transformation of a vector quantity between the leg coordinate system LC corresponding to each leg plane PL and the body coordinate system BC and transformation tensors R(C_abdomen→BC) and R(C_chest→BC) for performing a coordinate transformation of a vector quantity between each of the element coordinate system C7 of the abdomen element S7 and the element coordinate system C8 of the chest element S8 and the body coordinate system BC.

The transformation tensor R(LC→BC) represents the direction of a normal vector on the leg plane PL viewed on the body coordinate system BC. In this embodiment, the transformation tensor R(LC→BC) is calculated by the following formula (1), using rotation angles α and β around the respective rotation axes b9 and c9 (See FIG. 4) detected by the joint displacement sensor 21 of the hip joint 9:

$$R(LC \to BC) = R(C\_b \to BC) \times R(LC \to C\_b) \qquad (1)$$

subject to:

$$R(LC \to C\_b) = \begin{bmatrix} 1 & 0 & 0 \\ 0 & \cos\beta & -\sin\beta \\ 0 & \sin\beta & \cos\beta \end{bmatrix} \times \begin{bmatrix} \cos\alpha & -\sin\alpha & 0 \\ \sin\alpha & \cos\alpha & 0 \\ 0 & 0 & 1 \end{bmatrix}$$

In this regard, C_b in the formula (1) is a three-dimensional coordinate system whose origin is at one end of the elastic member 50 on the sensor box 15 side (one end fixed to the rigid member 50a extended from the sensor box 15), whose Z axis and X axis are in the direction of the rotation axes b9 and c9, respectively, as shown in FIG. 4. The Y axis of the coordinate system C_b is in the direction perpendicular to the surface of the page of FIG. 4 and in the direction perpendicular to the leg plane PL in the reference posture condition of the human being 1. Furthermore, R(LC→C_b) in the formula (1) is a tensor representing the direction of the normal vector of the leg plane PL viewed on the coordinate system C_b. Still further, R(C_b→BC) in the formula (1) is a tensor for coordinate-transforming the vector quantity viewed on the coordinate system C_b to a vector quantity viewed on the body coordinate system BC. In this instance, the coordinate system C_b is fixed to the waist 6 via the rigid member 50a and the sensor box 15 and therefore has constant positional and posture relationship to the body coordinate system BC. Therefore, the tensor R(C_b→BC) is a constant value (fixed value) and therefore preset and stored in the memory of the arithmetic processing unit 18 when the apparatus of this embodiment is attached to the human being 1. Accordingly, the transformation tensor R(LC→BC) is calculated by the above formula (1) using the rotation angles α and β around the rotation axes b9 and c9, respectively, detected by the joint displacement sensor 21 of the hip joint 9. The transformation tensor R(LC→BC) is calculated for each of the right and left legs 2, individually.

The transformation tensor R(C_abdomen→BC) and R(C_chest→BC) are generated as described below. First, tilt angles of the abdomen element S7 and the chest element S8 relative to the waist element S6 of the rigid link model S1 (more specifically, the tilt angles on the sagittal plane (XZ plane) relative to the Z axis direction of the body coordinate system BC) are grasped based on the detected outputs of the light emitter/receiver 19. Then, supposing that θy is the tilt angle of the abdomen 7 to the waist 6 (note here that the tilt angle θy is obtained with the direction of tilt being defined as the plus direction on the front side of the human being 1), the transformation tensor R(C_abdomen→BC) is expressed by a matrix of order 3 as in the following formula (2):

$$R(C\_abdomen \to BC) = \begin{bmatrix} \cos\theta y & 0 & \sin\theta y \\ 0 & 1 & 0 \\ -\sin\theta y & 0 & \cos\theta y \end{bmatrix} \qquad (2)$$

The same applies to the transformation tensor R(C_chest→BC)). Additionally, measurement has been made for the tilt angles relative to the waist element S6 of the abdomen element S7 and the chest element S8 caused by the rotation around a single axis (around the Y axis of the C_abdomen and C_chest) of the lower joint of the upper body JU1 and the upper joint of the upper body JU2 of the rigid link model S1 in this embodiment, and therefore the transformation tensor R(C_abdomen→BC) and R(C_chest→BC) are each expressed by the matrix in the form of the right-hand side of the above formula (2). It is, however, also possible to measure tilt angles, for example, around two axes of the abdomen element S7 and the chest element S8 caused by the rotation around two axes (for example, around two axes of the Y axis and the X axis of the C_abdomen and C_chest) of the lower joint of the upper body JU1 and the upper joint of the upper body JU2, respectively. In this case, the transformation tensor R(C_abdomen→BC) and R(C_chest→BC) each have a more complicated form.

Incidentally, the transpositions of the aforementioned transformation tensors R(LC→BC), R(C_abdomen→BC), and R(C_chest→BC) are transformation tensors for performing inverse transformations therefor. Therefore, R(BC→LC) =R(LC→BC)$^T$, R(BC→C_abdomen)=R(C_abdomen→BC)$^T$, R(BC→C_chest)=R(C_chest→BC)$^T$ (T designates a transposition).

In the arithmetic processing of the two-dimensional leg posture and element center-of-gravity location calculation unit 29, first, tilt angles θ_thigh, θ_crus, and θ_foot of the thigh 10, the crus 12, and the foot 14, which are the rigid equivalent parts of the each leg 2, are respectively calculated as tilt angles of the thigh element S10, the crus element S12, and the foot element S14 of the rigid link model S1 corresponding to them from the rotation angles around the axes perpendicular to the leg plane PL of the joints 9, 11, and 13 (the rotation axes a9, a11, and a13 shown in FIG. 3), which are grasped from the detected outputs of the joint displacement sensors 21 to 23 of the each leg 2. Note here that the tilt angles θ_thigh, θ_crus, and θ_foot are those relative to the Z axis direction of the leg coordinate system LC related to the leg plane PL.

Figure 7:
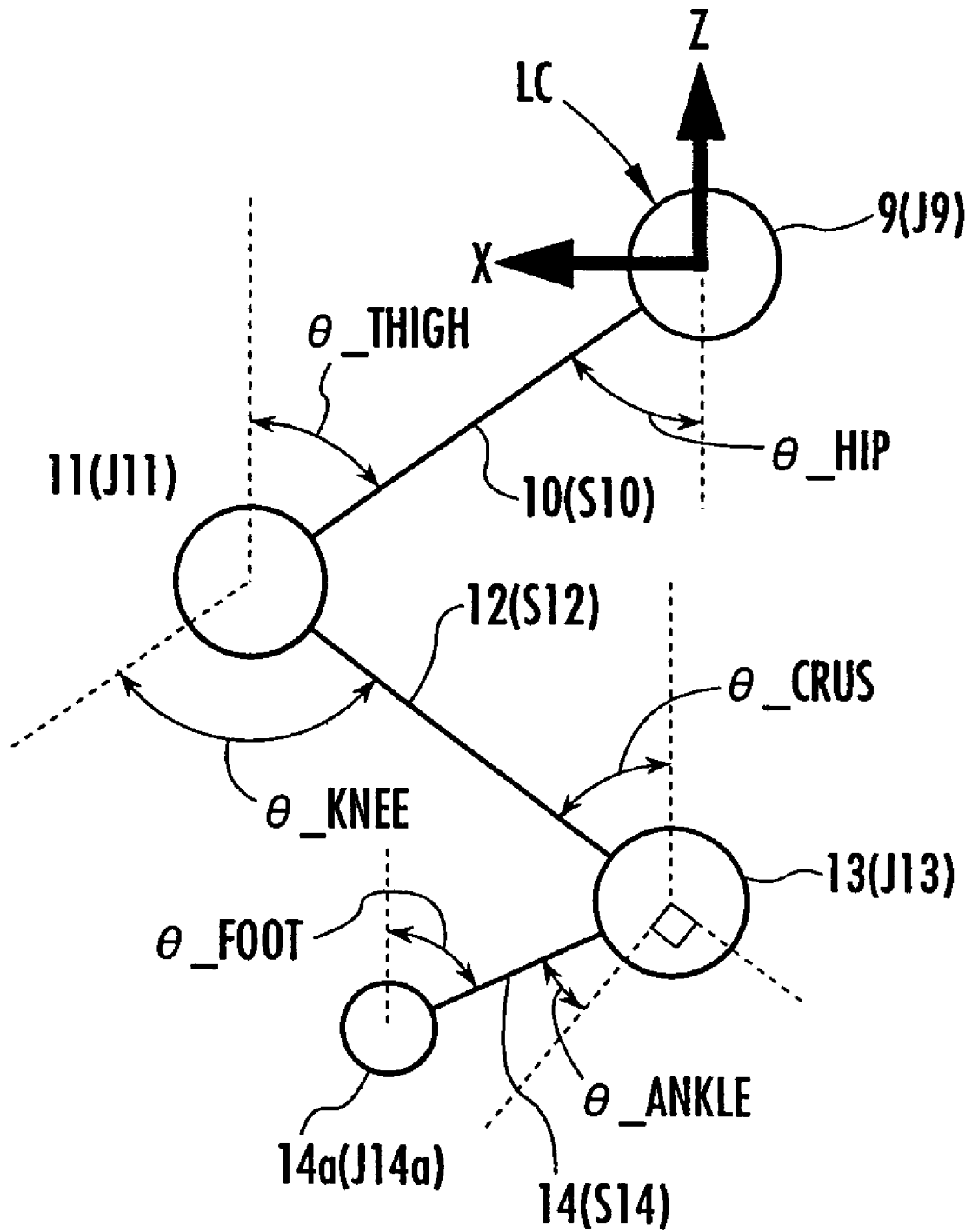
FIG. 7 is a diagram for explaining processing of finding a posture of a leg by using a two-dimensional leg posture and element center-of-gravity location calculation unit shown in FIG. 6.

Specifically, as shown in FIG. 7, supposing that the detected rotation angles of the hip joint 9, the knee joint 11, and the ankle joint 13 (the rotation angles around the axes perpendicular to the leg plane PL (=the XZ plane of the leg coordinate system LC) from the reference posture condition) are θ_hip, θ_knee, and θ_ankle, respectively, θ_thigh, θ_crus, and θ_foot are calculated by the following formulas (3a) to (3c) in order:

$$\theta\_thigh = -\theta\_hip \qquad (3a)$$

$$\theta\_crus = \theta\_thigh + \theta\_knee \qquad (3b)$$

$$\theta\_foot = \theta\_crus - \theta\_ankle - 90° \qquad (3c)$$

In the example shown in FIG. 7, θ_hip>0, θ_knee>0, and θ_ankle>0, θ_thigh<0, θ_crus>0, and θ_foot<0. Moreover, θ_thigh, θ_crus, and θ_foot are calculated for each of the leg sections S2 individually.

Subsequently, the positions on the XZ plane of the leg coordinate system LC or the leg plane PL of the joint elements of the each leg section S2 are determined by using the θ_thigh, θ_crus, and θ_foot obtained as described above and the lengths of the rigid elements of the each leg section S2 previously stored in the memory of the arithmetic processing unit 18. Concretely, the position vectors U(J_hip/LC), U(J_knee/LC), U(J_ankle/LC), and U(J_MP/LC) on the leg coordinate system LC of the joint elements J_hip (J9), J_knee (J11), J_ankle (J13), and J_MP (J14a) of the each leg section S2 are calculated in order by the formulas (4a) to (4d) described below. In this calculation, all of the positions of J_hip, J_knee, J_ankle, and J_MP in the Y-axis direction of the leg coordinate system LC (the normal line direction on the leg plane PL), in other words, the Y-axis components on the leg coordinate system LC of J_hip, J_knee, J_ankle, and J_MP are assumed to be zero. In other words, it is assumed that all of J_hip, J_knee, J_ankle, and J_MP are movable only on the leg plane PL in this embodiment.

$$U(J\_hip/LC)=(0, 0, 0)^T \quad (4a)$$

$$U(J\_knee/LC)=U(J\_hip/LC)+(-L10\times\sin(\theta\_thigh), 0, -L10\times\cos(\theta\_thigh))^T \quad (4b)$$

$$U(J\_ankle/LC)=U(J\_knee/LC)+(-L12\times\sin(\theta\_crus), 0, -L12\times\cos(\theta\_crus))^T \quad (4c)$$

$$U(J\_MP/LC)=U(J\_ankle/LC)+(-L14\times\sin(\theta\_foot), 0, -L14\times\cos(\theta\_foot))^T \quad (4d)$$

In the above, L10, L12, and L14 in the formulas (4b), (4c), and (4d) are the lengths of the thigh element S10, the crus element S12, and the foot element S14, respectively, and are previously stored in the memory of the arithmetic processing unit 18. The vectors of the second term in the right-hand side of the formulas (4b) to (4d) mean the position vector of the knee joint J11 viewed from the hip joint J9, the position vector of the ankle joint J13 viewed from the knee joint J11, and the position vector of the MP joint J14 viewed from the ankle joint J13, respectively. In this regard, a pair of the X-axis component and the Z-axis component of each of the position vectors U(J_hip/LC), U(J_knee/LC), U(J_ankle/LC), and U(J_MP/LC) calculated by the formulas (4a) to (4d) represents a two-dimensional position on the leg plane PL.

Moreover, the position vectors on the leg coordinate system LC of the centers of gravity of the rigid elements of the each leg section S2 are calculated by using the position vectors of the joint elements calculated as described above by the formulas (4b) to (4d). More specifically, position vectors U(G_thigh/LC), U(G_crus/LC), and U(G_foot/LC) of the centers of gravity G_thigh (G10), G_crus (G12), and G_foot (G14) of the thigh element S10, the crus element S12, and the foot element S14 of the each leg section S2 are respectively calculated by the following formulas (5a) to (5c):

$$U(G\_thigh/LC)=U(J\_knee/LC)+R(C\_thigh\rightarrow LC)\times U(G\_thigh/C\_thigh) \quad (5a)$$

$$U(G\_crus/LC)=U(J\_ankle/LC)+R(C\_crus\rightarrow LC)\times U(G\_crus/C\_crus) \quad (5b)$$

$$U(G\_foot/LC)=U(J\_MP/LC)+R(C\_foot\rightarrow LC)\times U(G\_foot/C\_foot) \quad (5c)$$

In the formulas (5a) to (5c), R(C_thigh→LC), R(C_crus→LC), and R(C_foot→LC) are respectively a transformation tensor from the thigh coordinate system C_thigh (C10) to the leg coordinate system LC, a transformation tensor from the crus coordinate system C_crus (C12) to the leg coordinate system LC, and a transformation tensor from the foot coordinate system C_foot (C14) to the leg coordinate system LC, and they are determined by using the previously calculated θ_thigh, θ_crus, and θ_foot (See the formulas (3a) to (3c)). In addition, U(G_thigh/C_thigh), U(G_crus/C_crus), and U(G_foot/C_foot) are position vectors of the centers of gravity of the rigid elements represented on the element coordinate system of the corresponding rigid elements, and they are previously stored in the memory of the arithmetic processing unit 18.

A pair of the X-axis component and the Z-axis component of each of the position vectors U(G_thigh/LC), U(G_crus/LC), and U(G_foot/LC) calculated by the above formulas (5a) to (5c) represents a two-dimensional position on the leg plane PL. The above is the arithmetic processing of the two-dimensional leg posture and element center-of-gravity location calculation unit 29.

Subsequently, in the arithmetic processing of the three-dimensional joint and element center-of-gravity location calculation unit 30, the position vectors on the body coordinate system BC of the joint elements and the centers of gravity of the rigid elements of the rigid link model S1 are calculated by using the transformation tensor obtained by the transformation tensor generation unit 28 and the positions (the positions on the leg coordinate system LC) of the joint elements and the centers of gravity of the rigid elements of the each leg section S2 obtained by the two-dimensional leg posture and element center-of-gravity location calculation unit 29.

The position vectors of the joint elements are calculated as described below. The following describes the calculation of the position vectors of the joint elements of the left leg section S2, for example. First, supposing that L6a is the length of the portion S6a between the both hip joints J9, J9 of the waist element S6, the position vector U(J_left hip/BC) of the left hip joint J6 on the body coordinate system BC is given by the following formula (6a):

$$U(J\_left\ hip/BC)=(0, L6a/2, 0)^T \quad (6a)$$

Furthermore, position vectors U(J_left knee/BC), U(J_left ankle/BC), and U(J_left MP/BC) of the left knee joint J11, the left ankle joint J13, and the left MP joint J14a on the body coordinate system BC are found in order by the following formulas (6b) to (6d), using the transformation tensor R(LC→BC) and the position vectors U(J_left knee/LC), U(J_left ankle/LC), and U(J_left MP/LC) on the leg coordinate system LC (left LC) corresponding to the left leg section S2:

$$U(J\_left\ knee/BC)=U(J\_left\ hip/BC)+R(LC\rightarrow BC)\times U(J\_left\ knee/LC) \quad (6b)$$

$$U(J\_left\ ankle/BC)=U(J\_left\ hip/BC)+R(LC\rightarrow BC)\times U(J\_left\ ankle/LC) \quad (6c)$$

$$U(J\_left\ MP/BC)=U(J\_left\ hip/BC)+R(LC\rightarrow BC)\times U(J\_left\ MP/LC) \quad (6d)$$

The position vectors on the body coordinate system BC of the joint elements of the right leg section S2 can be found in the same manner as for the above.

Moreover, position vectors U(JU1/BC) and U(JU2/BC) on the body coordinate system BC of the lower joint of the upper body JU1 and the upper joint of the upper body JU2 of the upper body SU are calculated in order by using the following formulas (7a) and (7b):

$$U(JU1/BC) = (0, 0, L6b)^T \tag{7a}$$

$$U(JU2/BC) = U(JU1/BC) + R(C\_abdomen \rightarrow BC) \times (0, 0, L7)^T \tag{7b}$$

In the above, L6b in the formula (7a) is the length of the portion S6b of the waist element S6 and L7 in the formula (7b) is the length of the abdomen element S7. These lengths are previously stored in the memory of the arithmetic processing unit 18 as described above.

The position vectors on the body coordinate system BC of the centers of gravity of the rigid elements are calculated as described below. Specifically, the position vector U(G_thigh/BC), U(G_crus/BC), or U(G_foot/BC) on the body coordinate system BC of the center-of-gravity of the thigh element S10, the crus element S12, or the foot element S14 is determined by calculating the formula in which U(J_left knee/LC), U(J_left ankle/LC), or U(J_left MP/LC) in the right-side hand of the corresponding formula of (6b) to (6d) is replaced with the position vector U(G_thith/LC), U(G_crus/LC), or U(G_foot/LC) of the center-of-gravity of the thigh element S10, the crus element S12, or the foot element S14 calculated by the two-dimensional leg posture and element center-of-gravity position calculation unit 29. The position vectors on the body coordinate system BC of the G_thigh, G_crus, and G_foot are calculated for each of the leg sections S2 individually.

In addition, a position vector U(G_waist/BC) of the center-of-gravity G6 of the waist element S6 is found from the position vector U(G_waist/C_waist) of the center-of-gravity G_waist on the previously-stored waist coordinate system C_waist (C6) by the following formula (8):

$$U(G\_waist/BC) = R(C\_waist \rightarrow BC) \times U(G\_waist/C\_waist) \tag{8}$$

where R(C_waist→BC) is a transformation tensor from the waist coordinate system C_waist to the body coordinate system BC. In this embodiment, C_waist is equivalent to the body coordinate system BC and therefore R(C_waist→BC) is represented by an identity matrix of order 3. Therefore, U(G_waist/C_waist) is obtained directly as U(G_waist/BC).

Moreover, the position vectors U(G_abdomen/BC) and U(G_chest/BC) on the body coordinate system BC of the centers of gravity G7 and G8 of the abdomen element S7 and the chest element S8 are determined by the following formulas (9) and (10), using the transformation tensors R(C_abdomen→BC) and R(C_chest→BC) obtained by the transformation tensor generation unit 28, the position vector U(G_abdomen/C_abdomen) of the center-of-gravity of the abdomen element S7 on the previously-stored abdomen coordinate system C_abdomen (C7), and the position vector U(G_chest/C_chest) of the center-of-gravity of the chest element S8 on the chest coordinate system C_chest (C8):

$$U(G\_abdomen/BC) = U(JU1/BC) + R(C\_abdomen \rightarrow BC) \cdot U(G\_abdomen/C\_abdomen) \tag{9}$$

$$U(G\_chest/BC) = U(JU2/BC) + R(C\_chest \rightarrow BC) \cdot U(G\_chest/C\_chest) \tag{10}$$

Incidentally, U(JU1/BC) and U(JU2/BC) have been determined by the aforementioned formulas (7a) and (7b).

The above is the arithmetic processing of the three-dimensional joint and element center-of-gravity location calculation unit 30. As described hereinabove, the position vectors of the joint elements and those of the centers of gravity of the rigid elements calculated by the three-dimensional joint and element center-of-gravity location calculation unit 30 have meanings of position vectors viewed on the body coordinate system BC of the actual regions of the human being 1 corresponding to them.

The arithmetic processing unit 18 performs the arithmetic processing of the body coordinate system acceleration and angular velocity calculation unit 31 and the body coordinate system tilt angle calculation unit 32 in parallel with the arithmetic processing of the transformation tensor generation unit 28, the two-dimensional leg posture and element center-of-gravity location calculation unit 29, and the three-dimensional joint and element center-of-gravity location calculation unit 30.

In the arithmetic processing of the body coordinate system acceleration and angular velocity calculation unit 31, a value on the body coordinate system BC (axis component value) of the acceleration vector of the origin of the body coordinate system BC is determined as described below from the 3-axis acceleration (translation acceleration) grasped from detected outputs of the acceleration sensor 16 and the 3-axis angular velocity grasped from detected outputs of the gyro sensor 17. First, the acceleration and the angular velocity respectively detected by the sensors 16 and 17 are vector quantities represented by the 3-axis coordinate system fixed to the sensors 16 and 17 (hereinafter, referred to as the sensor coordinate system SC or C_sensor) and therefore they are transformed into a value on the body coordinate system BC. The transformation is performed by multiplying the acceleration vector and the angular velocity vector detected on the sensor coordinate system SC by a transformation tensor preset according to the relative attachment positional relationship (the relative posture relationship of the sensor coordinate system SC to the waist coordinate system C6 (=the body coordinate system BC)) of the acceleration sensor 16 and the gyro sensor (angular velocity sensor) 17 to the waist 6. In other words, supposing that a detected value of the acceleration vector on the sensor coordinate system SC is ACC(sensor/SC), an acceleration vector obtained by transforming it into the body coordinate system BC is ACC(sensor/BC), a detected value of the angular velocity vector on the sensor coordinate system SC is ω(sensor/SC), and an angular velocity vector obtained by transforming it into the body coordinate system BC is ω(sensor/BC), the acceleration vector ACC(sensor/BC) and the angular velocity vector ω(sensor/BC) are found by the formulas (11) and (12) described below. At this point, ACC (sensor/BC) and ω(sensor/BC) are more specifically an acceleration vector and an angular velocity vector at the places of the acceleration sensor 16 and the gyro sensor 17. In this sense, the term "sensor" is added to the denotation of ACC and ω. In this example, the places of the acceleration sensor 16 and the gyro sensor 17 are substantially coincident with each other and the sensor coordinate system SC is the same for the both sensors 16 and 17.

$$ACC(sensor/BC) = R(SC \rightarrow BC) \cdot ACC(sensor/SC) \tag{11}$$

$$\omega(sensor/BC) = R(SC \rightarrow BC) \cdot \omega(sensor/SC) \tag{12}$$

Figure 8:
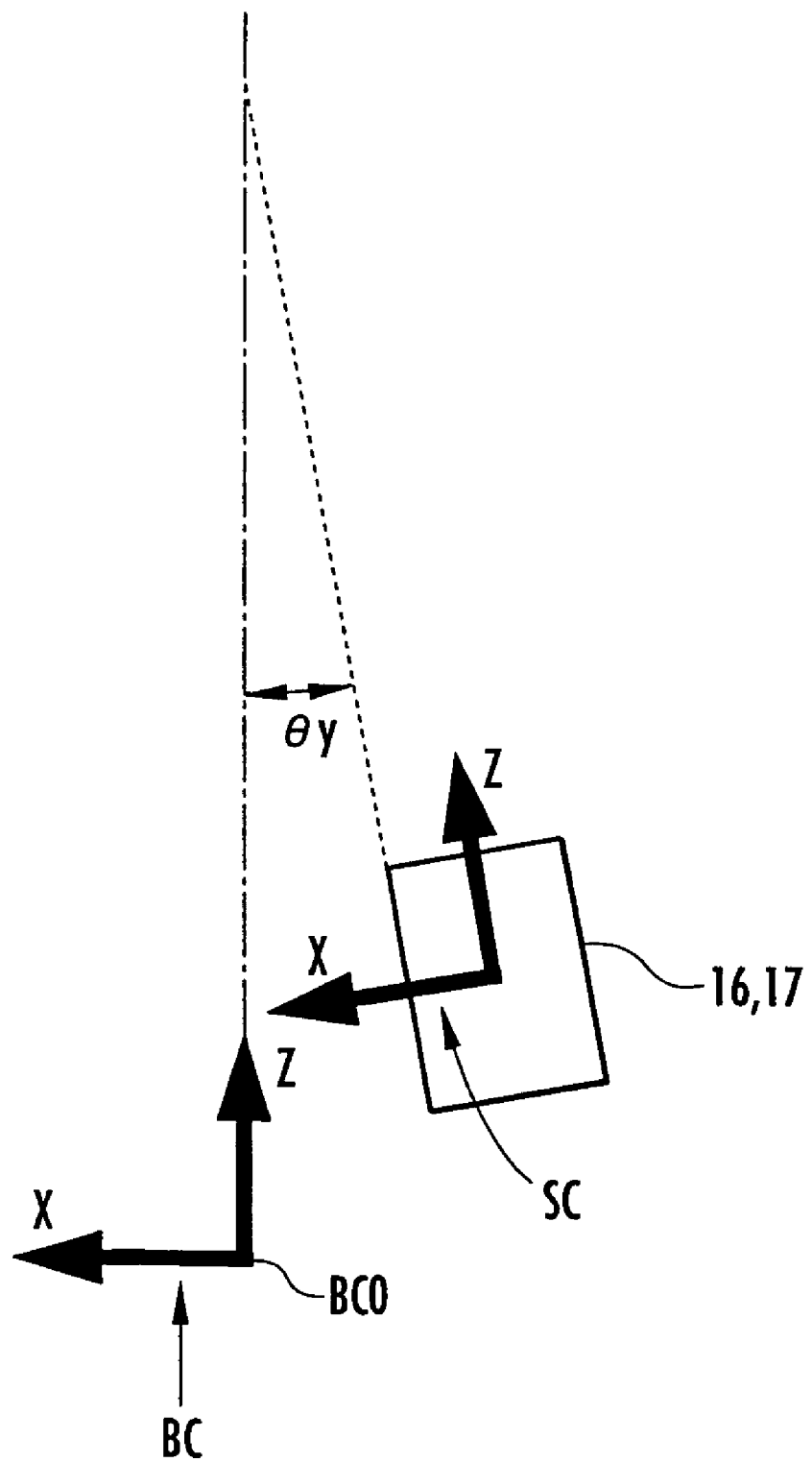
FIG. 8 is a diagram for explaining an example of a coordinate transformation between s sensor coordinate system and a body coordinate system in the embodiment.

In the above, the transformation tensor R(SC→BC) is determined from the relative posture relationship between the sensor coordinate SC and the body coordinate system BC (more specifically, the tilt angle of each axis of the sensor coordinate system SC to each axis of the body coordinate system BC). For example, if the three axes (XYZ axes) of the sensor coordinate system SC are inclined by the angle θy around the Y axis (the axis perpendicular to the surface of the page of FIG. 8) on the body coordinate system BC as shown in FIG. 8, the transformation tensor R(SC→BC) is represented by a matrix in the same form as the right-hand side of the formula (2). In this case, the acceleration sensor 16 and the gyro sensor 17 are fixed to the waist 8 where the body coordinate system BC is established, and therefore the tilt angle of each axis of the sensor coordinate system SC to each axis of the body coordinate system BC has been measured and known at the attachment of the acceleration sensor 16 and the gyro sensor 17 to the waist 8. Then, the transformation tensor R(SC→BC) is previously obtained based on the tilt angle and is stored in the memory of the arithmetic processing unit 18. Additionally describing, the acceleration sensor 16 or the gyro sensor 17 may be attached to the region other than the waist 6 (a rigid equivalent part corresponding to one of the rigid elements of the rigid link model S1). In this case, to acquire the acceleration vector ACC(sensor/BC) or the angular velocity vector ω(sensor/BC), the detected value on the sensor coordinate system SC is transformed to a value on the element coordinate system of the rigid element to which the acceleration sensor 16 or the gyro sensor 17 is attached, and then it is transformed to a value on the body coordinate system BC by using the transformation tensor. The transformation tensor in this case is determined based on a detected value of the displacement (rotation angle) of the joint element between the rigid element to which the acceleration sensor 16 or the gyro sensor 17 is attached and the waist element S6.

In the arithmetic processing of the body coordinate system acceleration and angular velocity calculation unit 31, the acceleration vector ACC(sensor/BC) and the angular velocity vector ω(sensor/BC) are determined as described above and thereafter an acceleration vector ACC(BCO/BC) of the origin of the body coordinate system BC is determined by the formula (13) below. The symbol "BCO" represents the origin of the body coordinate system BC.

$$ACC(BCO/BC) = \qquad (13)$$
$$ACC(\text{sensor}/BC) + U(\text{sensor}/BC) \times \omega(\text{sensor}/BC)' +$$
$$\begin{bmatrix} 0 & U(\text{sensor}/BC)x & U(\text{sensor}/BC)x \\ U(\text{sensor}/BC)y & 0 & U(\text{sensor}/BC)y \\ U(\text{sensor}/BC)z & U(\text{sensor}/BC)z & 0 \end{bmatrix} \times$$
$$\begin{bmatrix} \omega(\text{sensor}/BC)x^2 \\ \omega(\text{sensor}/BC)y^2 \\ \omega(\text{sensor}/BC)z^2 \end{bmatrix}$$

Note) ACC(BCO/BC) is a vector that is equal to the sensor output value obtained when the sensor is set at the origin of the body coordinate system BC and the direction of the sensor axes are coincident with those of the body coordinate system BC.

In the formula (13), U(sensor/BC) is a position vector of the acceleration sensor 16 and the gyro sensor 17 on the body coordinate system BC, and U(sensor/BC)x, U(sensor/BC)y, and U(sensor/BC)z are axis component values on the body coordinate system BC of U(sensor/BC) according to the aforementioned definition of the notation method of a axis component value of a vector in this specification. U(sensor/BC) is measured at the attachment of the acceleration sensor 16 and the gyro sensor 17 to the waist 6 and stored in the memory of the arithmetic processing unit 18. In addition, ω(sensor/BC)x, ω(sensor/BC)y, and ω(sensor/BC)z are axis component values of the angular velocity vector ω(sensor/BC) previously obtained. Furthermore, ω(sensor/BC)' indicates a first-order differential value of ω(sensor/BC) and the value is calculated from time series data of ω(sensor/BC) found by the aforementioned formula (12) for each arithmetic processing period of the arithmetic processing unit 18.

Moreover, the angular velocity is identical in any portion within the waist element S6, and the angular velocity ω(BCO/BC) of the origin BCO of the body coordinate system BC fixed to the waist element S6 is equal to ω(sensor/BC). Therefore, ω(sensor/BC) is directly obtained as the angular velocity ω(BCO/BC) of the origin BCO of the body coordinate system BC. Thus, ω(BCO/BC)=ω(sensor/BC).

Since the acceleration sensor 16 also detects an acceleration accompanying the gravity, the acceleration vector ACC (BCO/BC) obtained as described above includes an inertial acceleration component caused by the gravity (gravitational acceleration component). Moreover, while the acceleration vector ACC(BCO/BC) of the origin BCO of the body coordinate system BC has been determined in consideration of the angular speed of the waist element S6 in this embodiment, the angular velocity of the waist element S6 and its rate of change are relatively low and therefore ACC(sensor/BC), which has been determined by the aforementioned formula (11), may be an acceleration vector ACC(BCO/BC) of the origin BCO of the body coordinate system BC directly.

In the arithmetic processing of the body coordinate system tilt angle calculation unit 32, a tilt angle of the waist element S6 (a tilt angle of the Z axis of the body coordinate system BC) relative to the vertical direction (the direction of gravitation) is calculated by using the so-called Kalman filter from detected outputs of the acceleration sensor 16 and the gyro sensor 17. The calculation method is already known and therefore its description is omitted here. The tilt angle calculated here is around two axes, namely, the horizontal axis in the forward/backward direction and the horizontal axis in the right/left direction.

Subsequently, the arithmetic processing unit 18 performs the arithmetic processing of the total center-of-gravity location calculation unit 33. In the arithmetic processing of the total center-of-gravity location calculation unit 33, a position vector U(G_total/BC) on the body coordinate system BC of the total center-of-gravity of the rigid link model S1 (the total center-of-gravity, hereinafter referred to as G_total in some cases) is found by the following formula (14), from the centers of gravity location of the rigid elements (the position vectors on the body coordinate system BC found by the three-dimensional joint and element center-of-gravity location calculation unit 30 and the weights of the rigid elements preset as described above:

U(G_total/BC)={U(G_chest/BC)×m_chest+U(G_abdomen/BC)×m_abdomen+U(G_waist/BC)× m_waist+U(G_right thigh/BC)×m_right thigh+U (G_left thigh/BC)×m_left thigh+U(G_right crus/ BC)×m_right crus+U(G_left crus/BC)×m_left crus+U(G_right foot/BC)×m_right foot+U(G_left foot/BC)×left foot}/total weight  (14)

The term "m_☐☐" such as m_chest is a weight of a rigid element corresponding to the name of ☐☐. As shown by the formula (14), the position vector of the total center-of-gravity U(G_total/BC) is determined by dividing the total sum of the products of the position vector on the body coordinate system BC of the center-of-gravity of the each rigid element of the rigid link model S1 and the weight of the corresponding rigid element by the total weight of the human being 1 (=the total sum of the weights of all the rigid elements).

Subsequently, the arithmetic processing unit 18 performs calculations of the floor reaction force acting point estimation unit 34 and the floor reaction force estimation unit 35.

In the arithmetic processing of the floor reaction force acting point estimation unit 34, first, a transformation tensor R(BC→IC) from the body coordinate system BC to an absolute coordinate system IC is generated on the basis of the tilt angle relative to the vertical direction of the waist element S6 calculated by the body coordinate system tilt angle calculation unit 32. In this regard, the absolute coordinate system IC is a rectangular coordinate system whose Z axis is in the vertical direction and whose directions of the coordinate axes are coincident with those of the body coordinate system BC in the reference posture condition. The transformation tensor R(IC→BC) from the absolute coordinate system IC to the body coordinate system BC is a transposition R(BC→IC)$^T$ of the transformation tensor R(BC→IC).

Subsequently, using the above transformation tensor R(BC→IC), position vectors U(G_total/IC), U(J_ankle/IC), and U(J_MP/IC) viewed on the absolute coordinate systems IC of the total center-of-gravity G_total, the each ankle joint J13, and the MP joint J14a are calculated by multiplying the position vector U(G_total/BC) of the total center-of-gravity G_total previously determined by the total center-of-gravity location calculation unit 33 and the position vectors U(J_ankle/BC) and U(J_MP/BC) of the ankle joint J13 and the MP joint J14 of the each leg section S2 previously determined by the three-dimensional joint and element center-of-gravity location calculation unit 30 each by the tensor R(BC→IC). These position vectors U(G_total/IC), U(J_ankle/IC), and U(J_MP/IC) are position vectors on the absolute coordinate system IC having the same origin as for the body coordinate system BC. At this point, regarding the leg 2 determined to be not landing from the detected outputs of the landing sensors 24 and 25, the position vectors U(J_ankle/IC) and U(J_MP/IC) need not be calculated.

Figure 9:
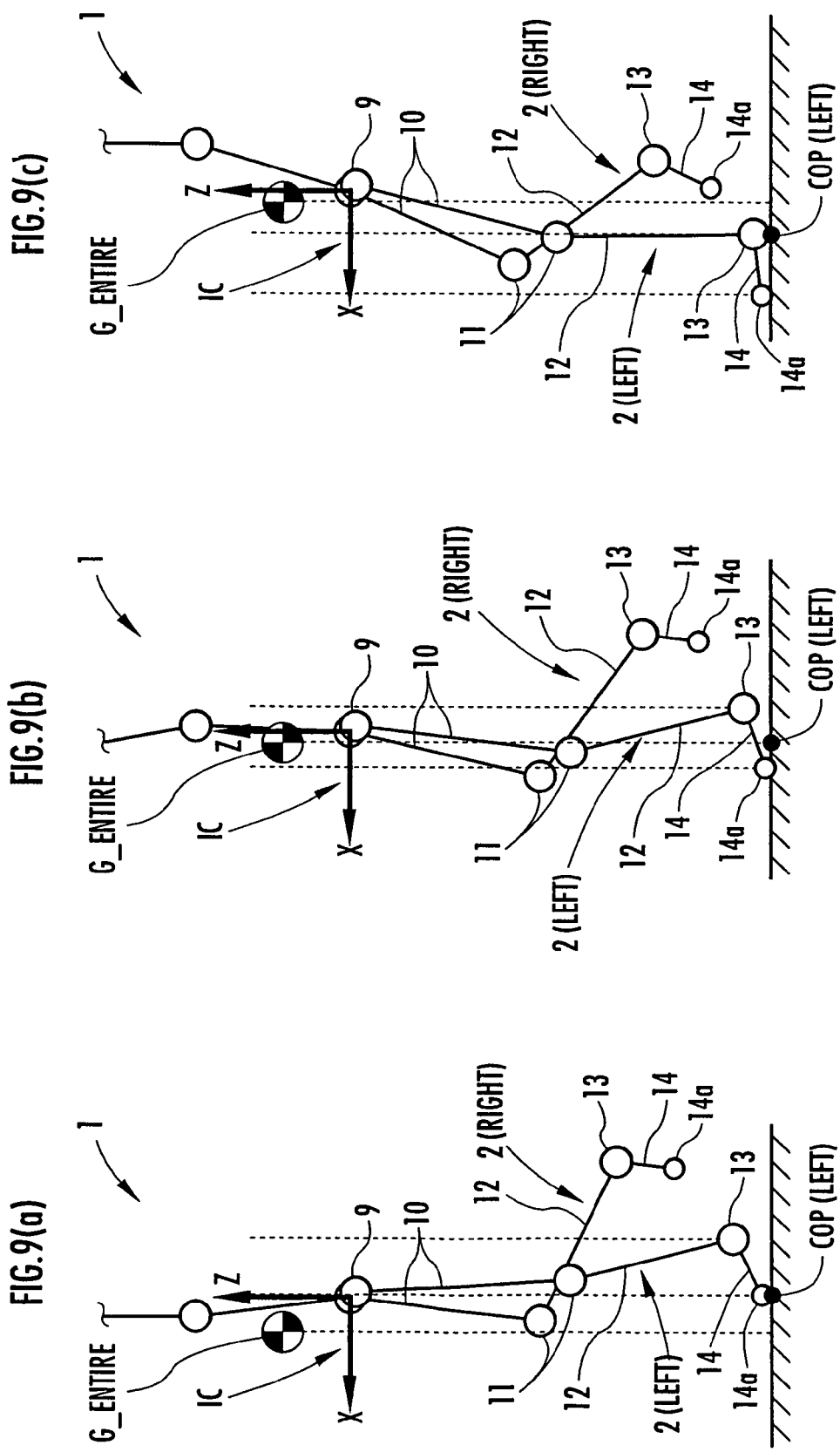
FIGS. 9(a) to 9(c) are diagrams each for explaining a method of estimating an acting point of a floor reaction force.
Figure 10:
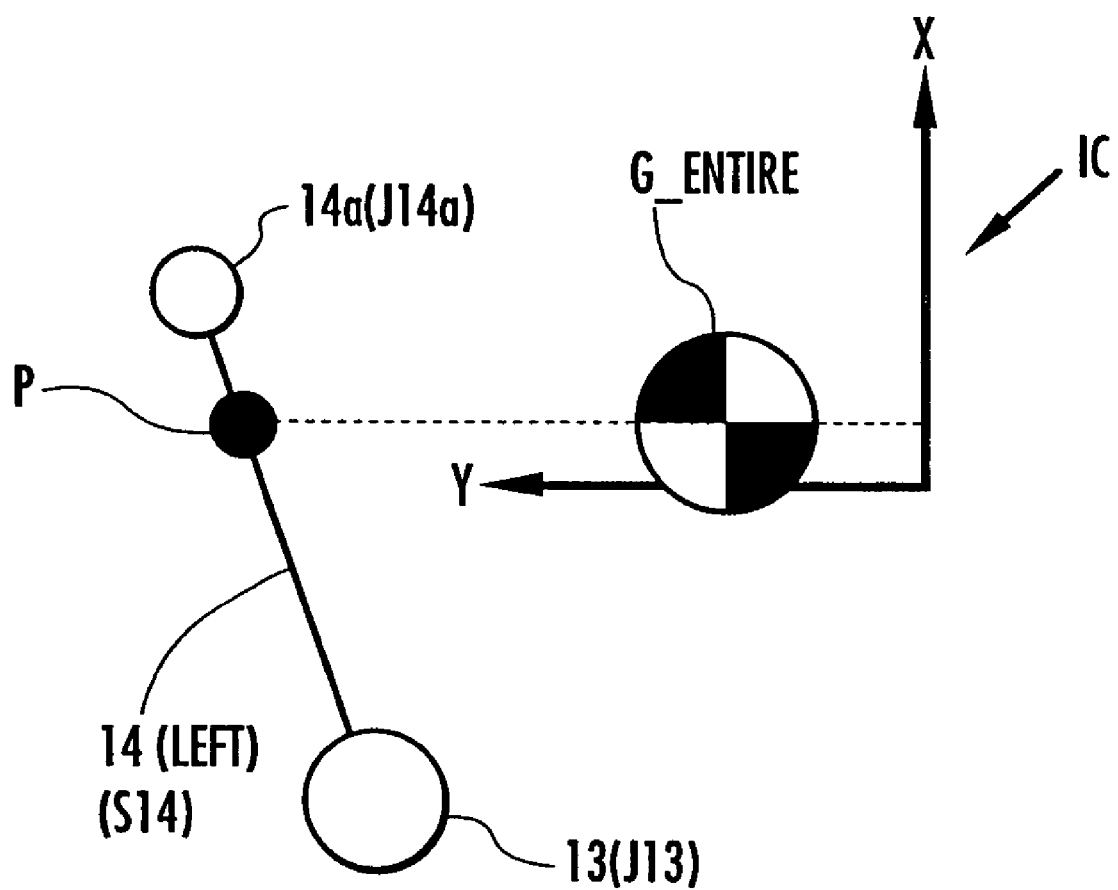
FIG. 10 is a diagram for explaining a method of estimating a Y-axis component of a floor reaction force on the acting point in the state shown in FIG. 9(b)

Subsequently, for each leg 2 determined to be landing from the detected outputs of the landing sensors 24 and 25, the X-axis component and the Y-axis component of the position vector of a floor reaction force acting point (the position vector on the absolute coordinate system IC) U(COP/IC) are determined according to the magnitude relation among the X-axis components U(G_total/IC)x, U(J_ankle/IC)x, and U(J_MP/IC)x of the position vectors U(G_total/IC), U(J_ankle/IC), and U(J_MP/IC), in other words, according to the relative horizontal positional relationship in the forward/backward direction of the total center-of-gravity G_total, the ankle joint J13, and the MP joint J14a. The determination method is described in more detail below with reference to FIGS. 9(a) to 9(c) and FIG. 10. It should be noted here that the left leg 2 is assumed to be landing in the following description. FIGS. 9(a) to 9(c) illustrate the states in which the left leg 2 of the human being 1 is landing (one-leg supporting states in these diagrams) viewed on the sagittal plane (the XZ plane on the absolute coordinate system IC). FIG. 10 shows a diagram of the landing foot 14 in the state shown in FIG. 9(b), viewed on a horizontal plane (the XY plane on the absolute coordinate system IC). In FIG. 9 and FIG. 10, the human being 1 is schematized into and shown by the rigid link model.

As shown in FIG. 9(a), if the total center-of-gravity G_total is more forward than the MP joint 14a of the landing left leg 2, in other words, if U(G_total/IC)x>U(J_left MP/IC)x, the foot 14 of the left leg 2 is landing with the leg braced mainly in the toe-side portion. In this case, the floor reaction force acting point COP exists substantially just under the MP joint 14a of the foot. Therefore, in this case, it is considered that the X- and Y-axis components of the position vector U(left COP/IC) of the floor reaction force acting point COP are equal to the X- and Y-axis components of the position vector U(J_left MP/IC) of the MP joint 14a, respectively. In other words, U(left COP/IC)x=U(J_left MP/IC)x and U(left COP/IC)y=U(J_left MP/IC)y.

Moreover, as shown in FIG. 9(c), if the total center-of-gravity G_total is more backward than the ankle joint 13 of the landing left leg 2, in other words, if U(G_total/IC)x<U(J_left ankle/IC)x, the foot 14 of the left leg 2 is landing with the leg 2 braced mainly in the heel-side portion. In this case, the floor reaction force acting point COP exists substantially just under the ankle joint 13 of the left leg 2. Therefore, in this case, it is considered that the X- and Y-axis components of the position vector U(left COP/IC) of the floor reaction force acting point COP are equal to the X- and Y-axis components of the position vector U(J_left ankle/IC) of the ankle joint 13, respectively. In other words, U(left COP/IC)x=U(J_left ankle/IC)x and U(left COP/IC)y=U(J_left ankle/IC)y.

Moreover, as shown in FIG. 9(b), if the total center-of-gravity G_total exists between the ankle joint 13 of the left leg 2 and the MP joint 14a in the forward/backward direction, in other words, if U(J_left MP/IC)x≦U(G_total/IC)x≦U(J_left ankle/IC)x, the floor reaction force acting point COP exists substantially just under the total center-of-gravity G_total on the shown sagittal plane. Therefore, in this case, it is considered that the X-axis component of the position vector U(left COP/IC) of the floor reaction force acting point COP is equal to the X-axis component of the total center-of-gravity G_total. In other words, U(left COP/IC)x=U(G_total/IC)x. Then, the floor reaction force acting point COP exists on a contact surface between the foot 14 of the landing left leg 2 and the floor surface (in this case, on the substantially total surface of the bottom face of the foot 14), and the position of the floor reaction force acting point COP is thought to be generally on a line segment generated by projecting the line segment between the center of the ankle joint 13 and the center of the MP joint 14a onto the floor surface. Accordingly, it is considered that the Y-axis component of the position vector U(left COP/IC) of the floor reaction force acting point COP is equal to the Y-axis component of a point P where the value of the total center-of-gravity G_total is equal to the value of the X-axis component (the X-axis component on the absolute coordinate system IC) on the central axis of the foot element S14 (on the line segment between the center of the ankle joint 13 and the center of the MP joint 14a) of the left leg 2 as shown in FIG. 10. The value of the Y-axis component of the position vector U(left COP/IC) is determined based on the following formula (22) indicating the proportional relation:

$$U(\text{left } COP/IC)x - U(J\_\text{left ankle}/IC)x : U(J\_\text{left } MP/IC)x - U(J\_\text{left ankle}/IC)x = U(\text{left } COP/IC)y - U(J\_\text{left ankle}/IC)y : U(J\_\text{left } MP/IC)y - U(J\_\text{left ankle}/IC)y \quad (22)$$

Moreover, it is assumed that the Z-axis component of the position vector U(left COP/IC) of the floor reaction force acting point is equal to the Z-axis component of the point, which is a predetermined value H0 (>0) away from the ankle joint 13 (the ankle element J13) of the left leg 2 downward in the vertical direction. In other words, it is assumed that U(left COP/IC)z=U(J_left ankle/IC)z–H0. In this regard, the predetermined value H0 is a distance in the vertical direction from the floor surface to the center of the ankle joint 13 in the reference posture condition (more accurately, in the state where the almost total bottom face of the foot 14 is put in contact with the horizontal floor surface), and it is previously measured and stored in the memory of the arithmetic processing unit 18. While the predetermined value H0 may be measured for each of the right and left legs 2 individually, a value measured for one of the legs 2 may be used for the both legs 2 in common.

In this embodiment, we can obtain the position vector U(left COP/IC) of the floor reaction force acting point of the floor reaction force applied to the left leg when the left leg 2 is landing, as described hereinabove. The same applies to the right leg 2 when it is landing. In this instance, when the both legs are landing, the position vector of the floor reaction force acting point is determined as described above for each of the both legs 2.

In this embodiment, the predetermined value H0 for use in finding the Z-axis component of the position vector U(COP/IC) of the floor reaction force acting point has been defined as a constant value. If, however, the landing sensors 24 and 25 detect that the foot 14 is in contact with the ground only in the toe-side portion, in other words, if only the landing sensor 25 outputs an ON signal indicating the landing of the leg, you may use the difference in the Z-axis component (U(J_ankle/IC)z–U(J_MP/IC)z) between the position vectors U(J_ankle/IC) and U(J_MP/IC) of the ankle joint 13 and the MP joint 14a, namely, the distance in the vertical direction between the ankle joint 13 and the MP joint 14a, instead of the predetermined value H0, regarding the landing leg 2. This improves the accuracy of U(COP/IC).

In the arithmetic processing of the floor reaction force acting point estimation unit 34, the value U(COP/BC) on the body coordinate system BC of the position vector of the floor reaction force acting point is found finally by multiplying the position vector U(COP/IC) of the floor reaction force acting point obtained for the landing leg 2 as described above by the inverse transformation tensor R(IC→BC), which is a transposition of the previously obtained transformation tensor R(BC→IC).

Figure 11:
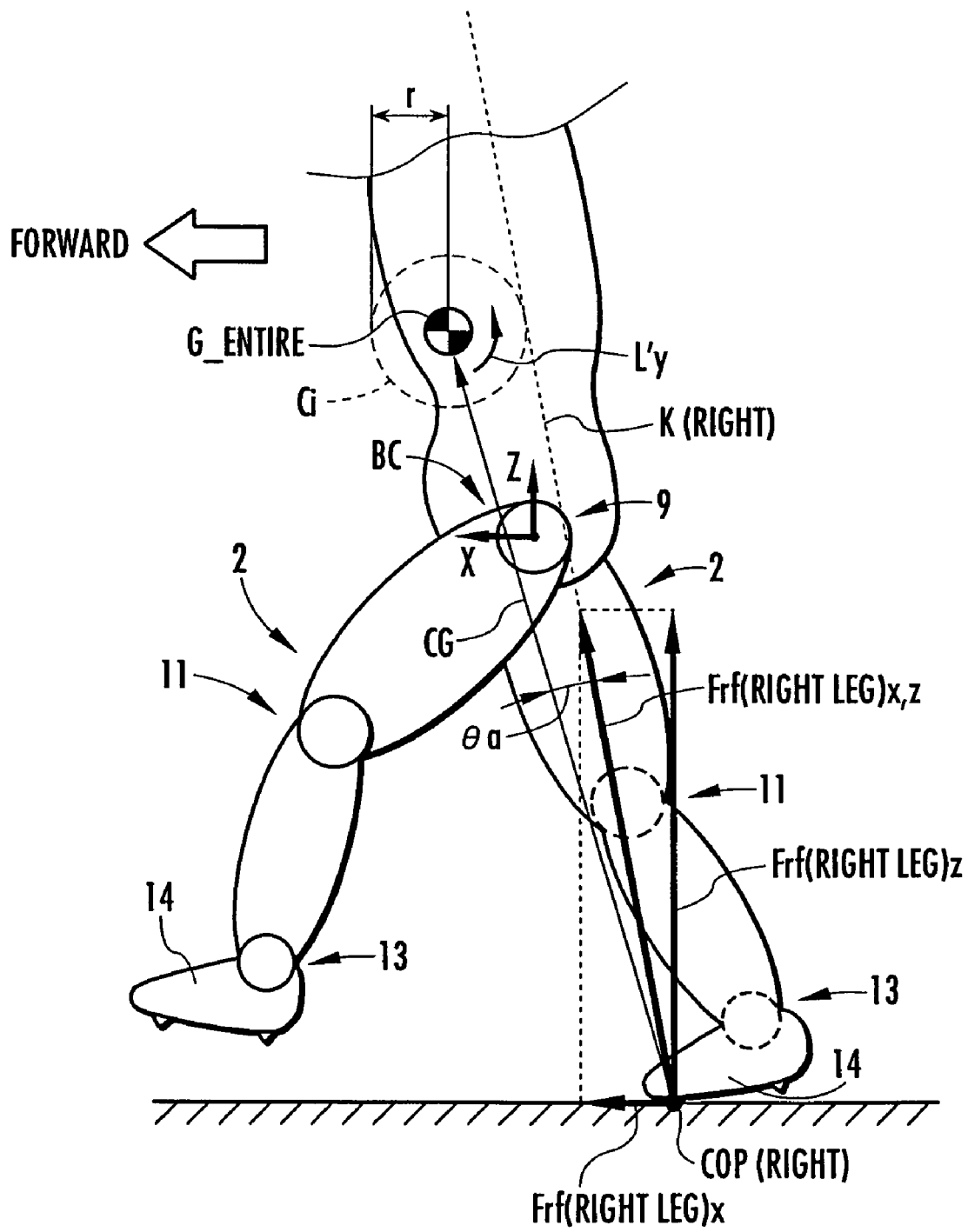
FIG. 11 is a diagram for explaining a method of estimating a floor reaction force in a one-leg supporting state of the two-legged walking mobile body.
Figure 12:
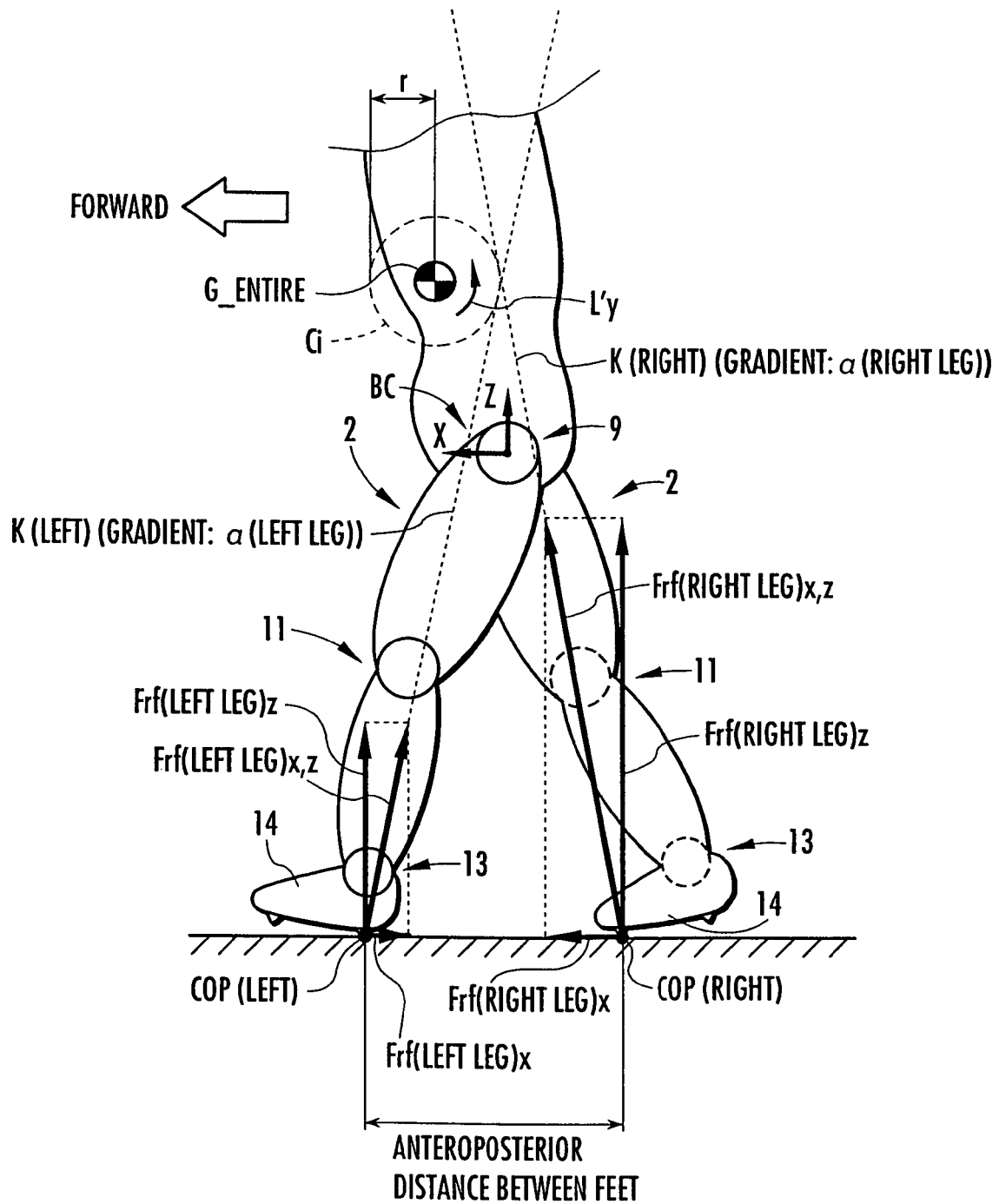
FIG. 12 is a diagram for explaining a method of estimating a floor reaction force in a two-leg supporting state of the two-legged walking mobile body.

Subsequently, the arithmetic processing of the floor reaction force estimation unit 35 is described below. First, the principle of this arithmetic processing is described with reference to FIG. 11 and FIG. 12. FIG. 11 and FIG. 12 illustrate the lower part of the body of the human being 1 in the one-leg supporting state and in the two-leg supporting state.

In the description of the floor reaction force estimation unit 35, it is assumed that the vector quantities such as a floor reaction force, an angular momentum, a position vector are represented by the body coordinate system BC, unless otherwise specified, and that a term simply referred to as the X axis, the Y axis, or the Z axis means the corresponding coordinate axis of the body coordinate system BC. Therefore, when a vector quantity is denoted, the name of the coordinate system is often omitted. For example, a representation of a floor reaction force acting on the right leg 2 with the body coordinate system BC is abbreviated as Frf(right leg), instead of Frf(right leg/BC), and its X-axis component is abbreviated as Frf(right leg)x.

While the human being 1 is making a motion, the total angular momentum of the human being 1 varies with time in general. Unless an external force (except the gravity) other than the floor reaction force acts on the human being 1, the total rate of change of angular momentum, which is a time rate of change (time derivative) of the angular momentum, is equal to a moment generated around the total center-of-gravity G_total of the human being 1 by the total floor reaction force (vector), which is the total sum of all floor reaction forces (vectors) acting on the human being 1 (or a total sum of the moments generated around the G_total by the floor reaction forces acting on the legs 2). In the one-leg supporting state of the human being 1, the floor reaction force acting on the leg 2 not landing is zero and therefore the floor reaction force acting on the landing single leg 2 is the total floor reaction force. In the two-leg supporting state of the human being 1, the total sum (vector sum) of the floor reaction forces acting on the landing right and left legs 2, 2 is the total floor reaction force. Additionally describing, an actual floor reaction force acting on the landing leg 2 is distributed over the supporting surface of the leg 2, but it is assumed in this specification that the floor reaction force is focusing on the floor reaction force acting point COP of the leg 2 (the center-of-gravity of the floor reaction forces distributed over the supporting surface exists at the floor reaction force acting point COP).

Moreover, in general, the magnitude of a component around an arbitrary axis XX of a moment generated around an arbitrary point PP by a certain translational force is equal to a value calculated by multiplying the magnitude of the component vector on a plane SS of the translational force (the component vector perpendicular to the axis XX of the translational force) by a moment arm length, which is a distance between a line of action of the translational force (a straight line passing through the acting point of the translational force and having the same direction as the translational force) and a point PP, viewed on the plane SS perpendicular to the axis XX.

Therefore, the magnitude of the component around a predetermined axis of the total rate of change of angular momentum of the human being 1 is coincident with the value found by multiplying the magnitude (an absolute value) of the component vector (two-dimensional vector) on a plane perpendicular to the predetermined axis of the total floor reaction force acting on the human being 1 by a moment arm length having a certain length. In addition, the direction of the moment, which is generated around G_total by the component vector on the plane perpendicular to the predetermined axis, of the total floor reaction force is coincident with the direction of the component around the predetermined axis of the total rate of change of angular momentum.

In consideration of the above, the direction of the component vector on the plane perpendicular to the predetermined axis of the floor reaction force acting on the each landing leg 2 is regulated by using the aforementioned moment arm length and the component (particularly the direction) around the predetermined axis of the total rate of change of angular momentum in this embodiment.

More specifically, focusing attention on the component around the Y axis (the axis in the right/left direction of the human being 1) of the total rate of change of angular momentum of the human being 1, in the one-leg supporting state of the human being 1 shown in FIG. 11, the direction of the component vector Frf(right leg)x,z on the plane (XZ plane) perpendicular to the Y axis of the floor reaction force Frf(right leg) (=total floor reaction force) acting on the landing leg 2 (the right leg in the shown example) is regulated to the direction satisfying the conditions where its line of action K (in the shown example, the straight line K(right) passing through the floor reaction force acting point COP of the landing right leg 2) is tangent to a circle Ci having a radius r (=moment arm length) whose center is G_total and the direction of the moment generated around G_total by Frf(right leg)x,z having the direction of the line of action is the same as the direction of a component L'y around the Y axis of the total rate of change of angular momentum L' (L' indicates a first-order differential value of the total angular momentum L). The same applies to the regulation in the one-leg supporting state in which only the left leg 2 is landing.

Additionally, in the one-leg supporting state, the floor reaction force acting on the landing leg 2 is equal to the total floor reaction force, and therefore when regulating the direction of the component vector on the XZ plane of the floor reaction force acting on the landing leg 2 as described above, the direction of the moment generated around G_total by the component vector on the XZ plane of the total floor reaction force is also the same as the direction of the component L'y around the Y axis of the total rate of change of angular momentum. Then, in this case, the value calculated by multiplying the magnitude (absolute value) of the component vector Frf(leg)x,z on the plane perpendicular to the Y axis of the floor reaction force acting on the landing leg 2 by the moment arm length r, which is the radius of the circle Ci, is coincident with the magnitude (absolute value) of the component L'y around the Y axis of the total rate of change of angular momentum.

Moreover, in the two-leg supporting state of the human being 1 shown in FIG. 12, the direction of the component vector Frf(right leg)x,z on the plane (XZ plane) perpendicular to the Y axis of the floor reaction force Frf(right leg) acting on the right leg 2 is regulated to the direction satisfying the conditions where its line of action K(right) is tangent to a circle Ci having a radius r (=moment arm length) whose center is G_total and the direction of the moment generated around G_total by Frf(right leg)x,z having the direction of the line of action K(right) is the same as the direction of the component L'y around the Y axis of the total rate of change of angular momentum L'. Similarly, the direction of the component vector Frf(left leg)x,z on the plane (XZ plane) perpendicular to the Y axis of the floor reaction force Frf(left leg) acting on the left leg 2 is regulated to the direction satisfying the conditions where its line of action K(left) is tangent to the circle Ci having the radius r and the direction of the moment generated around G_total by Frf(left leg)x,z having the direction of the line of action K(left) is the same as the direction of the component L'y around the Y axis of the total rate of change of angular momentum L'.

Additionally, in the two-leg supporting state, when regulating the direction of the component vector on the XZ plane of the floor reaction force acting on each of the landing right and left legs 2 as described above, the direction of the moment generated around G_total by the total sum of the component vectors (the component vector on the XZ plane of the total floor reaction force) is also the same as the direction of the component L'y around the Y axis of the total rate of change of angular momentum. In this instance, however, the total sum of the values calculated by multiplying the magnitude (absolute value) of the component vector Frf(right leg)x,z on the XZ plane of the floor reaction force Frf(right leg) acting on the right leg 2 and the magnitude (absolute value) of the component Frf(left leg)x,z on the XZ plane of the floor reaction force Frf(left leg) acting on the left leg 2 each by the moment arm length r, which is the radius of the circle Ci, is not coincident with the magnitude of the component L'y around the Y axis of the total rate of change of angular momentum L' in general.

In consideration of the above description, in the arithmetic processing of the floor reaction force estimation unit 35 in this embodiment, the moment arm length r is calculated from the component L'y around the Y axis of the total rate of change of angular momentum L' and the component vector on the plane perpendicular to the Y axis (the component vector on the XZ plane as a sagittal plane of the body coordinate system BC) of the total floor reaction force (hereinafter, referred to as Frf (total)), as described hereinafter. Then, by using the moment arm length r, the direction of the floor reaction force acting on the each landing leg 2 (more specifically, the component vector on the XZ plane of the floor reaction force) is determined. By determining the direction of the floor reaction force in this manner, the ratio of the each axis component value of the floor reaction force is determined from the total floor reaction force. Therefore, it becomes possible to determine the each axis component value of the floor reaction force from the ratio and the total floor reaction force. The Y-axis component of the floor reaction force does not much affect the joint moment (the joint moment around the axis perpendicular to the leg plane PL) finally calculated by the joint moment estimation unit 37, and thus the Y-axis component of the floor reaction force is ignored in this embodiment (the Y-axis component is assumed to be zero).

Figure 13:
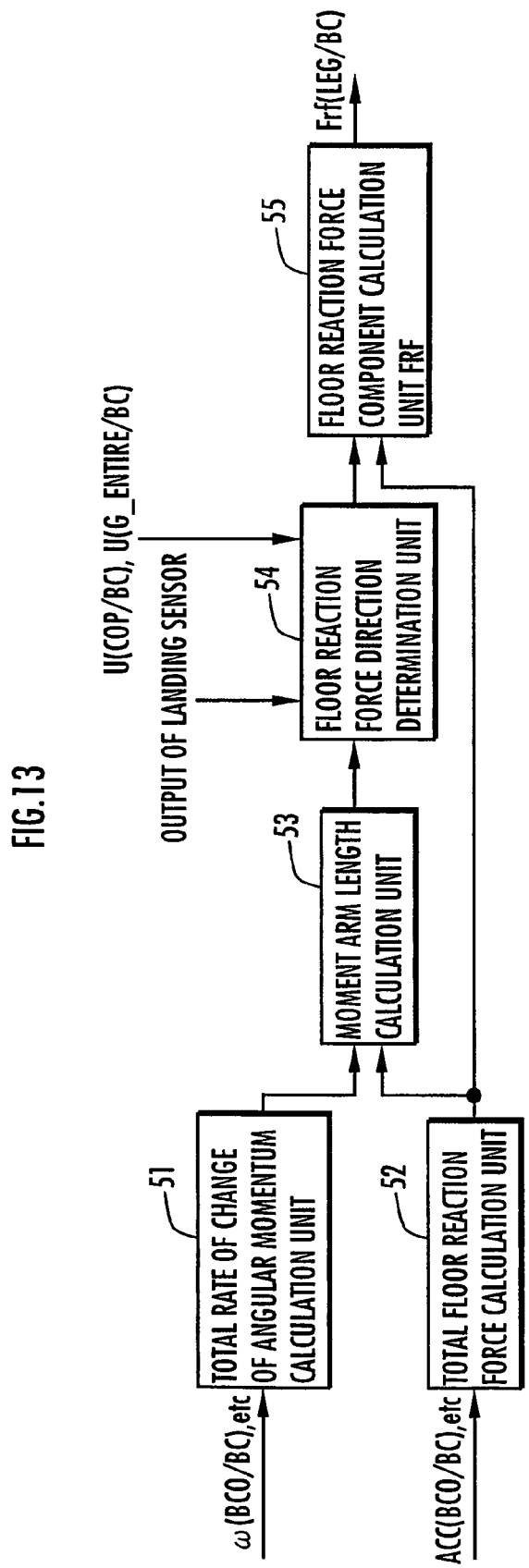
FIG. 13 is a block diagram showing an arithmetic processing function of a floor reaction force estimation unit shown in FIG. 6.

The arithmetic processing of the floor reaction force estimation unit 35 is described specifically with reference to FIG. 13 or the like hereinafter. Referring to FIG. 13, there is shown a block diagram showing an arithmetic processing function of the floor reaction force estimation unit 35.

As shown in FIG. 13, the floor reaction force estimation unit 35 includes a total rate of change of angular momentum calculation unit 51, a total floor reaction force calculation unit 52, a moment arm length calculation unit 53, a floor reaction force direction determination unit 54, and a floor reaction force component calculation unit 55. The total rate of change of angular momentum calculation unit 51 receives inputs of the angular velocity ω(BCO/BC) of the origin BCO of the body coordinate system BC calculated by the body coordinate system acceleration and angular velocity calculation unit 31, the position vectors of the joint elements and the position vectors of the centers of gravity of the rigid elements calculated by the three-dimensional joint and element center-of-gravity location calculation unit 30, and the position vector of G_total calculated by the total center-of-gravity location calculation unit 33.

Then, using these input values, the total rate of change of angular momentum calculation unit 51 calculates the component L'y around the Y axis of the total rate of change of angular momentum L' by calculating the following formula (40):

$$L'y = \Sigma(I\_n \times \theta''(n)y) + \Sigma(m\_n \times \Delta U(G\_n) \times \Delta ACC(G\_n))y \quad (40)$$

Subject to:

$$\Delta U(G\_n) \equiv U(G\_n) - U(G\_total)$$

$$\Delta ACC(G\_n) \equiv ACC(G\_n) - ACC(G\_total)$$
$$= U(G\_n)'' - U(G\_total)''$$

In this formula (40), "n" indicates a number assigned arbitrarily to each rigid element: I_n is a moment of inertia of a rigid element having the number n and θ"(n) is an angular acceleration around the center-of-gravity of the rigid element having the number n. Therefore, the first term Σ calculation in the formula (40) is to add up the products of the moment of inertia of each rigid element I_n times the Y-axis component of the angular acceleration θ"(n) (the product is the Y-axis component of the moment generated by the rigid element with its rotary motion) regarding all the rigid elements. In addition, m_n is a weight of the rigid element having the number n, U(G_n) is a position vector on the body coordinate system BC of the center-of-gravity of the rigid element having the number n, ACC(G_n) is an acceleration of the center-of-gravity of the rigid element having the number n, ΔU(G_n) is a position vector relative to G_total of the center-of-gravity of the rigid element having the number n, and ΔACC(G_n) is a relative acceleration to G_total of the center-of-gravity of the rigid element having the number n. Therefore, the second term Σ calculation in the formula (40) is to add up the Y-axis components of the values obtained regarding all the rigid elements by multiplying a vector product of a position vector $\Delta U(G\_n)$ to G_total of the center-of-gravity of each rigid element and a relative acceleration $\Delta ACC(G\_n)$ to the total center-of-gravity G_total of the center-of-gravity of the rigid element by the weight of the rigid element (a moment generated around G_total by the rigid element with its translation acceleration motion of the center-of-gravity). Additionally, supposing that r(G_n) is a distance on the XZ plane between a straight line, which passes through the center-of-gravity of the rigid element of the number n and having the same direction as $\Delta ACC(G\_n)$, and G_total and that $\theta(G\_n)$ is an angular acceleration around the Y axis of center gravity of a rigid element of a number n when a translational motion of the center-of-gravity of the rigid element is considered to be a rotary motion around G_total, the Y-axis component ($=(\Delta U(G\_n) \times \Delta ACC(G\_n))y$) of the vector product of $\Delta U(G\_n)$ and $\Delta ACC(G\_n)$ equals $r(G\_n)^2 \times \theta(G\_n)$.

In this instance, I_n necessary for the first term $\Sigma$ calculation in the formula (40) is previously stored in the memory, not shown, of the arithmetic processing unit 18. In addition, $\theta''(n)y$ can be calculated as described below. Specifically, the tilt angles of the rigid elements on the XZ plane (the sagittal plane on the body coordinate system BC) are sequentially calculated from the position vectors (U(J_left hip/BC) or the like) of the joint elements of the leg section S2 calculated by the three-dimensional joint and element center-of-gravity location calculation unit 30. Furthermore, the Y-axis component $\theta''(n)y$ of the angular acceleration of the rigid element is found by adding the first-order differential of the Y-axis component of the angular velocity $\omega(BCO/BC)$ of the origin BCO of the body coordinate system BC calculated by the body coordinate system acceleration and angular velocity calculation unit 31 to the second derivative of the tilt angle.

Moreover, $\Delta U(G\_n)$ necessary for the second term $\Sigma$ calculation in the formula (40) is determined according to the definition of the provision for the formula (40) from the position vector (U(G_thigh/BC) or the like) of the center-of-gravity of the each rigid element calculated by the three-dimensional joint and element center-of-gravity location calculation unit 30 and the position vector U(G_total/BC) of G_total calculated by the total center-of-gravity location calculation unit 33. Furthermore, $\Delta ACC(G\_n)$ is determined according to the definition of the provision for the formula (40) from the second-order differential $U(G\_n)''$ of the position vector of the center-of-gravity of the each rigid element calculated by the three-dimensional joint and element center-of-gravity location calculation unit 30 and the second-order differential $U(G\_total)''$ of the position vector of G_total calculated by the total center-of-gravity location calculation unit 33.

The total floor reaction force calculation unit 52 receives inputs of the acceleration ACC(BCO/BC) of the origin BCO of the body coordinate system BC calculated by the body coordinate system acceleration and angular velocity calculation unit 31 and the position vector U(G_total/BC) of G_total calculated by the total center-of-gravity location calculation unit 33.

Then, the total floor reaction force calculation unit 52 calculates component vector Frf(total)x,z (a two-dimensional vector composed of the X-axis component and the Z-axis component of Frf(total)) on the XZ plane of the total floor reaction force Frf(total) from the above input values by calculating the following formula (41):

$$Frf(total)x,z = \text{total weight} \times (ACC(BCO/BC) + U(G\_total/BC)'')x,z \quad (41)$$

More specifically, the component vector Frf(total)x,z perpendicular to the Y axis of the total floor reaction force is calculated by multiplying a component on the XZ plane of the vector (this means the acceleration of G_total) obtained by adding the acceleration ACC(BCO/BC) of the origin BCO of the body coordinate system BC to the second-order differential $U(G\_total/BC)''$ of the position vector U(G_total/BC) of G_total by the total weight of the human being 1.

Subsequently, the component L'y around the Y axis of the total rate of change of angular momentum L' calculated as described above and the component vector Frf(total)x,z on the XZ plane (sagittal plane) of the total floor reaction force are input to the moment arm length calculation unit 53, where the moment arm length is calculated from the input values. In this instance, as described above, the magnitude of L'y is coincident with the product obtained by multiplying the magnitude (absolute value) of the component vector Frf(total)x,z on the XZ plane of the total floor reaction force by the moment arm length. Therefore, the moment arm length calculation unit 53 calculates the moment arm length r by the following formula (42):

$$r = L'y/|Frf(total)x,z| \quad (42)$$

In this embodiment, the moment arm length r obtained by the above formula (42) takes a positive or negative value according to the direction (sign) of the component L'y around the Y axis of the total rate of change of angular momentum. In this instance, if L'y has the direction indicated by the arrow shown in FIG. 11 and FIG. 12, the L'y value is determined to be positive in this embodiment. Therefore, whether the moment arm length r is a positive value or a negative value determines the direction of the moment generated around G_total (the moment around the Y axis) by Frf(total)x,z.

The moment arm length r obtained in this manner is then input to the floor reaction force direction determination unit 54. The floor reaction force direction determination unit 54 further accepts outputs of the landing sensors 24 and 25, the position vector U(COP/BC) of the floor reaction force acting point COP estimated by the floor reaction force acting point estimation unit 34, and the position vector U(G_total/BC) of G_total calculated by the total center-of-gravity location calculation unit 33. Thereafter, the floor reaction force direction determination unit 54 determines the direction of the floor reaction force acting on the landing leg 2 as described below, by using these input values.

First, whether the human being 1 is in the two-leg supporting state or in the one-leg supporting state is determined on the basis of the detected outputs of the landing sensors 24 and 25. More specifically, if one of the landing sensors 24 and 25 of one leg 2 outputs the ON signal indicating the landing of the leg 2 and one of the landing sensors 24 and 25 of the other leg 2 outputs the ON signal indicating the landing of the leg, it is determined that the human being 1 is in the two-leg supporting state. Moreover, if one of the landing sensors 24 and 25 of one leg 2, which is one of the both legs 2, 2, outputs the ON signal indicating the landing of the leg 2 and neither of the landing sensors 24 and 25 of the other leg 2 outputs the ON signal indicating the landing of the leg 2, it is determined that the human being 1 is in the one-leg supporting state.

Moreover, when the human being 1 is in the two-leg supporting state, regarding the direction (the direction on the XZ plane) of the floor reaction force Frf(right leg) of the right leg 2, the gradient $\alpha$(right leg) on the body coordinate system BC of the straight line K(right), which passes through the floor reaction force acting point COP of the right leg 2 and is tangent to the circle having the radius r (more accurately, |r|) whose center is G_total, is determined to indicate the direction (the direction on the XZ plane) of the floor reaction force Frf(right leg) of the right leg 2, as shown in FIG. 12. In this instance, if the moment arm length r is positive, the straight line K(right) is assumed to be tangent to the backward portion of the circle Ci having the radius r. In other words, when the component vector Frf(right leg)x,z on the XZ plane of the floor reaction force Frf(right leg) acts on the floor reaction force acting point COP with the straight line K(right) as a line of action, the gradient α(right leg) of the straight line K(right) tangent to the circle Ci is determined in such a way that the direction of the component around the Y axis of the moment generated around G_total by the floor reaction force Frf(right leg) is the same as the direction of the component L'y around the Y axis of the total rate of change of angular momentum. Regarding the left leg 2, the gradient α(left leg) on the body coordinate system BC of the straight line K(left), which indicates the direction (the direction on the XZ plane) of the floor reaction force Frf(left leg) of the left leg 2, is determined in the same manner as for the right leg 2. In this embodiment, the gradient α is a value of a ratio of variation in the Z-axis direction to the unit variation in the X-axis direction of the straight line K, in either of the right and left legs 2, 2.

If the human being 1 is in the one-leg supporting state, as shown in FIG. 11, CG is defined as a component vector on the XZ plane (the two-dimensional vector viewed on the sagittal plane of the body coordinate system BC) of the vector from the floor reaction force acting point COP of the landing leg 2 (the right leg 2 in the shown example) to G_total (the position vector of G_total to COP). Then, the angle θa formed by the vector CG and the straight line K(right), which passes through the floor reaction force acting point COP of the right leg 2 and is tangent to the circle having the radius r (more accurately, |r|) whose center is G_total, is determined to represent the direction (the direction on the XZ plane) of the floor reaction force Frf(right leg). In this instance, if the moment arm length r is positive, the straight line K(right) is assumed to be tangent to the backward portion of the circle Ci having the radius r. In other words, when the component vector Frf(right leg)x,z on the XZ plane of the floor reaction force Frf(right leg) acts on the floor reaction force acting point COP with the straight line K(right) as a line of action, the angle θa on the XZ plane of the straight line K(right) to the vector CG in such a way that the direction of the component around the Y axis of the moment generated around G_total by the floor reaction force Frf(right leg) is the same as the direction of the component around the Y axis of the total rate of change of angular momentum.

The angle θa is calculated by the following formula (43):

$$\theta a = -\sin^{-1}(r/|CG|) \quad (43)$$

In this instance, the absolute value of the vector CG is calculated from the position vector U(right COP/BC) of the floor reaction force acting point COP determined by the floor reaction force acting point estimation unit 34 and the position vector U(G_total/BC) of G_total determined by the total center-of-gravity location calculation unit 33.

Also in the one-leg supporting state in which only the left leg 2 is landing, similarly to the above, the angle θa formed by the component CG on the XZ plane of the position vector of G_total to the floor reaction force acting point COP of the left leg 2 and the straight line K(left), which passes through the floor reaction force acting point COP of the left leg 2 and is tangent to the circle having the radius r (more accurately, |r|) whose center is G_total, is determined to represent the direction of the floor reaction force Frf(left leg) (the direction on the XZ plane).

By the processing of the floor reaction force direction determination unit 54 described hereinabove, the direction (the direction on the sagittal plane of the body coordinate system BC) of the floor reaction force Frf acting on each landing leg 2 is determined in such a way that the line of action of the component vector Frf(leg)x,z on the XZ plane (the sagittal plane of the body coordinate system BC) of the floor reaction force Frf acting on the landing leg 2 is tangent to the circle Ci whose radius is the moment arm length r determined by the formula (42) and whose center is G_total and that the moment generated around G_total by Frf(leg)x,z having the direction of the line of action is coincident with the component L'y around the Y axis of the total rate of change of angular momentum.

Subsequently, the direction (the gradient α in the two-leg supporting state or the angle θa in the one-leg supporting state) of the floor reaction force determined by the floor reaction force direction determination unit 54 is input to the floor reaction force component calculation unit 55. The floor reaction force component calculation unit 55 also accepts the component vector Frf(total)x,z on the XZ plane of the total floor reaction force calculated by the total floor reaction force calculation unit 52. In the one-leg supporting state, the floor reaction force direction determination unit 54 inputs the vector CG found by its processing into the floor reaction force component calculation unit 55. Moreover, the position vector U(COP/BC) of the floor reaction force acting point COP of the each leg 2 and the position vector U(G_total/BC) of G_total are also input to the floor reaction force component calculation unit 55.

Then, the floor reaction force component calculation unit 55 calculates the axis component values on the body coordinate system BC of the floor reaction force Frf acting on the landing leg 2 from these input values as described below.

First, the calculation procedure for the two-leg supporting state is described below. The floor reaction forces (more specifically, their X-axis components and Z-axis components) acting on the legs 2, 2 in the two-leg supporting state are determined based on the following relational expressions (44) to (47):

$$Frf(\text{right leg})x + Frf(\text{left leg})x = Frf(\text{total})x \quad (44)$$

$$Frf(\text{right leg})x + Frf(\text{left leg})z = Frf(\text{total})z \quad (45)$$

$$Frf(\text{right leg})z = \alpha(\text{right leg}) \times Frf(\text{right leg})x \quad (46)$$

$$Frf(\text{left leg})z = \alpha(\text{left leg}) \times Frf(\text{left leg})x \quad (47)$$

The expressions (44) and (45) represent that the total sum of the floor reaction forces acting on the legs 2 is coincident with the total floor reaction force. Moreover, the formulas (46) and (47) represent that the ratio of the component value of the floor reaction force is determined according to the direction of the floor reaction force acting on the each leg 2.

Then, Frf(right leg)x, Frf(right leg)z, Frf(left leg)x, and Frf(left leg)z are calculated by the following formulas (48) to (51) from these formulas (44) to (47), respectively:

$$Frf(\text{right leg})x = (Frf(\text{total})z - \alpha(\text{left leg}) \times Frf(\text{total})x)/\Delta\alpha \quad (48)$$

$$Frf(\text{right leg})z = (\alpha(\text{right leg}) \times Frf(\text{total})z - \alpha(\text{right leg}) \times \alpha(\text{left leg}) \times Frf(\text{total})x)/\Delta\alpha \quad (49)$$

$$Frf(\text{left leg})x = (-Frf(\text{total})z + \alpha(\text{right leg}) \times Frf(\text{total})x)/\Delta\alpha \quad (50)$$

$$Frf(\text{left leg})z = (-\alpha(\text{left leg}) \times Frf(\text{total})z + \alpha(\text{right leg}) \times \alpha(\text{left leg}) \times Frf(\text{total})x)/\Delta\alpha \quad (51)$$

Subject to: Δα=α(right leg)−α(left leg)

Therefore, in the two-leg supporting state, basically the X-axis component and the Z-axis component of the floor reaction force acting on the each leg 2, namely, Frf(leg)x,z can be calculated by the arithmetic operations of the right-hand sides of the above formulas (48) to (51).

If the distance in the forward/backward direction (in the X-axis direction) between the feet 14, 14 of the both legs 2, 2 is short in the two-leg supporting state, the values of α(right leg) and α(left leg) are close to each other (the value of Δα is close to zero), thereby lowering the accuracy of the floor reaction force obtained by the aforementioned formulas (48) to (51).

In this regard, if the distance between the feet 14, 14 in the X-axis direction (hereinafter, referred to as the anteroposterior distance between feet. See FIG. 12) is short in the two-leg supporting state, it is considered that the floor reaction forces acting on the both legs 2, 2 are substantially equal to each other. In addition, the direction of the component around the Y axis of the moment generated around G_total by the resultant force of these floor reaction forces should be coincident with the direction of the component L'y around the Y axis of the total rate of change of angular momentum. Therefore, if the anteroposterior distance between feet is equal to or lower than a predetermined first threshold value, the X-axis components and the Z-axis components of the floor reaction forces acting on the each leg 2 are calculated by the following formula (52) in this embodiment:

$$Frf(\text{right leg})x,z = Frf(\text{left leg})x,z = Frf\_s(\text{entire})x,z/2 \quad (52)$$

subject to:

$$Frf\_s(\text{entire})x, z = \begin{bmatrix} \cos\theta b & \sin\theta b \\ -\sin\theta b & \cos\theta b \end{bmatrix} \times CavG \times \frac{|Frf(\text{entire})x, z|}{|CavG|}$$

CavG in the provision for the formula (52) is a component vector on the XZ plane of the vector from the midpoint Cav of the line segment between the respective floor reaction force acting points COPs of the right and left legs 2, 2 to G_total (the position vector of G_total relative to the midpoint Cav). The position vector on the body coordinate system BC of Cav is calculated as an average value of the position vectors of the right and left floor reaction force acting points COPs (=(U (right COP)+U(left COP))/2). Moreover, θb is an angle formed by the vector CavG and a straight line passing through the midpoint Cav on the XZ plane and is tangent to the circle having a radius r (more accurately, |r|) whose center is G_total and is calculated by the formula in which "CG" in the right-hand side of the formula (43) is replaced with "CavG." Therefore, Frf_s(total)x,z in the formula (52) is a vector (two-dimensional vector) that has the same direction as the component vector on the XZ plane of the vector from the midpoint Cav of the line segment between the floor reaction force acting points COPs of the both legs 2 to G_total and is generated by rotating a vector having the magnitude of Frf (total)x,z by the angle θb around the midpoint Cav on the XZ plane (the sagittal plane). Therefore, on the XZ plane, the line of action of Frf_s(total)x,z (the straight line passing through the midpoint Cav on the XZ plane and having the same direction as the vector Frf_s(total)x,z) is tangent to the circle Ci having the radius r whose center is G_total.

Therefore, if the anteroposterior distance between feet is equal to or smaller than the first threshold value in the two-leg supporting state, Frf(right leg)x,z and Frf(left leg)x,z obtained by the formula (52) have the same magnitude and direction, and the magnitude of the total sum is the same as the magnitude of the total floor reaction force Frf(total). Moreover, if the anteroposterior distance between feet is equal to or smaller than the first threshold value, the position on the XZ plane of the floor reaction force acting point COP of the each leg 2 is substantially the same as the position on the XZ plane of the midpoint Cav. Therefore, each of the lines of action of Frf(right leg)x,z and Frf(left leg)x,z (the lines of action on the XZ plane each passing through the floor reaction force acting point COP) is substantially tangent to the circle Ci having the radius r whose center is G_total.

Moreover, if the anteroposterior distance between feet is equal to or larger than a predetermined second threshold value larger than the first threshold value, the X-axis component and the Z-axis component acting on the each leg 2 are calculated by the formulas (48) to (51). Furthermore, if the anteroposterior distance between feet is a distance between the first threshold value and the second threshold value, an arithmetic weighted mean value between the X-axis and Z-axis component of the floor reaction force obtained by the formulas (48) to (51) (hereinafter, a reference symbol "Frf1x, z" is appended to a vector composed of a pair of these components) and the X-axis and Z-axis components of the floor reaction force obtained by the formula (52) (hereinafter, a reference symbol "Frf2x,z" is appended to a vector composed of a pair of these components) is calculated as the X-axis component and the Z-axis component of the floor reaction force acting on the each leg 2 and the value of the weighting factor is continuously varied according to the anteroposterior distance between feet.

Therefore, the component vector Frf(leg)x,z (a true value of the estimated value of Frf(leg)x,z)) on the XZ plane of the floor reaction force of the each leg 2 finally calculated by the floor reaction force component calculation unit 55 in the two-leg supporting state is calculated by the following formula (54):

$$Frf(\text{leg})x,z = W \times Frf1x,z + (1-W) \times Frf2x,z \quad (54)$$

Figure 14:
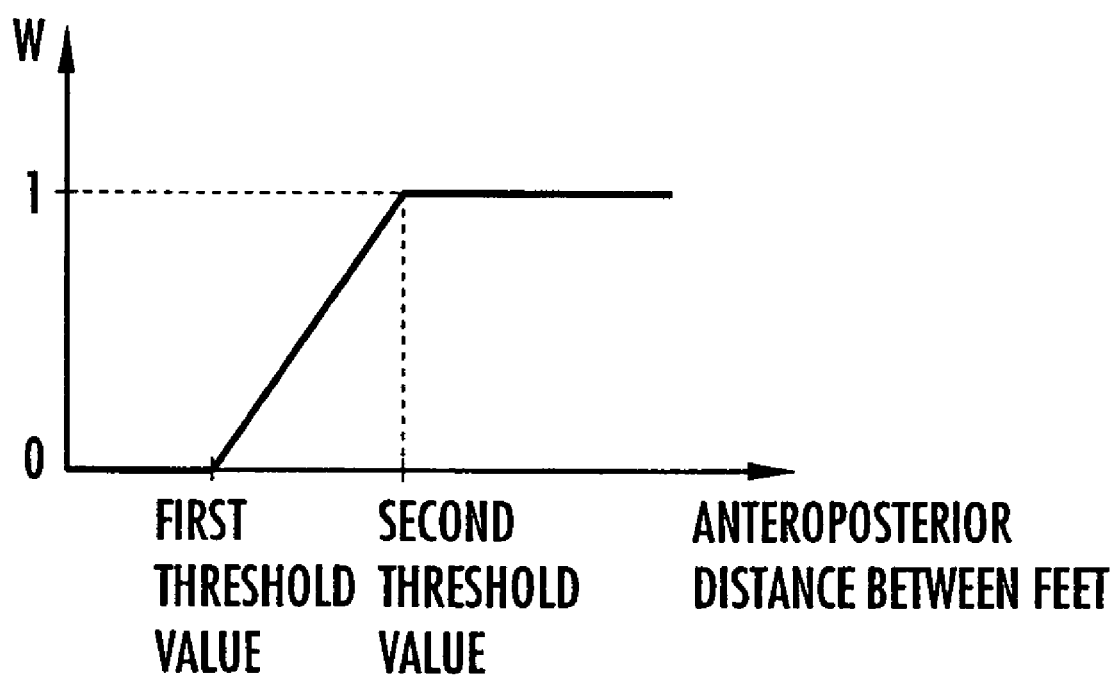
FIG. 14 is a graph showing a relation between a weighting factor and an anteroposterior distance between feet for use in processing of a floor reaction force component calculation unit shown in FIG. 13.
Figure 15:
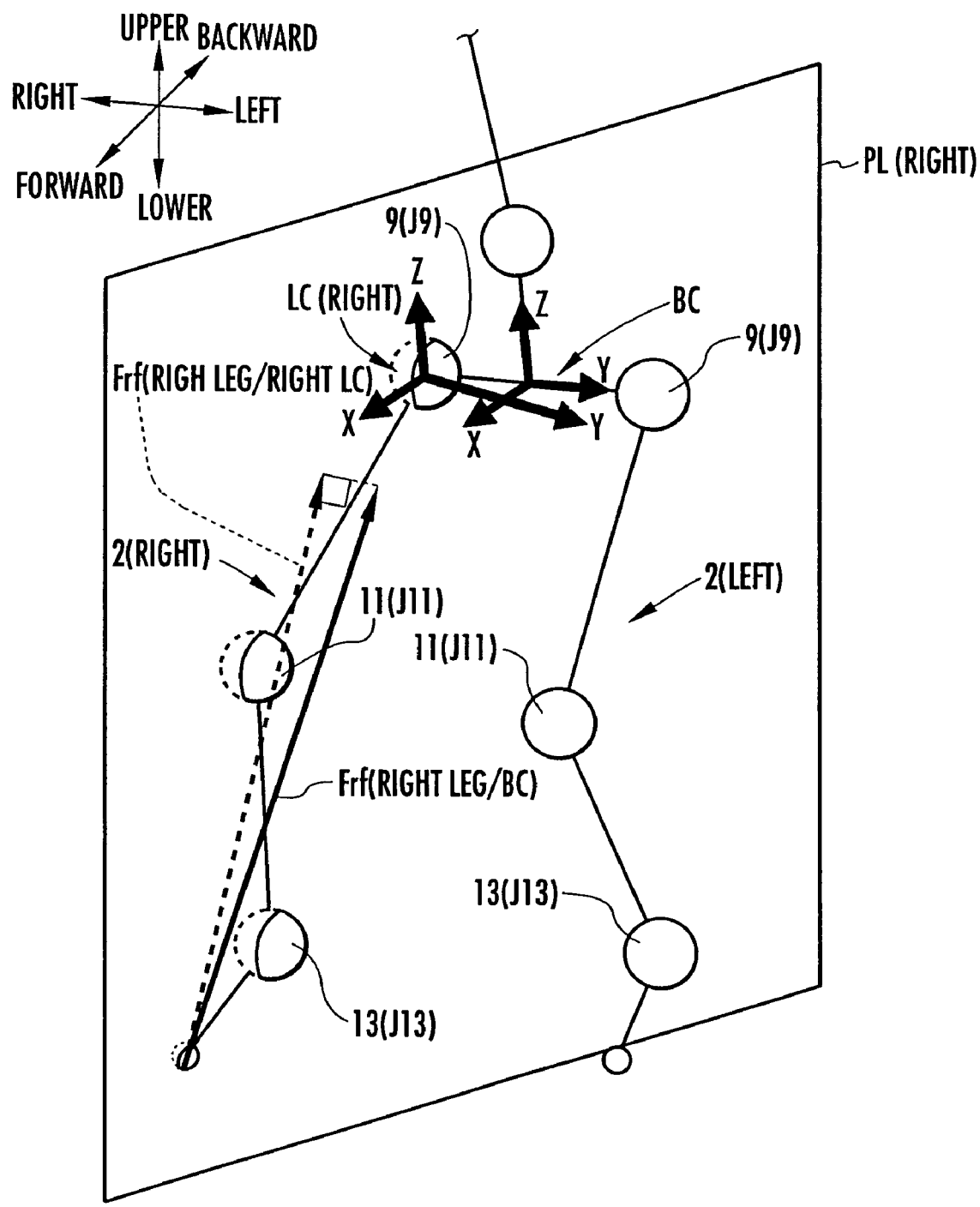
FIG. 15 is a diagram for explaining processing of a leg plane projection unit shown in FIG. 6.

In the above, W is a weighting factor and its value is determined according to the anteroposterior distance between feet by the data table defined as shown in FIG. 14 or an arithmetic expression. In this instance, as the anteroposterior distance between feet, there is used, for example, a distance in the X-axis direction on the body coordinate system BC of the corresponding floor reaction force acting point COP of each of the legs 2, 2, namely, |U(right COP/BC)x−U(left COP/BC) x|. Incidentally, it is also possible to use a distance in the X-axis direction of the MP joint or a distance in the X-axis direction of the ankle joint of each of the legs 2, 2, for example, as the anteroposterior distance between feet. Additionally, the weighting factors W and (1−W) are equivalent to the weighting factors W1 and W2 in the present invention.

Incidentally, in the two-leg supporting state, the straight line K(right) or the straight line K(left) may be substantially parallel to the Z axis in some cases. If so, the absolute value of the gradient α(right leg) or α(left leg) is infinite or excessively large. Therefore, in this embodiment, in case that the absolute value of the gradient α exceeds a predetermined value, the value of α is forcibly limited to the predetermined value.

On the other hand, the floor reaction force (more specifically, a two-dimensional vector composed of its X-axis component and Z-axis component) acting on the landing leg 2 in the one-leg supporting state is calculated by the following formula (55):

$$Frf(\text{leg})x, z = \begin{bmatrix} \cos\theta a & \sin\theta a \\ -\sin\theta a & \cos\theta a \end{bmatrix} \times CG \times \frac{|Frf(\text{entire})x, z|}{|CG|} \quad (55)$$

In other words, the component vector Frf(leg)x,z on the XZ plane of the floor reaction force acting on the landing leg 2 is found as a vector generated by rotating a vector, starting from the floor reaction force acting point COP of the leg 2 toward G_total and having a magnitude of Frf(total)x,z, by the angle θa around the floor reaction force acting point COP on the XZ plane (the sagittal plane). The line of action of Frf(leg)x,z determined in this manner is tangent to the circle Ci having the radius r whose center is G_total.

In this embodiment, in either case of the two-leg supporting state or the one-leg supporting state, the Y-axis component of the floor reaction force is assumed to be zero as described above. In the one-leg supporting state, the floor reaction force acting on the leg 2 not landing is assumed to be zero.

With the above processing of the floor reaction force component calculation unit 55, in the two-leg supporting state, the lines of action (the lines of action each passing through the floor reaction force acting point COP of the each leg 2 on the XZ plane) of the component vectors Frf(right leg)x,z and Frf(left leg)x,z of the floor reaction force are tangent to the circle Ci having the radius r (moment arm length) whose center is G_total, and the direction of each of Frf(right leg)x,z and Frf(left leg)x,z is determined in such a way that the direction of the moment (moment around the Y axis) generated around G_total by each of Frf(right leg)x,z and Frf(left leg)x,z (or the total sum of them) is coincident with the direction of the component L'y around the Y axis of the total rate of change of angular momentum. Then, on that basis, the estimated values (each of which is a pair of the X-axis component value and the Z-axis component value) of Frf(right leg)x,z and Frf(left leg)x,z are calculated in such a way that the total sum of Frf(right leg)x,z and Frf(left leg)x,z (=Frf (right leg)x,z+Frf(left leg)x,z) is coincident with Frf(total)x, z.

In the one-leg supporting state, the line of action (the line of action passing through the floor reaction force acting point COP of the leg 2) of the component vector Frf(leg)x,z of the floor reaction force of the landing leg 2 is tangent to the circle Ci having the radius r (moment arm length) whose center is G_total on the XZ plane, and the direction of Frf(leg)x,z is determined in such a way that the direction of the moment (moment around the Y axis) generated around G_total by Frf(leg)x,z is coincident with the direction of the component L'y around the Y axis of the total rate of change of angular momentum. Then, on that basis, Frf(leg)x,z of the landing leg 2 is calculated in such a way that the magnitude (absolute value) of Frf(leg)x,z is coincident with the magnitude (absolute value) of Frf(total)x,z.

As a result, the direction of Frf (the direction of Frf(leg)x,z) on the sagittal plane of the body coordinate system BC can be stabilized in both of the two-leg supporting state and the one-leg supporting state.

While the Y-axis component of the floor reaction force Frf(leg) has been set to 0 in this embodiment, it is also possible to determine the direction of the component vector Frf(leg)y,z of the floor reaction force on the YZ plane in such a way that the direction of the component around the X axis of the total rate of change of angular momentum is coincident with the direction of the moment generated around G_total (the moment around the X axis) by the total sum of the component vector Frf(leg)y,z on the YZ plane of the floor reaction forces of the landing leg 2, further taking into consideration the component around the X axis of the total rate of change of angular momentum. The direction may be determined by using the moment arm length on the YZ plane and the circle having the radius of the moment arm length, similarly to the above. The direction of Frf(leg)y,z is then determined. Thereafter, in the two-leg supporting state, each axis component value of each Frf(leg)y,z may be determined in such a way that the total sum of the component vectors Frf (leg)y,z on the YZ plane of the floor reaction forces acting on the respective legs 2 is coincident with the component vector Frf(total)y,z on the YZ plane of the total floor reaction force. Moreover, in the one-leg supporting state, each axis component value of Frf(leg)y,z may be determined in such a way that the magnitude of the component vector Frf(leg)y,z on the YZ plane of the floor reaction force acting on the landing leg 2 is coincident with the magnitude of the component vector Frf (total)y,z on the YZ plane of the total floor reaction force.

The above is the arithmetic processing of the floor reaction force estimation unit 35. Incidentally, to remove noise components from the estimated value of the floor reaction force obtained as described above, the estimated value is filtered and then it may be obtained as an estimated value of the floor reaction force finally. The filtering processing may be, for example, performed by using a second-order Butterworth filter (low pass filter). The cutoff frequency of the Butterworth filter is preferably in the order of 3 Hz, for example.

After performing the arithmetic processing of the floor reaction force acting point estimation unit 34 and that of the floor reaction force estimation unit 35, the arithmetic processing unit 18 then performs the arithmetic processing of the leg plane projection unit 36. In this processing, the acceleration vector ACC(BCO/BC) and the angular velocity vector ω(BCO/BC) of the origin BCO of the body coordinate system BC calculated by the body coordinate system acceleration and angular velocity calculation unit 31, the floor reaction forces Frf(right leg/BC) and Frf(left leg/BC) calculated by the floor reaction force estimation unit 35, and the position vector U(COP/BC) of the floor reaction force acting point COP calculated by the floor reaction force acting point estimation unit 34 are projected to the leg plane PL corresponding to each of the leg sections S2 for each thereof by using the transformation tensor R(BC→LC) (=R(LC→BC)$^T$), which is a transposition of the transformation tensor R(LC→BC) generated by the transformation tensor generation unit 28.

More specifically, the acceleration vector ACC(BCO/LC) and the angular velocity vector ω(BCO/LC) viewed from the each leg coordinate system LC are obtained by multiplying the acceleration vector ACC(BCO/BC) and the angular velocity vector ω(BCO/BC) each by the transformation tensor R(BC→LC) as shown by the following formulas (23a) and (23b):

$$ACC(BCO/LC)=R(BC{\rightarrow}LC){\times}ACC(BCO/BC) \quad (23a)$$

$$\omega(BCO/LC)=R(BC{\rightarrow}LC){\times}\omega(BCO/BC) \quad (23b)$$

The acceleration vector ACC(BCO/LC) and the angular velocity vector ω(BCO/LC) are each calculated as one corresponding to the leg coordinate system LC of the left leg section S2 and one corresponding to the leg coordinate system LC of the right leg section S2, individually.

Similarly, the floor reaction force Frf(right leg/right LC) and Frf(left leg/left LC) viewed from the each leg coordinate system LC are obtained by multiplying the floor reaction forces Frf(right leg/BC) and Frf(left leg/BC) by the transformation tensors R(BC→right LC) and R(BC→left LC), respectively, as shown by the following formulas (23c) and (23d):

$$Frf(\text{right leg/right } LC)=R(BC\to\text{right } LC)\times Frf(\text{right leg}/BC) \quad (23c)$$

$$Frf(\text{left leg/left } LC)=R(BC\to\text{left } LC)\times Frf(\text{left leg}/BC) \quad (23d)$$

Moreover, the position vector U(COP/LC) of the floor reaction force acting point COP viewed from the leg coordinate system LC corresponding to the landing leg 2 is obtained by multiplying the position vector U(COP/BC) of the floor reaction force acting point COP of the landing leg 2 by the transformation tensor R(BC→LC) corresponding to the landing leg 2 as shown by the following formula (23e):

$$U(COP/LC)=R(BC\to LC)\times U(COP/BC) \quad (23e)$$

In the above, if only one leg 2 is landing, the position vector U(COP/LC) is calculated only for the landing leg 2, and if both legs 2, 2 are landing, the position vector U(COP/LC) is calculated for each of the right and left legs 2, 2, individually.

In this point, regarding the acceleration vector ACC(BCO/LC), the floor reaction forces Frf(right leg/right LC) and Frf(left leg/left LC), and the position vector U(COP/LC) of the floor reaction force acting point, a pair of the X axis component and the Z axis component for each of them are obtained as a vector of a two-dimensional quantity, which is obtained by projecting a vector (of a three-dimensional quantity) on the body coordinate system BC corresponding to each of them onto the leg plane PL (the XZ plane on the leg coordinate system LC). For example, with reference to FIG. 15, supposing that the floor reaction force Frf(right leg/BC) of the right leg 2 on the body coordinate system BC is a vector as indicated by the shown solid line, the pair of the X axis component and the Z axis component of the floor reaction force Frf(right leg/right LC) is represented by a vector on the leg plane PL(right) as indicated by the dashed line shown in FIG. 15.

A rotary motion of the leg 2 on the leg plane PL is a rotary motion around an axis in the normal line direction (the Y axis direction of the leg coordinate system LC) of the leg plane PL. Therefore, the angular velocity vector ω(BCO/BC) projected to the leg plane PL is a Y axis component of the angular velocity vector ω(BCO/LC) on the leg coordinate system LC found by the aforementioned formula (23b).

In the following description, it is assumed that the acceleration vector ACC(BCO/LC), the floor reaction forces Frf (right leg/right LC) and Frf(left leg/left LC), and the position vector U(COP/LC) of the floor reaction force acting point each mean a two-dimensional vector composed of a pair of the X axis component and the Z axis component. For example, the acceleration vector ACC(BCO/LC) means (ACC(BCO/LC)x, ACC(BCO/LC)z)$^T$. The value on the leg plane PL of the angular velocity ω is represented by ω(BCO/LC)y.

Subsequently, the arithmetic processing unit 18 performs arithmetic processing of the joint moment estimation unit 37. Describing the outline of the arithmetic processing of the joint moment estimation unit 37, the joint moments of the joint elements J_ankle, J_knee, and J_hip at the endpoints on the waist element S6 side of the foot element S14, the crus element S12, and the thigh element S10 are calculated in order by the operations of the inverse dynamics model based on the equations of motion related to the translational motion and the rotary motion of the foot element S14, the crus element S12, and the thigh element S10 of the each leg S2. In this instance, the inverse dynamics model is treated on the leg plane PL (the XZ plane of the leg coordinate system LC) corresponding to each of the leg sections S2 for each thereof. The basic idea of the calculation processing is the same as those suggested by the applicant earlier in Japanese Patent Laid-Open No. 2003-89083 and the like, except the plane and coordinate system where the inverse dynamics model is treated.

Figure 16:
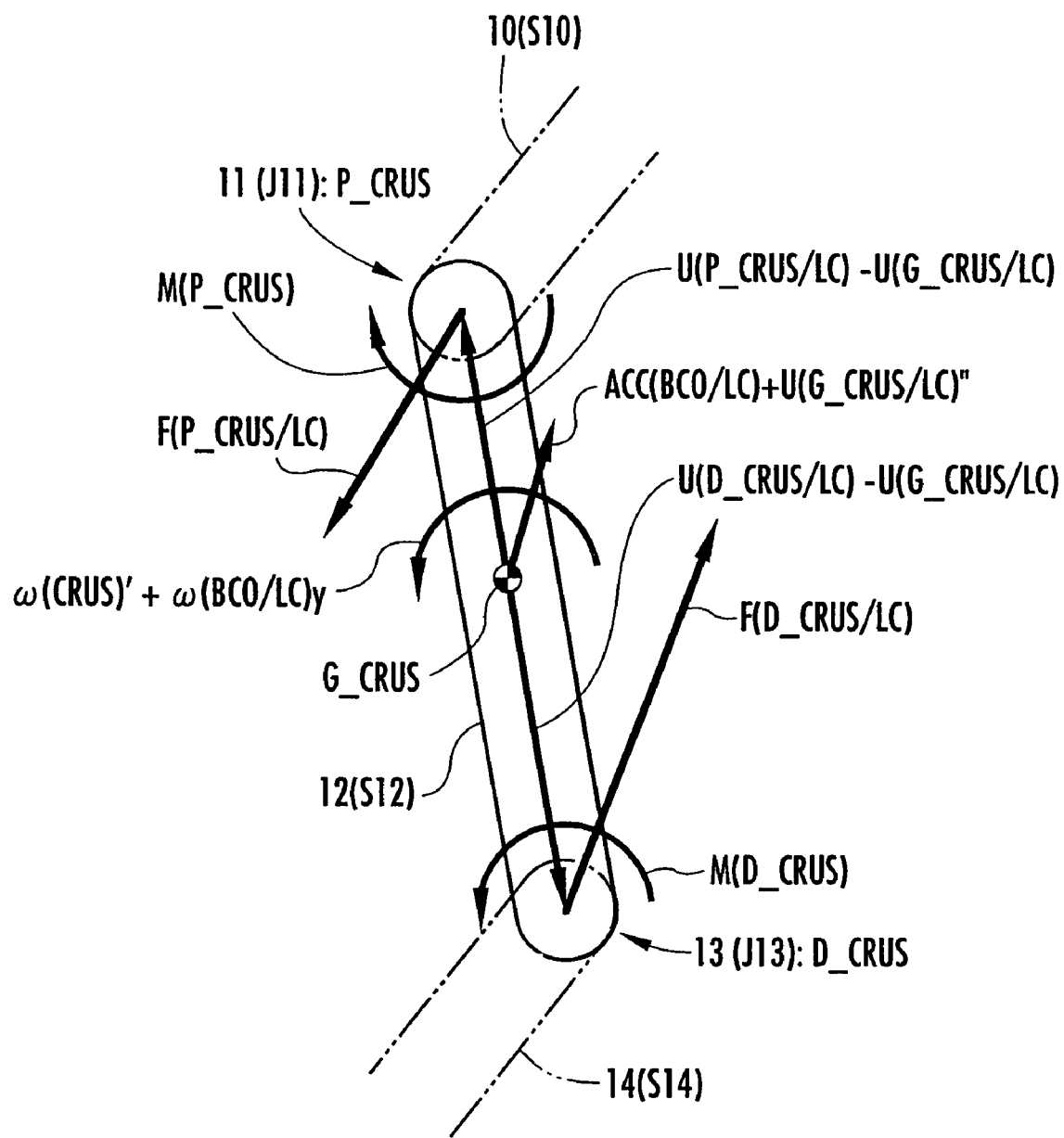
FIG. 16 is a diagram for explaining arithmetic processing performed by an inverse dynamics model for determining a joint moment.

Explaining in concrete terms hereinafter, the equations of motion of the translational motion on each leg plane PL of the foot element S14, the crus element S12, and the thigh element S10 of the each leg section S2 are given by the formulas (24) to (26) below. In the following description, generally one end closer to the waist element S6 is sometimes denoted by "P_☐☐" and the other end farther from the waist element S6 is sometimes denoted by "D_☐☐" (☐☐ is a name of the rigid element) for both ends the rigid elements of the foot element S14, the crus element S12, and the thigh element S10. For example, as shown in FIG. 16, the end of the crus element S12 on the knee joint J_knee (J11) side is denoted by "P_crus" and the other end on the ankle joint J_ankle (J13) side is denoted by "D_crus."

$$F(P\_\text{foot}/LC)=m\_\text{foot}\times(ACC(BCO/LC)+U(G\_\text{foot}/LC)'')-Frf(\text{leg}/LC) \quad (24)$$

$$F(P\_\text{crus}/LC)=m\_\text{crus}\times(ACC(BCO/LC)+U(G\_\text{crus}/LC)'')-F(D\_\text{crus}/LC) \quad (25)$$

$$F(P\_\text{thigh}/LC)=m\_\text{thigh}\times(ACC(BCO/LC)+U(G\_\text{thigh}/LC)'')-F(D\_\text{thigh}/LC) \quad (26)$$

In the above, the two denotations, F(P_☐☐/LC) and F(D_☐☐/LC), appearing in the above formulas (24) to (26) mean respectively reaction forces (two-dimensional translational force vectors on the leg plane PL) applied by an object put in contact with the ends of the rigid element whose name is represented by ☐☐ to the ends thereof. Therefore, according to the law of action and reaction, F(D_crus/LC)=−F (P_foot/LC) and F(D_thigh/LC)=−F(P_crus/LC). In the formula (24) related to the foot element S14, the end farther from the waist element S6 of the foot element S14 is considered to be a floor reaction force acting point COP and the floor reaction force Frf(leg/LC) found by the leg plane projection unit 36 is used as a reaction force acting from the floor to the end of the foot element S14 (the floor reaction force acting point COP).

Moreover, U(G_foot/LC)″, U(G_crus/LC)″, and U(G_thigh/LC)″ respectively mean second-order differential of the position vectors of the centers of gravity G_foot, G_crus, and G_thigh (more accurately, the pairs of the X axis component and the Z axis component of the position vectors) on the leg coordinate system LC previously calculated by the two-dimensional leg posture and element center-of-gravity location calculation unit 29, in other words, relative accelerations (two-dimensional vectors) of the centers of gravity G_foot, G_crus, and G_thigh viewed on the leg plane PL to the origin of the leg coordinate system LC. In this instance, the acceleration vector on the leg plane PL of the origin of the leg coordinate system LC (the center of the hip joint J1) is substantially the same as the acceleration vector ACC(BCO/LC) of the origin of the body coordinate system BC. Therefore, the sum of the acceleration vector ACC(BCO/LC) plus U(G_foot/LC)″, U(G_crus/LC)″, or U(G_thigh/LC)″ indicates an actual acceleration vector of the center-of-gravity G_foot, G_crus, or G_thigh on the leg plane PL.

FIG. 16 typically illustrates a relationship among parameters of the formula (25) related to the crus element S12.

Accordingly, F(P_foot/LC), namely, the translational force (a two-dimensional vector on the leg plane PL) acting on the ankle joint J_ankle is determined by the calculation of the right-hand side of the formula (24) from the floor reaction force Frf(leg/LC) and the acceleration vector ACC(BCO/LC) obtained by the leg plane projection unit 36, the relative acceleration vector U(G_foot/LC)″ obtained from the time series data of the position vector U(G_foot/LC) of the center-of-gravity of the foot element S14 calculated by the two-dimensional leg posture and element center-of-gravity location calculation unit 29, and the weight m_foot of the foot element S14. In addition, F(P_crus/LC), namely, the translational force (a two-dimensional vector on the leg plane PL) acting on the knee joint J_knee is determined by the calculation of the right-hand side of the formula (25) from the calculated F(P_-foot/LC) (=−F(D_crus/LC)), the acceleration vector ACC(BCO/LC) calculated by the leg plane projection unit 36, the relative acceleration vector U(G_crus/LC)″ obtained from the time series data of the position vector U(G_crus/LC) of the center-of-gravity of the crus element S12 found by the two-dimensional leg posture and element center-of-gravity location calculation unit 29, and the weight m_crus of the crus element S12. Similarly, F(P_thigh/LC), namely, the translational force (a two-dimensional vector on the leg plane PL) acting on the hip joint J_hip is determined by the calculation of the right-hand side of the formula (26) by using the found F(P_crus/LC) (=−F(D_thigh/LC)) and the like. In this manner, the reaction force vectors (translational vectors) acting on the joint elements J_ankle, J_knee, and J_hip are calculated in order on the basis of the equations of motion in the above (24) to (26).

Subsequently, the equations of motion of the rotary motions (rotary motions around an axis passing through the corresponding center-of-gravity and perpendicular to the leg plane PL) of the foot element S14, the crus element S12, and the thigh element S10 are given by the following formulas (27) to (29):

$$M(\text{P\_foot}) = \text{I\_foot} \times (\omega(\text{foot})' + \omega(BCO/LC)y') - \qquad (27)$$
$$(U(COP/LC) - U(G\_\text{foot}/LC)) \times Frf(\text{leg}/LC) -$$
$$(U(P\_\text{foot}/LC) - U(G\_\text{foot}/LC)) \times F(P\_\text{foot}/LC)$$

$$M(\text{P\_crus}) = \text{I\_crus} \times (\omega(\text{crus})' + \omega(BCO/LC)y') - \qquad (28)$$
$$(U(D\_\text{crus}/LC) - U(G\_\text{crus}/LC)) \times F(D\_\text{crus}/LC) -$$
$$(U(P\_\text{crus}/LC) - U(G\_\text{crus}/LC)) \times F(P\_\text{crus}/LC) - M(D\_\text{crus})$$

$$M(\text{P\_thigh}) = \text{I\_thigh} \times (\omega(\text{thigh})' + \omega(BCO/LC)y') - \qquad (29)$$
$$(U(D\_\text{thigh}/LC) - U(G\_\text{thigh}/LC)) \times F(D\_\text{thigh}/LC) -$$
$$(U(P\_\text{thigh}/LC) - U(G\_\text{thigh}/LC)) \times F(P\_\text{thigh}/LC) -$$
$$M(D\_\text{thigh})$$

In the above, M(P_□□) and M(D_□□) appearing in the above formulas (26) to (28) mean respectively reaction force moments (the moments around the axis perpendicular to the leg plane PL (around the axis parallel to the Y axis of the leg coordinate system LC)) applied by an object put in contact with the ends of the rigid element whose name is represented by □□ to the ends thereof (See FIG. 16). Therefore, according to the law of action and reaction, the following equations are satisfied: M(D_crus)=−M(P_foot); and M(D_thigh)=−M (P_crus). Moreover, I_foot, I_crus, and I_thigh are respectively moments of inertia around the corresponding center-of-gravity of the foot element S14, the crus element S12, and the thigh element S10. They are previously determined based on the measurement data or the like and stored in the memory of the arithmetic processing unit 18, similarly to the weights of the rigid elements. Furthermore, ω(foot)′, ω(crus)′, and ω(thigh)′ respectively mean first-order differential of the relative angular velocities ω(foot), ω(crus), and ω(thigh) (relative angular velocities around the axis perpendicular to the leg plane PL), in other words, relative angular accelerations, viewed from the leg coordinate system LC of the foot element S14, the crus element S12, and the thigh element S10. These are given as second-order differential of the tilt angles θ_foot, θ_crus, and θ_thigh of the foot element S14, the crus element S12, and the thigh element S10 found by the two-dimensional leg posture and element center-of-gravity location calculation unit 29 as shown by the following formulas (29a) to (29c):

$$\omega(\text{foot})' = \theta\_\text{foot}'' \qquad (29a)$$

$$\omega(\text{crus})' = \theta\_\text{crus}'' \qquad (29b)$$

$$\omega(\text{thigh})' = \theta\_\text{thigh}'' \qquad (29c)$$

In addition, ω(BCO/LC)y′ is a first derivative of the actual angular velocity ω(BCO/LC)y of the origin BCO of the body coordinate system BC found by the leg plane projection unit 36. The sum of the first-order differential ω(BCO/LC)y′ plus ω(foot)′, ω(crus)′, or ω(thigh)′ indicates the actual angular acceleration (the angular acceleration around the axis perpendicular to the leg plane PL) of the foot element S14, the crus element S12, or the thigh element S10.

FIG. 16 typically illustrates the relationship among parameters of the formula (28) related to the crus element S12.

The joint moment estimation unit 37 sequentially calculates joint moments M(P_foot), M(P_crus), and M(P_thigh) finally by using the above formulas (27) to (29). More specifically, the joint moment M(P_foot), namely, the moment around the axis perpendicular to the leg plane PL acting on the ankle joint 13 is determined by the calculation of the right-hand side of the formula (27) from the floor reaction forces Frf(leg/LC) and U(COP/LC) determined by the leg plane projection unit 36, the angular acceleration ω(BCO/LC)y′ grasped from time series data of the angular velocity ω(BCO/LC)y determined by the leg plane projection unit 36, the relative angular acceleration ω(foot)′ (=θ_foot″) grasped from the time series data of the tilt angle θ_foot determined by the two-dimensional leg posture and element center-of-gravity location calculation unit 29, the position vectors U(G_foot/LC) and U(P_foot/LC) (=U(J_ankle/LC)) (more accurately, the pairs of the X axis component and the Z axis component of these position vectors) found by the two-dimensional leg posture and element center-of-gravity location calculation unit 29, the reaction force F(P_foot/LC) previously obtained by the formula (24), and the preset moment of inertia I_foot.

Furthermore, the joint moment M(P_crus), namely, the moment around the axis perpendicular to the leg plane PL acting on the knee joint 11 is found by the calculation of the right-hand side of the formula (28) from the found joint moment M(P_foot) (=−M(D_crus)), the reaction forces F(P_foot/LC) (=−F(D_crus/LC)) and F(P_crus/LC) previously found by the formulas (24) and (25), the angular acceleration ω(BCO/LC)y′ grasped from the time series data of the angular velocity ω(BCO/LC)y obtained by the leg plane projection unit 36, the relative angular acceleration ω(crus)′ (=θ_crus″) grasped from the time series data of the tilt angle θ_crus found by the two-dimensional leg posture and element center-of-gravity location calculation unit 29, the position vectors U(G_crus/LC), U(P_crus/LC) (=U(J_knee/LC)), and U(D_crus/LC) (=U(J_ankle/LC)) (more accurately, the pairs of the X axis component and the Z axis component of these position vectors) found by the two-dimensional leg posture and element center-of-gravity location calculation unit 29, and the preset moment of inertia I_crus. Similarly, M(P_thigh), namely, the moment around the axis perpendicular to the leg plane PL acting on the hip joint 9 is found by the calculation of the right-hand side of the formula (28) by using the found M(P_crus) (=−M(D_thigh)) and the like.

While the moments of inertia I_foot, I_crus, and I_thigh of the rigid elements of the each leg section S2 have been considered in this embodiment, these values are sufficiently close to zero in general. Therefore, the terms including the moment of inertia I_foot, I_crus, or I_thigh may be omitted in the calculations of the formulas (26) to (28). If they are omitted, there is no need to grasp the angular velocities or angular accelerations of the foot element S14, the crus element S12, and the thigh element S10.

As described above, in the arithmetic processing of the joint moment estimation unit 37, the joint moments M(P_foot), M(P_crus), and M(P_thigh) around the axis perpendicular to the leg plane PL of the ankle joint 13, the knee joint 11, and the hip joint 9 of the each leg 2 are calculated in order from the ankle joint 13 side. These joint moments are used to control an apparatus for assisting walking of the human being 1 (an apparatus including an electric motor capable of applying assist torques to the ankle joint 13, the knee joint 11, and the hip joint 9), for example. In this case, the joint moments M(P_foot), M(P_crus), and M(P_thigh) are those around the axis perpendicular to the leg plane PL, in other words, moments having the direction of bending or stretching of the leg 2, and therefore particularly the apparatus is capable of applying torques assisting the bending and stretching motion of the leg 2 appropriately to the leg 2.

Figure 17:
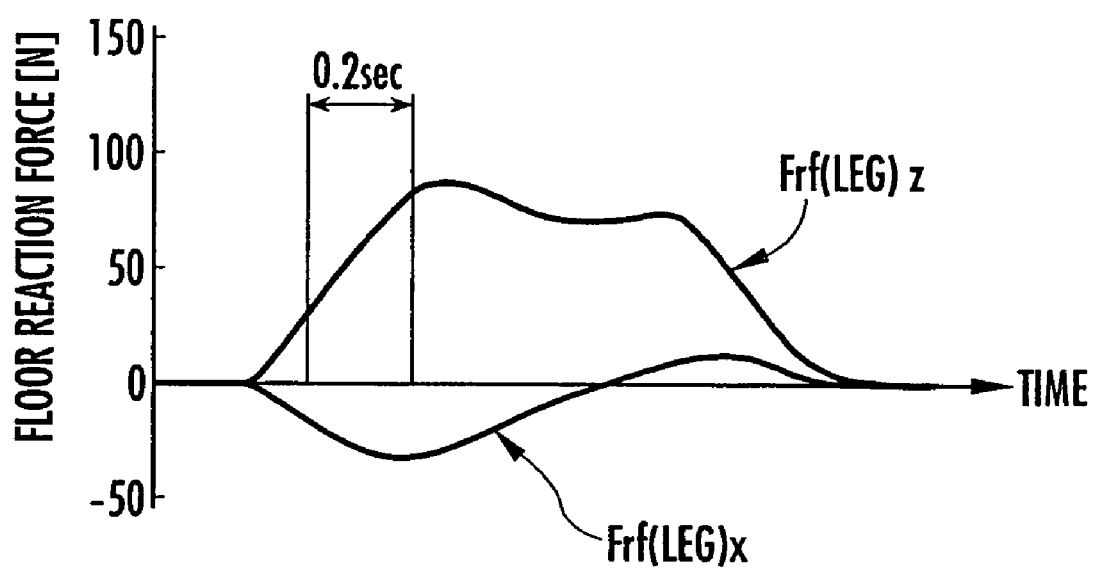
FIG. 17 is a graph showing a transition of an estimated value of a floor reaction force in the period of a single step during walking of a human being.

The following describes sample measurements of the estimated values of the floor reaction forces according to this embodiment with reference to FIG. 17. Referring to FIG. 17, there is shown a graph showing sample measurements of variation with time of estimated values of the X-axis component Frf(leg)x and the Z-axis component Frf(leg)z on the body coordinate system BC of the floor reaction force acting on the leg 2 kept in a landing state in the period of one step from a certain two-leg supporting state through a one-leg supporting state to another two-leg supporting state. These values of Frf(leg)X and Frf(leg)Z on the graph are obtained by filtering the estimated values of the floor reaction force calculated by the floor reaction force estimation unit 35 using the second-order Butterworth filter, for example.

As shown in this graph, Frf(leg)z shows a smooth and continuous change and has two peak values. In other words, Frf(leg)z shows a so-called double-peaked characteristic, which is peculiar to walking of the human being 1. In addition, Frf(leg)x shows a smooth and continuous change similarly to Frf(leg)z and clearly shows a deceleration phase in which the value is negative and an acceleration phase in which the value is positive in order as a phenomenon peculiar to walking of the human being 1. Thus, according to this embodiment, it is apparent that the present invention enables favorably finding the estimated values of the floor reaction force showing a continuous and smooth change and improves the reliability of the obtained estimated values of the floor reaction force.

While the joint moment around the axis perpendicular to the leg plane PL has been calculated in the embodiment described hereinabove, a joint moment around the Y axis of the body coordinate system BC may be calculated, for example. In this case, the joint moment may be estimated by the inverse dynamics calculation by using the component vector of the floor reaction force on the XZ plane of the body coordinate system BC calculated by the floor reaction force estimation unit 35.

Furthermore, while the rigid link model S1 with the ankle joint J13 has been used in the embodiment, it is also possible to perform the estimation of the floor reaction force or the like by using a rigid link model without the ankle joint J13 (a rigid link model with the ankle joint fixed). In this case, the joint displacement sensor 23 on the ankle joint 13 may be omitted.

Still further, while the human being 1 has been taken for example as a two-legged walking mobile body in the embodiment, it is also possible to consider an orthosis attached to the leg 2 or the like of the human being 1 to assist walking of the human being 1 (an orthosis capable of making motions similar to those of the leg 2), for example, as a two-legged walking mobile body and to estimate the floor reaction forces of the orthosis only, similarly to the embodiment. Moreover, it is also possible to use the estimated value as a target value of the floor reaction force so that the movable body can move smoothly.

What is claimed is:

1. A floor reaction force estimation method, performed by a processor, for a two-legged walking mobile body, which estimates a floor reaction force acting on each leg of the two-legged walking mobile body, comprising:

a first step of sequentially measuring displacements of a plurality of predetermined joints including at least a hip joint and a knee joint of the each leg of the two-legged walking mobile body;

a second step of sequentially calculating center-of-gravity locations of the two-legged walking mobile body by using at least a rigid link model in which the two-legged walking mobile body is represented as a link body made of a plurality of rigid elements and a plurality of joint elements and the displacements of the joints measured in the first step;

a third step of sequentially calculating accelerations of the centers of gravity of the two-legged walking mobile body by using at least the center-of-gravity locations calculated in the second step and outputs of an acceleration sensor attached to the two-legged walking mobile body;

a fourth step of sequentially calculating component vectors on a plane perpendicular to at least one predetermined axis of a total floor reaction force, which is a total sum of all floor reaction forces acting on the two-legged walking mobile body from the accelerations of the centers of gravity calculated in the third step and the weight of the two-legged walking mobile body;

a fifth step of sequentially calculating components in a direction of the predetermined axis of a total rate of change of angular momentum, which is a time rate of change of an total angular momentum of the two-legged walking mobile body, by using at least the rigid link model, the displacements of the joints measured in the first step, the center-of-gravity locations calculated in the second step, the accelerations of the centers of gravity calculated in the third step, and the outputs of an angular velocity sensor attached to the two-legged walking mobile body;

a sixth step of sequentially grasping floor reaction force acting points, each of which is a point of action of a floor reaction force acting on the each landing leg of the two-legged walking mobile body;

a seventh step of determining the direction of the component vector on the plane perpendicular to the predetermined axis of the floor reaction force acting on the each landing leg in such a way that the direction of the moment generated around the center-of-gravity of the two-legged walking mobile body by the total sum of the component vectors on the plane perpendicular to the predetermined axis of the floor reaction force acting on the each landing leg is coincident with the direction of the component in the direction of the predetermined axis of the total rate of change of angular momentum by using the center-of-gravity location calculated in the second step, the component vector of the total reaction force calculated in the fourth step, the component of the total rate of change of angular momentum calculated in the fifth step, and the floor reaction force acting point grasped in the sixth step; and an eighth step, performed by the processor, of using the direction of the component vector of the floor reaction force determined in the seventh step and the component vector of the total reaction force calculated in the fourth step to calculate an estimated value of the component vector on the plane perpendicular to the predetermined axis of the floor reaction force acting on the each leg in such a way that the vector of the total sum of the component vector on the plane perpendicular to the predetermined axis of the floor reaction force acting on each of the both legs equals the component vector on the plane of the total floor reaction force, by regulating the direction of the component vector on the plane perpendicular to the predetermined axis of the floor reaction force acting on each of the landing legs to the direction determined in the seventh step if the two-legged walking mobile body is in the two-leg supporting state, and to calculate an estimated value of the component vector on the plane perpendicular to the predetermined axis of the floor reaction force acting on the landing leg in such a way that the magnitude of the component vector on the plane perpendicular to the predetermined axis of the floor reaction force acting on the leg equals the magnitude of the component vector on the plane of the total floor reaction force, by regulating the direction of the component vector on the plane perpendicular to the predetermined axis of the floor reaction force acting on the landing leg to the direction determined in the seventh step if the two-legged walking mobile body is in the one-leg supporting state.

2. The floor reaction force estimation method for the two-legged walking mobile body according to claim 1, wherein the seventh step includes the steps of: calculating a moment arm length regulating the relationship between the component vector on the plane perpendicular to the predetermined axis of the total floor reaction force and the moment generated around the center-of-gravity of the two-legged walking mobile body by the component vector by using the component vector of the total floor reaction force calculated in the fourth step and the component of the total rate of change of angular momentum calculated in the fifth step; and determining the direction of the component vector on the plane perpendicular to the predetermined axis of the floor reaction force acting on the each landing leg in such a way that the line of action on the plane perpendicular to the predetermined axis of the floor reaction force acting on the each landing leg is tangent to a circle whose center is the center-of-gravity of the two-legged walking mobile body and having a radius equal to the moment arm length and that the direction of the moment generated around the center-of-gravity of the two-legged walking mobile body by the total sum of the component vectors on the plane perpendicular to the predetermined axis of the floor reaction forces acting on the landing legs is coincident with the direction of the component in the direction of the predetermined axis of the total rate of change of angular momentum.

3. The floor reaction force estimation method for the two-legged walking mobile body according to claim 1, wherein the predetermined axis includes at least an axis extending substantially in the right/left direction of the two-legged walking mobile body.

4. The floor reaction force estimation method for the two-legged walking mobile body according to claim 3, wherein supposing that a Y axis is defined to be extending substantially in the right/left direction of the two-legged walking mobile body and an XZ plane is defined to be perpendicular to the Y axis, the floor reaction force estimation method further comprises a ninth step of calculating an estimated value of a component vector on the XZ plane of the floor reaction force acting on the each leg in such a way that the component vectors on the XZ plane of the floor reaction force acting on the respective legs are coincident with each other, the magnitude of the vector of the total sum of the component vectors on the XZ plane of the floor reaction forces respectively acting on the legs is equal to the magnitude of the component vector on the XZ plane of the total floor reaction force calculated in the fourth step, and the direction of the vector of the total sum is coincident with the direction of a straight line passing through an acting point determined according to the floor reaction force acting points of the legs on the XZ plane and tangent to a circle in the two-leg supporting state of the two-legged walking mobile body, wherein, if an anteroposterior distance between feet, which is a distance between feet of the legs in the forward/backward direction of the two-legged walking mobile body, at least in the two-leg supporting state is smaller than a predetermined first threshold value, the estimated value calculated in the ninth step is obtained as a true value of the estimated value of the component vector on the XZ plane of the floor reaction force acting on the each leg, instead of the estimated value calculated in the eighth step.

5. The floor reaction force estimation method for the two-legged walking mobile body according to claim 4, wherein the acting point determined according to the floor reaction force acting points of the legs on the XZ plane is a middle point on a line segment between the floor reaction force acting points of the legs on the XZ plane.

6. The floor reaction force estimation method for the two-legged walking mobile body according to claim 3, wherein, supposing that a Y axis is defined to be extending substantially in the right/left direction of the two-legged walking mobile body and an XZ plane is defined to be perpendicular to the Y axis, the floor reaction force estimation method comprises a ninth step of calculating an estimated value of a component vector on the XZ plane of the floor reaction force acting on the each leg in such a way that the component vectors on the XZ plane of the floor reaction forces acting on the legs are coincident with each other, the magnitude of the vector of the total sum of the component vectors on the XZ plane of the floor reaction forces respectively acting on the legs is equal to the magnitude of the component vector on the XZ plane of the total floor reaction force calculated in the fourth step, and the direction of the vector of the total sum is coincident with the direction of a straight line passing through an acting point determined according to the floor reaction force acting points of the legs on the XZ plane and tangent to a circle in the two-leg supporting state of the two-legged walking mobile body; and a tenth step of calculating an arithmetic weighted mean value, which is achieved by multiplying the estimated value of the component vector on the XZ plane of the floor reaction force calculated in the eighth step and the estimated value of the component vector on the XZ plane of the floor reaction force calculated in the ninth step by predetermined weighting factors W1 and W2 respectively and then adding them up, for each of the legs and determining the calculated arithmetic weighted mean value of the each leg as a true value of the estimated value of the component on the XZ plane of the floor reaction force acting on the leg, and wherein the weighting factors W1 and W2 are set according to the anteroposterior distance between feet in such a way that: the true value of the estimated value of the component vector on the XZ plane of the floor reaction force achieved in the tenth step is coincident with the estimated value calculated in the ninth step if the anteroposterior distance between feet, which is a distance between feet of the both legs in the forward/backward direction of the two-legged walking mobile body in the two-leg supporting state, is smaller than a predetermined first threshold value; the true value of the estimated value of the component vector on the XZ plane of the floor reaction force achieved in the tenth step is coincident with the estimated value calculated in the eighth step if the anteroposterior distance between feet is larger than a second threshold value, which is predetermined to be larger than the first threshold value; and the true value of the estimated value of the component vector on the XZ plane of the floor reaction force achieved in the tenth step is getting closer to the estimated value calculated in the eighth step from the estimated value calculated in the ninth step along with an increase in the anteroposterior distance between feet if the anteroposterior distance between feet is equal to or larger than the first threshold value and equal to or smaller than the second threshold value.

7. The floor reaction force estimation method for the two-legged walking mobile body according to claim 6, wherein the weighting factors W1 and W2 are set to 0 and 1, respectively, if the anteroposterior distance between feet is smaller than the first threshold value, W1 and W2 are set to 1 and 0, respectively, if the anteroposterior distance between feet is larger than the second threshold value, and W1 and W2 are set in such a way as to change monotonically along with an increase in the anteroposterior distance between feet, while W1 and W2 satisfy the relation represented by W1+W2=1 if the anteroposterior distance between feet is equal to or larger than the first threshold value and equal to or smaller than the second threshold value.

8. The floor reaction force estimation method for the two-legged walking mobile body according to claim 6, wherein the acting point determined according to the floor reaction force acting points of the legs on the XZ plane is a middle point on a line segment between the floor reaction force acting points of the legs on the XZ plane.

* * * * *